US008218476B2

(12) United States Patent
Miller

(10) Patent No.: US 8,218,476 B2
(45) Date of Patent: Jul. 10, 2012

(54) FLEXIBLE CAPACITY SATELLITE COMMUNICATIONS SYSTEM WITH DYNAMIC DISTRIBUTION AND COVERAGE AREAS

(75) Inventor: Mark J. Miller, Vista, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

(21) Appl. No.: 13/098,213

(22) Filed: Apr. 29, 2011

(65) Prior Publication Data

US 2011/0268017 A1 Nov. 3, 2011

Related U.S. Application Data

(60) Provisional application No. 61/330,377, filed on May 2, 2010, provisional application No. 61/375,384, filed on Aug. 20, 2010.

(51) Int. Cl.
*H04B 7/212* (2006.01)
*H04B 7/185* (2006.01)

(52) U.S. Cl. ......................... 370/321; 370/316

(58) Field of Classification Search .................. 370/321, 370/316
See application file for complete search history.

(56) References Cited

U.S. PATENT DOCUMENTS

| | | | |
|---|---|---|---|
| 6,377,561 B1 | 4/2002 | Black | |
| 6,522,643 B1 | 2/2003 | Jacomb-Hood et al. | |
| 6,625,129 B1 | 9/2003 | Olds | |
| 6,801,565 B1 | 10/2004 | Bottomley et al. | |
| 6,957,078 B1 * | 10/2005 | Yousefi et al. | 455/522 |
| 6,992,992 B1 * | 1/2006 | Cooper et al. | 370/324 |
| 2002/0159403 A1 | 10/2002 | Reddy | |
| 2007/0135051 A1 | 6/2007 | Zheng et al. | |
| 2011/0268158 A1 * | 11/2011 | Miller et al. | 375/138 |

FOREIGN PATENT DOCUMENTS

WO W098/32245 7/1998
WO WO 2011/139991 A1 11/2011

OTHER PUBLICATIONS

Torlak et al. Fast Estimation of Weight Vectors to Optimize Multi-Transmitter Broadcast Channel Capacity. IEEE Transactions on Signal Processing, vol. 46, No. 1 Jan. 1998. Entire document. <URL: http://danube.ee.washington.edu/downloadable/hliu/00651228.pdf>.
Arnold et al., Mobile Communications In A Geosynchronous Regenerative Satellite Mesh (Rsm) System, pp. 1-6, Hughes Network Systems, Germantown, Maryland, Accessed Oct. 13, 2011.

(Continued)

*Primary Examiner* — Kenny Lin
(74) *Attorney, Agent, or Firm* — Kilpatrick Townsend & Stockton LLP

(57) ABSTRACT

Systems and methods for supporting more flexible coverage areas and spatial capacity assignments using satellite communications systems are disclosed. Antenna elements are arranged in one or more phased arrays. The phased arrays may be used to receive uplink communications, transmit downlink communications, or both receive uplink communications and transmit downlink communications. Beam forming networks (BFN's) associated with the one or more phased arrays may be dynamic, allowing for movement of the locations of the receive beams, the transmit beams, or both the receive beams and transmit beams. The beams may then "hop" from location to location according to a predefined or dynamic hopping pattern. In some embodiments, the hopping patterns may be time-varying and may be changed or updated on-the-fly.

8 Claims, 29 Drawing Sheets

OTHER PUBLICATIONS

Beam Forming Networks, Application Note, pp. 1-36. EMS Technologies, Inc. Aug. 2004, Revision B. Retrieved Oct. 13, 2011 at http://www.emsdss.com/uploadedFiles/pdf/BFN.pdf.

Couchman, A. et al. Defocused Array Fed Reflector Antennas For Ka, Broad Band Satellites, pp. 1-8., Accessed Jun. 28, 2010.

Franchi et al., Technology Trends And Maket Drivers For Broadband Mobile Via Satellite: Inmarsat Bgan, pp. 1-9, London, United Kingdom, Accessed Oct. 13, 2011.

Gopal et al., *Regenerative Satellite Mesh System For Realtime Multi-Party Multimedia Traffic Hughes Network Systems*, LLC (HUGHES) Germantown, MD, Accessed May 25, 2010.

Gopal et al., *Technology Readiness Of Future Generation Networks Leveraging Regenerative Satellite Mesh Architecture—A Spaceway Perspective*, pp. 1-7, Hughes Network Systems, LLC, Germantown, MD, Accessed May 25, 2010.

Gopal, R. *Innovations in Satellite Networking Technology and Products*, pp. 1-10. Hughes, Sia, Dec. 7, 2006. Retrieved Aug. 9, 2010 at http://www.sia.org/2007DoDSatcomWorkshop/Thursday/New%20Modems . . . etc/Hughes.ppt# 256,1, Innovations.

Hadinger et al., *Next Generation High Capacity Ka-Band Satellite Systems*, pp. 1-8, Northrop Grumman Space Technology, Redondo Beach, CA., Accessed Apr. 25, 2010.

Kitao et al., *Proto-Flight Model Development of the Multi-beam Active Phased Array Antenna for WINDS*, pp. 1-4, Accessed Jun. 28, 2010.

"*Kizuna*" (*WINDS*) (*Wideband InterNetworking engineering test and Demonstration Satellite*) (Launched by H-IIA F14), WINDS Project Team, Office of Space Applications Japan Aerospace Exploration Agency, Accessed Oct. 13, 2011.

Kramer H. J., *WINDS (Wideband InterNetworking engineering test and Demonstration Satellite)*, Last modified date: Jan. 24, 2008. Retrieved Oct. 13, 2011 at http://www.eoportal.org/directory/pres_WINDSWidebandInterNetworkingengineeringtestandDemonstrationSatellite.html.

Mallison et al., Enabling Technologies for the Eurostar Geomobile Satellite, p. 1-10. 19th AIAA International Communications Satellite Systems Conference. ICSSC, 2001. Retrieved Oct. 13, 2011 at http://cnes.cborg.net/aiaa-icssc/proceedings/949.pdf.

Nelson, J. Top Satellite Technology At Forefront. Boeing Frontiers, 1(3). (2002). Retrieved Aug. 9, 2010 at http://www.boeing.com/news/frontiers/archive/2002/july/i_sc.html.

Reudink, D.O. et al., A Scanning Spot-Beam Satellite System, Bell System Technical Journal, vol. 56, Oct. 1977, p. 1549-1560.

Rooney, K. J. *Evolving Satellite Markets and their Enabling Technologies*, pp. 1-18, Boeing Satellite Systems, Los Angeles, CA, Oct. 2002. Retrieved Oct. 13, 2011 at http://www.aiaa.org/documents/conferences/presentations/rooney.pdf.

Roper et al., *WGS phased arrays support next generation DoD SATCOM capability*. IEEE International Symposium on Phased Array Systems and Technology, 2003, pp. 82-87 (2003).

Rustako, A. J. Jr. et al., An Experimental Scanning Spot Beam Satellite System Implementing 600 Mbit/Sec Tdma, IN: International Conference on Digital Satellite Communications, 6th, Phoenix, AZ, Sep. 19-23, 1983, Proceedings (A85-15451 04-32). New York, Institute of Electrical and Electronics Engineers, 1983, p. XI-18 to XI-23.

Satellite Provision of Next Generation Broadband Services in UK, Prepared for the Broadband Stakeholder Group, pp. 1-7, Oct. 29, 2007. Information Technology Telecommunications and Electronics Association, London. Retrieved Aug. 9, 2010 at http://www.intellectuk.org/component/option,com_docman/task,doc_download/gid,2370/Itemid,102/.

Science Applications International Corporation. Satellite Communications Technology Database. NASA CR-2001-210563-PART2, Mar. 2001. Retrieved Aug. 9, 2010 at http://gltrs.grc.nasa.gov/reports/2001/CR-2001-210563-PART2.pdf.

Stone, J. Spaceway 3 Takes Flight pp. 1-4. Near Earth LLC (Aug. 2007). Retrieved Aug. 9, 2010 at http://www.nearearthllc.com/analysis/presentations/vol3.8.2.pdf.

Sunderland et al., Megagate ASICs for the Thuraya Satellite Digital Signal Processor, pp. 1-8, Proceedings of the International Symposium on Quality Electronic Design, pp. 479-486, 2002 IEEE Computer Society (2002).

Whitefield et al., Spaceway Now And In The Future: On-Board IP Packet Switching Satellte Communication Network, pp. 1-7, Hughes Network Systems, LLC, Germantown, MD, Accessed Apr. 25, 2010.

International Search Report corresponding to PCT Application No. PCT/US2010/026934, dated May 11, 2010.

Non Final Office Action for U.S. Appl. No. 13/098,334, mailed on Jan. 19, 2012, 8 pages.

* cited by examiner

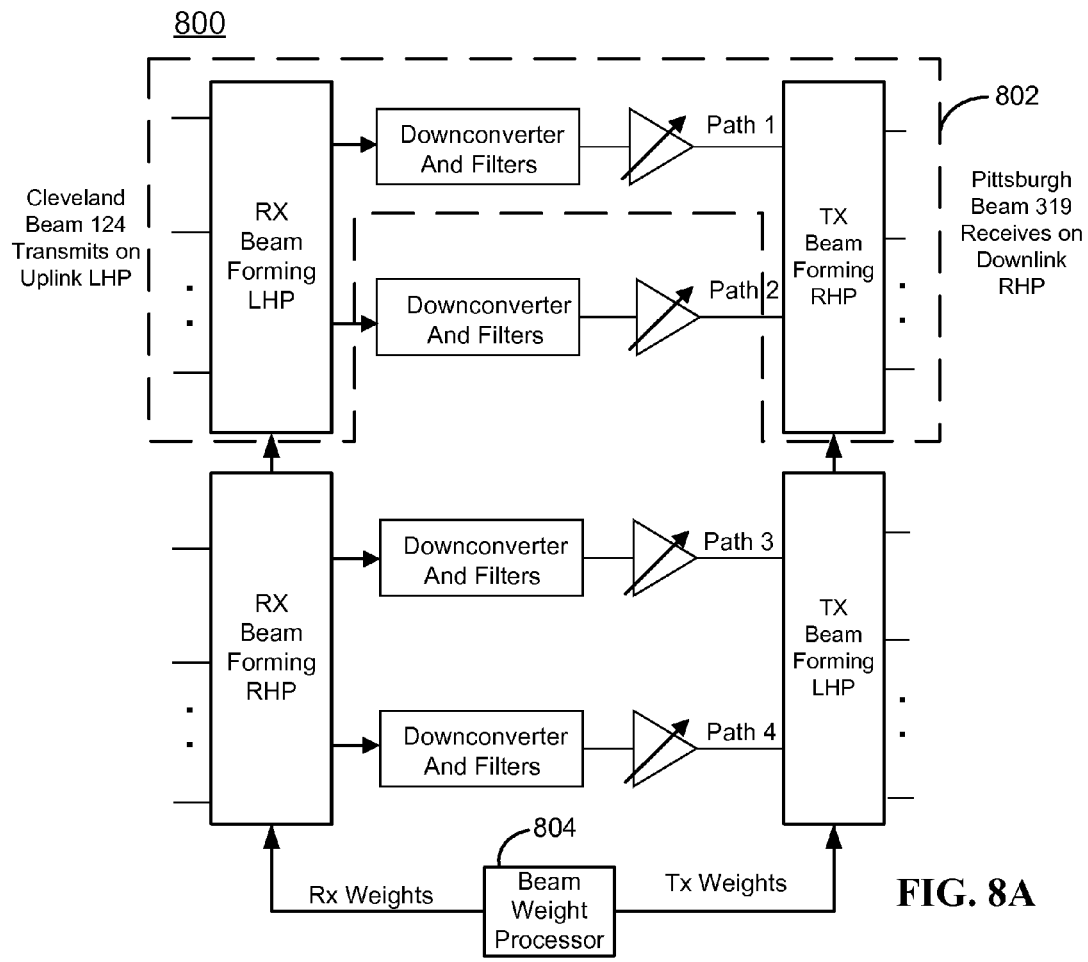
FIG. 8A
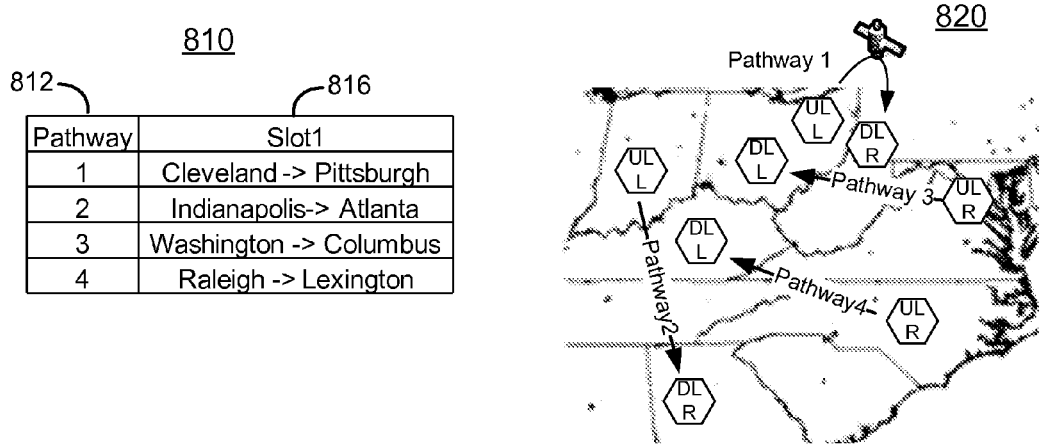
FIG. 8B
FIG. 8C

FIG. 12B
1210
| Pathway | Slot1 | Slot2 | SLOT USAGE |
|---------|---------|---------|------------|
| 1 | GW1->B1 | B1->GW1 | FR |
| 2 | GW3->B3 | B3->GW3 | FR |
| 3 | GW2->B7 | B7->GW2 | FR |
| 4 | GW4->B5 | B5->GW4 | FR |
| 5 | GW1->B2 | B2->GW1 | FR |
| 6 | GW3->B4 | B4->GW3 | FR |
| 7 | GW2->B8 | B8->GW2 | FR |
| 8 | GW4->B6 | B6->GW4 | FR |
| PW USAGE | 8F | 8R | |
1220 Slot 1
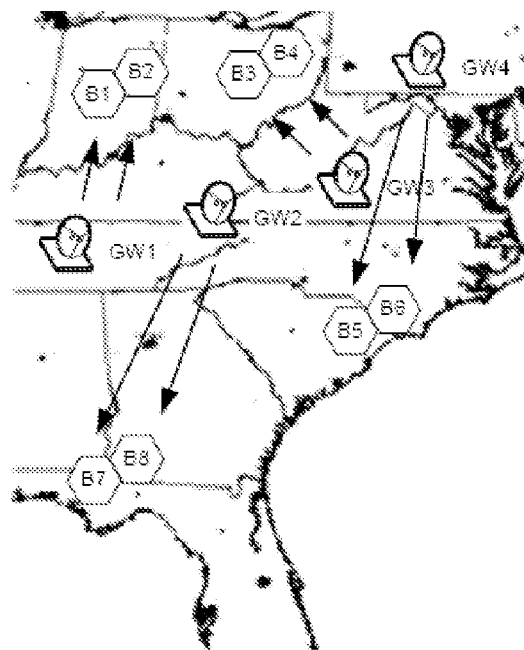
1230 Slot 2
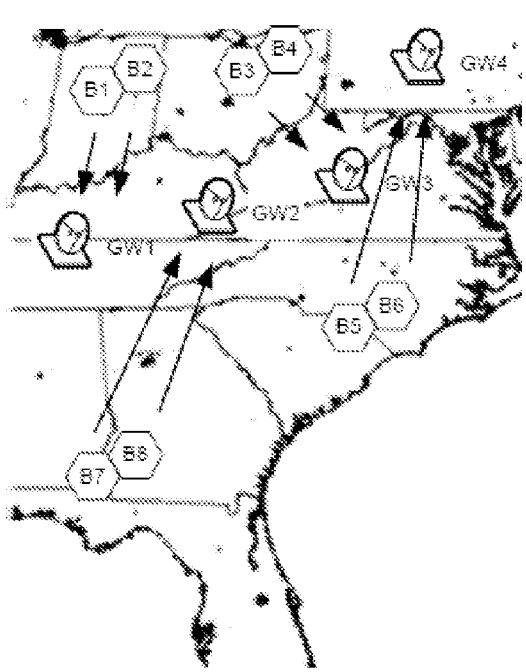

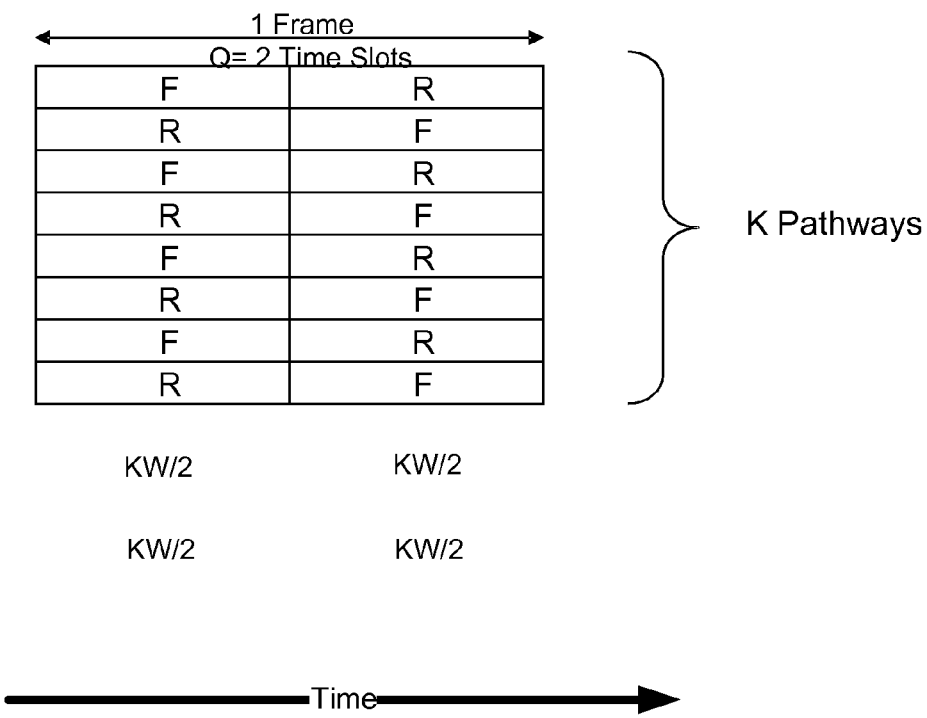

FIG. 13B
1310
| Pathway | Slot1 | Slot2 | SLOT USAGE |
|---|---|---|---|
| 1 | GW1->B1 | B1->GW1 | FR |
| 2 | B7->GW1 | GW1->B7 | RF |
| 3 | GW2->B3 | B3->GW2 | FR |
| 4 | B5->GW2 | GW2->B5 | RF |
| 5 | GW1->B2 | B2->GW1 | FR |
| 6 | B8->GW1 | GW1->B8 | RF |
| 7 | GW2->B4 | B4->GW2 | FR |
| 8 | B6->GW2 | GW2->B6 | RF |
PW USAGE    4F,4R    4F,4R
1320    Slot 1
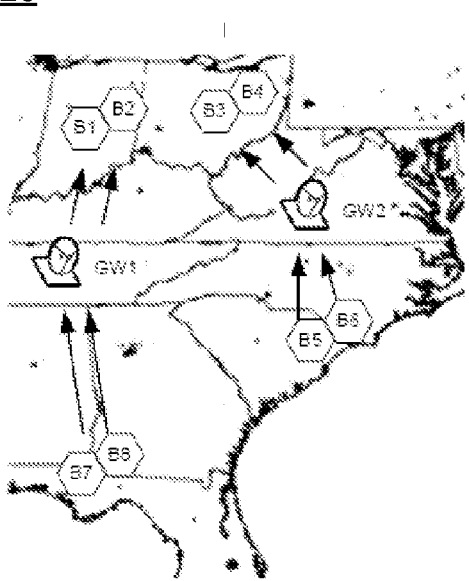
Slot 2    1330
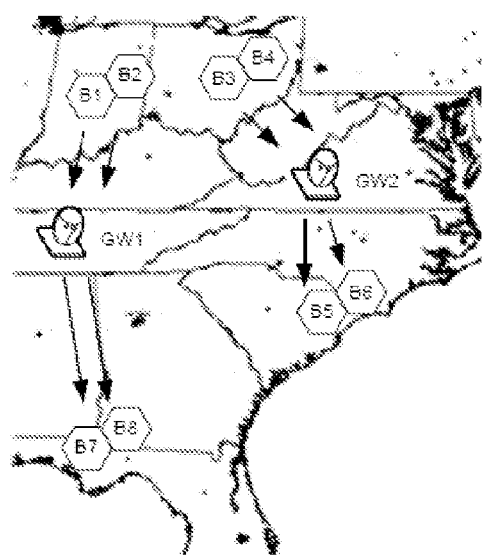

75%/25% Time Allocation

FIG. 14B 1410
| Pathway | Slot1 | Slot2 | Slot3 | Slot4 | SLOT USAGE |
|---|---|---|---|---|---|
| 1 | B1->GW1 | | GW1->B1 | | RFFF |
| 2 | GW2->B7 | B7->GW2 | GW2->B7 | | FRFF |
| 3 | | GW3->B3 | B3->GW3 | GW3->B3 | FFRF |
| 4 | | | GW4->B5 | B5->GW4 | FFFR |
| 5 | B2->GW1 | | GW1->B2 | | RFFF |
| 6 | GW2->B8 | B8->GW2 | GW2->B8 | | FRFF |
| 7 | | GW3->B4 | B4->GW3 | GW3->B4 | FFRF |
| 8 | | | GW4->B6 | B6->GW4 | FFFR |
| PW USAGE | 6F,2R | 6F,2R | 6F,2R | 6F,2R | |
1420
Slot 1
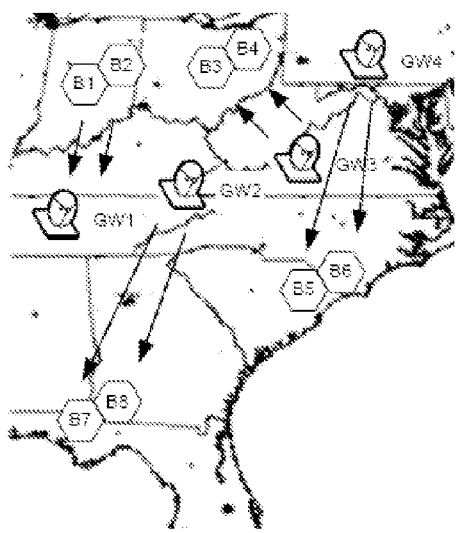
1430
Slot 2
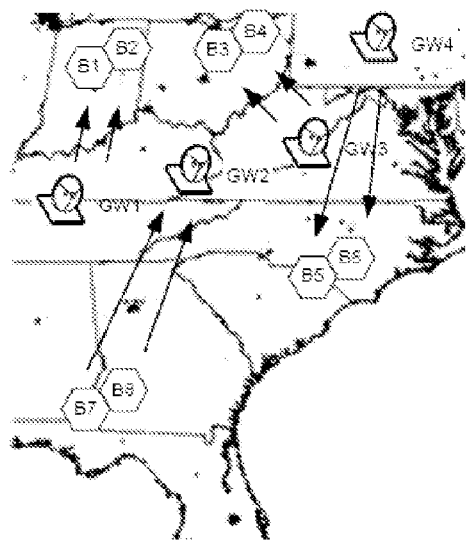
1440
Slot 3
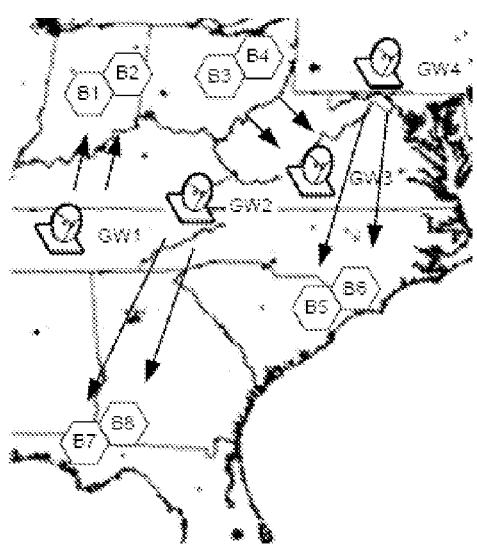
1450
Slot 4
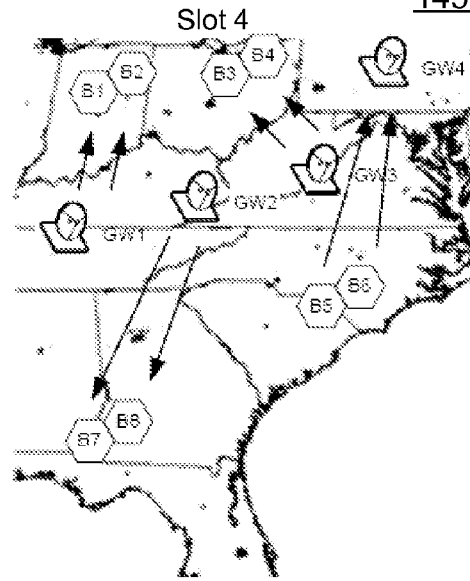

FIG. 15B
1510
| Pathway | Slot1 | Slot2 | Slot3 | Slot4 | SLOT USAGE |
|---------|-------|-------|-------|-------|------------|
| 1 | B1->GW1 | B3->GW1 | B5->GW1 | B7->GW1 | R |
| 2 | GW2->B3 | GW2->B7 | GW2->B3 | GW2->B3 | F |
| 3 | GW3->B5 | GW3->B5 | GW3->B7 | GW3->B5 | F |
| 4 | GW1->B7 | GW1->B1 | GW1->B1 | GW1->B1 | F |
| 5 | B2->GW1 | B4->GW1 | B6->GW1 | B8->GW1 | R |
| 6 | GW2->B4 | GW2->B8 | GW2->B4 | GW2->B4 | F |
| 7 | GW3->B6 | GW3->B6 | GW3->B8 | GW3->B6 | F |
| 8 | GW1->B8 | GW1->B2 | GW1->B2 | GW1->B2 | F |
| PW USAGE | 6F,2R | 6F,2R | 6F,2R | 6F,2R | |
1520 Slot 1
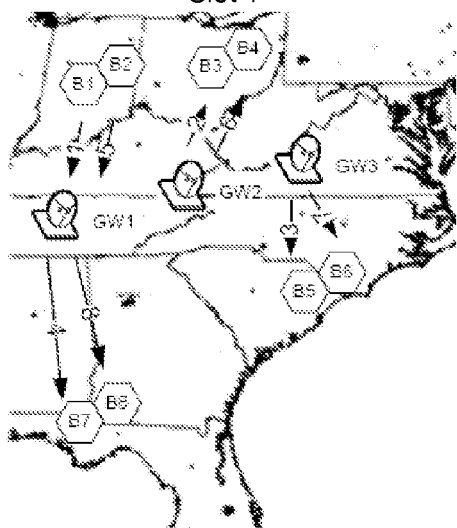
1530 Slot 2
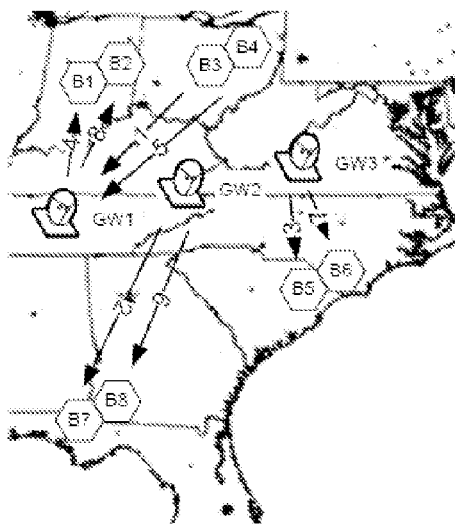
1540 Slot 3
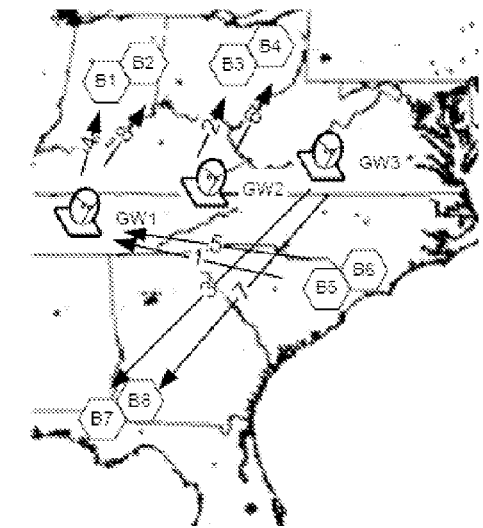
1550 Slot 4
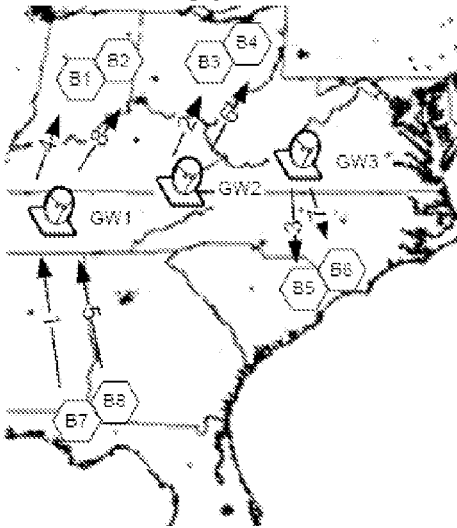

1560

| GW USAGE | Pathway | Slot1 | Slot2 | Slot3 | SLOT USAGE |
|---|---|---|---|---|---|
| SHARED | 1 | B1->GW1 | B3->GW2 | B5->GW3 | R |
| GW2 | 2 | | GW2->B3 | | F |
| GW3 | 3 | | GW3->B5 | | F |
| GW1 | 4 | | GW1->B1 | | F |
| SHARED | 5 | B2->GW1 | B4->GW2 | B6->GW3 | R |
| GW2 | 6 | | GW2->B4 | | F |
| GW3 | 7 | | GW3->B6 | | F |
| GW1 | 8 | | GW1->B2 | | F |
| PW USAGE | | 6F,2R | 6F,2R | 6F,2R | |

1570

| GW USAGE | Pathway | Slot1 | Slot2 | Slot3 | SLOT USAGE |
|---|---|---|---|---|---|
| GW1 | 1 | B1->GW1 | B3->GW1 | B5->GW1 | R |
| GW2 | 2 | | GW2->B3 | | F |
| GW3 | 3 | | GW3->B5 | | F |
| GW1 | 4 | | GW1->B1 | | F |
| GW1 | 5 | B2->GW1 | B4->GW1 | B6->GW1 | R |
| GW2 | 6 | | GW2->B4 | | F |
| GW3 | 7 | | GW3->B6 | | F |
| GW1 | 8 | | GW1->B2 | | F |
| PW USAGE | | 6F,2R | 6F,2R | 6F,2R | |

1580

Slot 1 Map

FIG. 18A         1800
*Example with 8 dwell times, Q=32 and $C_b$=4.5 Gbps*
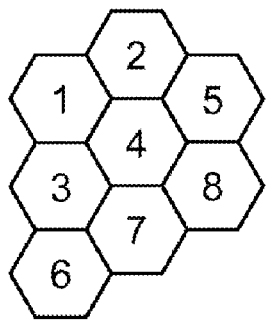
Cell Location from Beam#1 at 8 different Time intervals in the beam hopping Frame
FIG. 18B         1810
| Dwell Time # | qj, # slots Assigned | Area Capacity, Mbps |
|---|---|---|
| 1 | 16 | 2250 |
| 2 | 1 | 141 |
| 3 | 2 | 281 |
| 4 | 3 | 422 |
| 5 | 2 | 281 |
| 6 | 5 | 703 |
| 7 | 1 | 141 |
| 8 | 2 | 281 |
| Total | 32 | 4500 |
FIG. 18C         1820
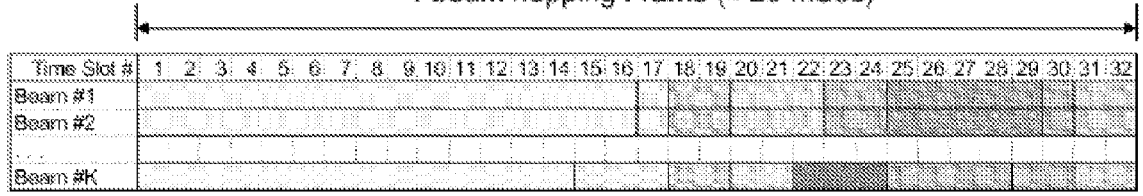

1910

| GW# | Location | # Beam Issues | Ci |
|---|---|---|---|
| 1 | Sanderson, TX | 0 | 8 |
| 2 | Ft. Hancock, TX | 2 | 6 |
| 3 | Amarillo, TX | 0 | 8 |
| 4 | Milford, UT | 0 | 8 |
| 5 | Ellis, KN | 0 | 8 |
| 6 | Lovelock, NV | 1 | 7 |
| 7 | Green River, WY | 0 | 8 |
| 8 | Boise, ID | 2 | 6 |
| 9 | Rapid City, SD | 1 | 7 |
| 10 | Bozeman, MT | 2 | 6 |
| 11 | Winnipeg, Canada | 0 | 8 |
| 12 | Duluth, Ml | 0 | 8 |
| 13 | Syracuse, NY | 2 | 6 |
| 14 | Little Rock, AK | 0 | 8 |
| 15 | St. Louis, MO | 1 | 7 |
| 16 | Louisville, KY | 1 | 7 |
| 17 | Kansas City, MO | 1 | 7 |
| 18 | Las Vegas, NV | 3 | 5 |
| 19 | Montreal | 0 | 8 |
| 20 | Eugene, OR | 0 | 8 |
| 21 | Jacksonville, FL | 0 | 8 |
| 22 | Savannah, GE | 0 | 8 |
| 23 | Des Moines, IO | 0 | 8 |
|  | Total |  | 168 |

1920

FLEXIBLE CAPACITY SATELLITE COMMUNICATIONS SYSTEM WITH DYNAMIC DISTRIBUTION AND COVERAGE AREAS

CROSS-REFERENCE TO RELATED APPLICATIONS

This application claims the benefit of priority under 35 U.S.C. §119(e) of U.S. Provisional Application Nos. 61/330, 377, filed on May 2, 2010, and 61/375,384, filed Aug. 20, 2010, both entitled "Flexible Capacity Communication Satellite System," and the entireties of both of which are herein incorporated by reference for all purposes.

FIELD OF THE INVENTION

The present invention relates generally to satellite communications systems. More particularly, the present invention relates to methods and systems for providing more flexible coverage areas and spatial capacity allocations using satellite communications systems.

BACKGROUND OF THE INVENTION

Legacy satellite communication systems have employed simple "bent-pipe" satellites that relay signals among terminals located in the same large antenna footprint, for example, the continental Unites States. Due to the overlap of transmit and receive coverage areas, separate frequency bands are used for the uplink (to the satellite) and the downlink (from the satellite). The "bent-pipe" designation refers to the fact that the relayed signals are effectively retransmitted after the signals are received by the satellite, as if redirected through a bent pipe. The data in the relayed signals is not demodulated or remodulated as in a "regenerative" or processing satellite architecture; signal manipulation on the satellite in a bent-pipe architecture is generally limited to functions such as frequency translation, filtering, amplification, and the like.

Later satellite communication systems were developed around satellites that employ innovations such as digital channelization and routing of signals, demodulation/routing/re-modulation of the data in the relayed signals, narrow antenna footprint "spot" beams to allow frequency reuse, and phased array antennas to allow dynamic placement of coverage areas.

For example, satellites for Mobile Satellite Services (MSS) typically employ spot beam coverage areas with a high degree of frequency reuse. Examples of satellites for MSS include the Inmarsat-4 satellites and the Thuraya satellites. These satellites typically feature a large number of small spot beams covering a large composite area and allow for flexible and configurable allocation of bandwidth. However, the total system bandwidth is very low (such as a 34 MHz allocation at L-band), and service is generally categorized as "narrow band" (e.g., carrier bandwidths of hundreds of kHz), which allows the flexible and configurable bandwidth allocation to be done using digital beamforming techniques. These satellites use a large reflector with an active feed array. The signals from each feed element are digitized, and the beamforming and bandwidth flexibility are provided by a digital signal processor. The digital beamforming is performed on narrowband channels, allowing any narrowband channel on the feeder link to be placed at any frequency for any spot (or other) beam shape.

The Wideband InterNetworking Engineering Test and Demonstration Satellite (WINDS) is an experimental Ka-band satellite system. The satellite implements both fixed spot beams using a fixed multi-beam antenna (MBA) and an active phased array antenna (APAA). The MBA serves fixed beams, and the communications link can be switched over time in a pattern consisting of combinations of receiving and transmitting beams. The APAA has been developed as a beam-hopping antenna with a potential service area that covers almost the entire visible region of earth from the satellite. The APAA can provision communications between arbitrary users using two independently steerable beams for each of the transmitting and receiving antennas. Beam steering is achieved by updating pointing directions via control of digital phase shifters in switching interval slots as short as 2 ms in Satellite Switched Time Division Multiple Access (SS-TDMA) mode, where the shortest beam dwell time corresponds to the slot time of the SS-TDMA system. Beam switching at high speed is supported for up to eight locations per beam. Switching patterns for both the MBA and APAA are uploaded from a network management center.

Spaceway is a Ka-band satellite system that services 112 uplink beams and nearly 800 downlink beams over the United States. The Spaceway satellite uses a regenerative on-board satellite processor to route data packets from one of 112 uplink beams to one of nearly 800 possible downlink beams. At any time the downlink consists of up to 24 hopping beams. The downlink scheduler determines which beams should be transmitting bursts for each downlink timeslot depending on each beams downlink traffic queue and power and interference constraints.

The Wideband Global SATCOM (WGS) satellite, formerly known as the Wideband Gapfiller Satellite, is a U.S. government satellite that employs steerable Ka-band spot beams and X-band beamforming. The Ka-band spot beams are mechanically steered. Up to eight X-band beams are formed by the transmit and receive X-band arrays using programmable amplitude and phase adjustments applied to beamforming modules (BFMs) in each antenna element. Bandwidth assignment is flexible and configurable using a broadband digital channelizer, which is not involved in beamforming.

More recent satellite architectures have resulted in further dramatic increases in system capacity. For example, ViaSat-1 and the Ka-band spot beam satellite architectures disclosed in Dankberg et al. U.S. Pat. App. Pub. No. 2009-0298416, which is incorporated by reference herein in its entirety, can provide over 150 Gbps of physical layer capacity. This spot beam architecture provides over an order of magnitude capacity increase over prior Ka-band satellites. Other satellites, for example KA-SAT and Jupiter, use similar architectures to achieve similarly high capacities. The architecture used in all of these satellites is a "bent pipe" hub-spoke architecture that includes small spot beams targeted at fixed locations. Each spot beam may use a large amount of spectrum, typically 250-1000 MHz. The resulting large capacity is a product of several characteristics of the satellite system, including, for example, (a) the large number of spot beams, typically 60 to 80 or more, (b) the high antenna directivity associated with the spot beams (resulting in, for example, advantageous link budgets), and (c) the relatively large amount of bandwidth used within each spot beam.

The aforementioned high capacity satellite architectures are extremely valuable, but may still be limited in certain respects. For example, scaling the architecture to support higher capacities while maintaining the same spectrum allocation and power budget is typically accomplished using larger reflectors to create spot beams with smaller diameters.

The use of smaller diameter spot beams may increase the directivity (or gain) of the satellite antenna, thus enhancing the link signal-to-noise ratio (SNR) and capacity. However, the smaller beams necessarily reduce the coverage area (e.g., the area for which satellite service can be provided). These satellite architectures, therefore, have an inherent tradeoff of capacity versus coverage area.

In addition, these architectures typically place all spot beams, both user beams and gateway (GW) beams, in fixed locations. There is generally no ability to move the spot beams around to accommodate changes in the coverage area. Moreover, the architectures essentially provide uniformly distributed capacity over the coverage area. The capacity per spot beam, for example, is strongly related to the allocated bandwidth per spot beam, which is predetermined for every spot beam and allows for little to no flexibility or configurability.

Although these high capacity architectures are extremely valuable when the desired coverage area is well-known and the demand for capacity is approximately uniformly distributed over the coverage area, the inflexibility of the aforementioned architectures can be limiting for certain applications. What is needed, therefore, is a satellite system architecture that provides high capacity, large coverage areas, increased flexibility, for example, in the locations of the coverage areas and gateways and in the spatial distribution of the capacity, an ability to change coverage areas, gateway locations, and capacity allocation during the lifetime of the satellite, and a flexible design that could be useful in many orbit slots or allow moving the satellite to another orbit slot during the mission lifetime.

SUMMARY OF THE INVENTION

In view of the foregoing, a more flexible satellite communications system is provided. An example of a method for hub-spoke, bent-pipe satellite communication utilizing a satellite containing a plurality of pathways according to the disclosure includes: specifying a weight set and a beam hop frame definition for a beam hopping frame, the beam hopping frame comprising a plurality of timeslots, the specified weight set comprising a plurality of receive weight vectors and a plurality of transmit weight vectors for generating uplink beam signals and downlink beam signals in timeslots of the beam hopping frame, the specified beam hop frame definition defining a plurality of sequential dwell times and a plurality of pathway gains, each timeslot associated with a dwell time; and operating the satellite to generate the uplink beam signals and downlink beam signals for pathways in accordance with the specified weight set and the specified beam hop frame definition, wherein the specified weight set and the specified beam hop frame definition support an allocation of capacity between forward traffic, from at least one gateway to a plurality of terminals, and return traffic, from a plurality of terminals to at least one gateway.

Embodiments of such a method may include one or more of the following features. The specified weight set and the specified beam hop frame definition are a first weight set and a first beam hop frame definition supporting a first allocation of capacity between forward traffic and return traffic, and the method further includes specifying a second weight set and a second beam hop frame definition for a beam hopping frame; and switching from operation of the satellite in accordance with the first weight set and the first beam hop frame definition to operation of the satellite to generate the uplink beam signals and downlink beam signals for pathways in accordance with the specified second weight set and the specified second beam hop frame definition, wherein the specified second weight set and the specified second beam hop frame definition support a second allocation of capacity between forward traffic and return traffic. Specifying the weight set and the beam hop frame definition for the beam hopping frame includes configuring a first fraction of the plurality of pathways as dedicated forward pathways for all timeslots in the beam hopping frame and configuring a second fraction of the plurality of pathways as dedicated return pathways for all timeslots in the beam hopping frame. Specifying the weight set and the beam hop frame definition for the beam hopping frame includes, for at least one pathway of the plurality of pathways, configuring the pathway as a forward pathway for a first fraction of time in the beam hopping frame and configuring the pathway as a return pathway for a second fraction of time in the beam hopping frame. Specifying the weight set and the beam hop frame definition for the beam hopping frame includes: configuring at least one pathway of the plurality of pathways as a forward pathway for at least one timeslot in the beam hopping frame; and configuring at least one pathway of the plurality of pathways as a return pathway for at least one timeslot in the beam hopping frame, wherein configuring a pathway as a forward pathway comprises configuring the pathway for reception of a multiplexed signal from a gateway destined for a plurality of terminals, the plurality of terminals located in a respective forward link coverage area; configuring a pathway as a return pathway comprises configuring the pathway for reception of a composite signal derived from a plurality of terminals and destined for a gateway, the plurality of terminals located in a respective return link coverage area; a union of the forward link coverage areas of all the forward pathways during the beam hopping frame defines a total forward link coverage area; a union of the return link coverage areas of all the return pathways during the beam hopping frame defines a total return link coverage area; and the total forward link coverage area differs from the total return link coverage area. Specifying the weight set and the beam hop frame definition for the beam hopping frame includes configuring the pathways of the plurality of pathways such that each gateway transmits forward traffic on at least one forward pathway to a plurality of terminals and receives return traffic on at least one return pathway from the same plurality of terminals, implementing a one-to-one mapping between gateways and the pluralities of terminals the gateways service. Specifying the weight set and the beam hop frame definition for the beam hopping frame includes configuring the pathways of the plurality of pathways such that each gateway of a plurality of gateways operates half-duplex by transmitting forward traffic on at least one forward pathway to a respective plurality of terminals, and all pluralities of terminals transmit return traffic on return pathways to a same shared receive gateway.

An example of a method for hub-spoke, bent-pipe satellite communication utilizing a satellite containing a plurality of pathways, the method performed at the satellite, includes: obtaining a specified weight set and a specified beam hop frame definition for a beam hopping frame, the beam hopping frame comprising a plurality of timeslots, the specified weight set comprising a plurality of receive weight vectors and a plurality of transmit weight vectors for generating uplink beam signals and downlink beam signals in timeslots of the beam hopping frame, the specified beam hop frame definition defining a plurality of sequential dwell times and a plurality of pathway gains, each timeslot associated with a dwell time; generating a plurality of receive weights and a plurality of transmit weights in accordance with the specified weight set; setting the plurality of pathway gains in accordance with the specified beam hop frame definition; and generating the uplink beam signals and downlink beam signals for pathways using the plurality of receive weights, the plurality of pathway gains, and the plurality of transmit weights in accordance with the plurality of sequential dwell times defined by the specified beam hop frame definition, wherein the specified weight set and the specified beam hop frame definition support an allocation of capacity between forward traffic, from at least one gateway to a plurality of terminals, and return traffic, from a plurality of terminals to at least one gateway.

Embodiments of such a method may include one or more of the following features. The specified weight set and the specified beam hop frame definition are a first weight set and a first beam hop frame definition supporting a first allocation of capacity between forward traffic and return traffic, the first weight set comprising a first plurality of receive weight vectors and a first plurality of transmit weight vectors, the specified first beam hop frame definition defining a first plurality of sequential dwell times and a first plurality of pathway gains, and the method further includes: obtaining a specified second weight set and a specified second beam hop frame definition for a beam hopping frame, the specified second weight set comprising a second plurality of receive weight vectors and a second plurality of transmit weight vectors for generating uplink beam signals and downlink beam signals in timeslots of the beam hopping frame, the specified second beam hop frame definition defining a second plurality of sequential dwell times and a second plurality of pathway gains; generating a second plurality of receive weights and a second plurality of transmit weights in accordance with the specified second weight set; setting the second plurality of pathway gains in accordance with the specified second beam hop frame definition; and switching generation of the uplink beam signals and downlink beam signals for pathways using the first plurality of receive weights, the first plurality of pathway gains, and the first plurality of transmit weights in accordance with the first plurality of sequential dwell times to generation of the uplink beam signals and downlink beam signals for pathways using the second plurality of receive weights, the second plurality of pathway gains, and the second plurality of transmit weights in accordance with the second plurality of sequential dwell times defined by the specified second beam hop frame definition, wherein the specified second weight set and the specified second beam hop frame definition support a second allocation of capacity between forward traffic and return traffic. The specified weight set and the specified beam hop frame definition specifies configuration of a first fraction of the plurality of pathways as dedicated forward pathways for all timeslots in the beam hopping frame and configuration of a second fraction of the plurality of pathways as dedicated return pathways for all timeslots in the beam hopping frame. The specified weight set and the specified beam hop frame definition specifies, for at least one pathway of the plurality of pathways, configuration of the pathway as a forward pathway for a first fraction of time in the beam hopping frame and configuration of the pathway as a return pathway for a second fraction of time in the beam hopping frame. The specified weight set and the specified beam hop frame definition specifies configuration of at least one pathway of the plurality of pathways as a forward pathway for at least one timeslot in the beam hopping frame, and configuration of at least one pathway of the plurality of pathways as a return pathway for at least one timeslot in the beam hopping frame, wherein configuring a pathway as a forward pathway comprises configuring the pathway for reception of a multiplexed signal from a gateway destined for a plurality of terminals, the plurality of terminals located in a respective forward link coverage area; configuring a pathway as a return pathway comprises configuring the pathway for reception of a composite signal derived from a plurality of terminals and destined for a gateway, the plurality of terminals located in a respective return link coverage area; a union of the forward link coverage areas of all the forward pathways during the beam hopping frame defines a total forward link coverage area; a union of the return link coverage areas of all the return pathways during the beam hopping frame defines a total return link coverage area; and the total forward link coverage area differs from the total return link coverage area. The specified weight set and the specified beam hop frame definition specifies configuration of the pathways of the plurality of pathways such that each gateway transmits forward traffic on at least one forward pathway to a plurality of terminals and receives return traffic on at least one return pathway from the same plurality of terminals, implementing a one-to-one mapping between gateways and the pluralities of terminals the gateways service. The specified weight set and the specified beam hop frame definition specifies configuration of the pathways of the plurality of pathways such that each gateway of a plurality of gateways operates half-duplex by transmitting forward traffic on at least one forward pathway to a respective plurality of terminals, and all pluralities of terminals transmit return traffic on return pathways to a same shared receive gateway.

An example of a hub-spoke, bent-pipe satellite communications system includes: a plurality of terminals; a plurality of gateways configured to communicate with the plurality of terminals; a controller configured to: specify a weight set and a beam hop frame definition for a beam hopping frame, the beam hopping frame comprising a plurality of timeslots, the specified weight set comprising a plurality of receive weight vectors and a plurality of transmit weight vectors for generating uplink beam signals and downlink beam signals in timeslots of the beam hopping frame, the specified beam hop frame definition defining a plurality of sequential dwell times and a plurality of pathway gains, each timeslot associated with a dwell time; and a satellite containing a plurality of pathways, the satellite configured to: obtain the specified weight set and the specified beam hop frame definition for a beam hopping frame; generate a plurality of receive weights and a plurality of transmit weights in accordance with the specified weight set; set the plurality of pathway gains in accordance with the specified beam hop frame definition; and generate the uplink beam signals and downlink beam signals for pathways using the plurality of receive weights, the plurality of pathway gains, and the plurality of transmit weights in accordance with the plurality of sequential dwell times defined by the specified beam hop frame definition, wherein the specified weight set and the specified beam hop frame definition support an allocation of capacity between forward traffic, from at least one gateway to a plurality of terminals, and return traffic, from a plurality of terminals to at least one gateway.

Embodiments of such a system may include one or more of the following features. The specified weight set and the specified beam hop frame definition are a first weight set and a first beam hop frame definition supporting a first allocation of capacity between forward traffic and return traffic, the first weight set comprising a first plurality of receive weight vectors and a first plurality of transmit weight vectors, the specified first beam hop frame definition defining a first plurality of sequential dwell times and a first plurality of pathway gains; the controller is further configured to: specify a second weight set and a second beam hop frame definition for a beam hopping frame, the specified second weight set comprising a second plurality of receive weight vectors and a second plurality of transmit weight vectors for generating uplink beam signals and downlink beam signals in timeslots of the beam hopping frame, the specified second beam hop frame definition defining a second plurality of sequential dwell times and a second plurality of pathway gains; the satellite is further configured to: obtain the specified second weight set and the specified second beam hop frame definition for a beam hopping frame; generate a second plurality of receive weights and a second plurality of transmit weights in accordance with the specified second weight set; set the second plurality of pathway gains in accordance with the specified second beam hop frame definition; and switch generation of the uplink beam signals and downlink beam signals for pathways using the first plurality of receive weights, the first plurality of pathway gains, and the first plurality of transmit weights in accordance with the first plurality of sequential dwell times to generation of the uplink beam signals and downlink beam signals for pathways using the second plurality of receive weights, the second plurality of pathway gains, and the second plurality of transmit weights in accordance with the second plurality of sequential dwell times defined by the specified second beam hop frame definition; and the specified second weight set and the specified second beam hop frame definition support a second allocation of capacity between forward traffic and return traffic. Specifying the weight set and the beam hop frame definition for the beam hopping frame includes configuring a first fraction of the plurality of pathways as dedicated forward pathways for all timeslots in the beam hopping frame and configuring a second fraction of the plurality of pathways as dedicated return pathways for all timeslots in the beam hopping frame. Specifying the weight set and the beam hop frame definition for the beam hopping frame includes, for at least one pathway of the plurality of pathways, configuring the pathway as a forward pathway for a first fraction of time in the beam hopping frame and configuring the pathway as a return pathway for a second fraction of time in the beam hopping frame. Specifying the weight set and the beam hop frame definition for the beam hopping frame includes: configuring at least one pathway of the plurality of pathways as a forward pathway for at least one timeslot in the beam hopping frame; and configuring at least one pathway of the plurality of pathways as a return pathway for at least one timeslot in the beam hopping frame, wherein configuring a pathway as a forward pathway comprises configuring the pathway for reception of a multiplexed signal from a gateway destined for a plurality of terminals, the plurality of terminals located in a respective forward link coverage area; configuring a pathway as a return pathway comprises configuring the pathway for reception of a composite signal derived from a plurality of terminals and destined for a gateway, the plurality of terminals located in a respective return link coverage area; a union of the forward link coverage areas of all the forward pathways during the beam hopping frame defines a total forward link coverage area; a union of the return link coverage areas of all the return pathways during the beam hopping frame defines a total return link coverage area; and the total forward link coverage area differs from the total return link coverage area. Specifying the weight set and the beam hop frame definition for the beam hopping frame includes configuring the pathways of the plurality of pathways such that each gateway transmits forward traffic on at least one forward pathway to a plurality of terminals and receives return traffic on at least one return pathway from the same plurality of terminals, implementing a one-to-one mapping between gateways and the pluralities of terminals the gateways service. Specifying the weight set and the beam hop frame definition for the beam hopping frame includes configuring the pathways of the plurality of pathways such that each gateway of a plurality of gateways operates half-duplex by transmitting forward traffic on at least one forward pathway to a respective plurality of terminals, and all pluralities of terminals transmit return traffic on return pathways to a same shared receive gateway. The controller is a ground terminal of the hub-spoke, bent-pipe satellite communications system.

An example of a satellite for hub-spoke, bent-pipe satellite communication, the satellite containing a plurality of pathways, includes: one or more processors configured to: obtain a specified weight set and a specified beam hop frame definition for a beam hopping frame, the beam hopping frame comprising a plurality of timeslots, the specified weight set comprising a plurality of receive weight vectors and a plurality of transmit weight vectors for generating uplink beam signals and downlink beam signals in timeslots of the beam hopping frame, the specified beam hop frame definition defining a plurality of sequential dwell times and a plurality of pathway gains, each timeslot associated with a dwell time; generate a plurality of receive weights and a plurality of transmit weights in accordance with the specified weight set; and set the plurality of pathway gains in accordance with the specified beam hop frame definition; and one or more beam forming networks configured to: generate the uplink beam signals and downlink beam signals for pathways using the plurality of receive weights, the plurality of pathway gains, and the plurality of transmit weights in accordance with the plurality of sequential dwell times defined by the specified beam hop frame definition, wherein the specified weight set and the specified beam hop frame definition support an allocation of capacity between forward traffic, from at least one gateway to a plurality of terminals, and return traffic, from a plurality of terminals to at least one gateway.

Embodiments of such a satellite may include one or more of the following features. The specified weight set and the specified beam hop frame definition are a first weight set and a first beam hop frame definition supporting a first allocation of capacity between forward traffic and return traffic, the first weight set comprising a first plurality of receive weight vectors and a first plurality of transmit weight vectors, the specified first beam hop frame definition defining a first plurality of sequential dwell times and a first plurality of pathway gains; the one or more processors are further configured to: obtain a specified second weight set and a specified second beam hop frame definition for a beam hopping frame, the specified second weight set comprising a second plurality of receive weight vectors and a second plurality of transmit weight vectors for generating uplink beam signals and downlink beam signals in timeslots of the beam hopping frame, the specified second beam hop frame definition defining a second plurality of sequential dwell times and a second plurality of pathway gains; generate a second plurality of receive weights and a second plurality of transmit weights in accordance with the specified second weight set; and set the second plurality of pathway gains in accordance with the specified second beam hop frame definition; and the one or more beam forming networks are further configured to: switch generation of the uplink beam signals and downlink beam signals for pathways using the first plurality of receive weights, the first plurality of pathway gains, and the first plurality of transmit weights in accordance with the first plurality of sequential dwell times to generation of the uplink beam signals and downlink beam signals for pathways using the second plurality of receive weights, the second plurality of pathway gains, and the second plurality of transmit weights in accordance with the second plurality of sequential dwell times defined by the specified second beam hop frame definition, wherein the specified second weight set and the specified second beam hop frame definition support a second allocation of capacity between forward traffic and return traffic. The specified weight set and the specified beam hop frame definition specifies configuration of a first fraction of the plurality of pathways as dedicated forward pathways for all timeslots in the beam hopping frame and configuration of a second fraction of the plurality of pathways as dedicated return pathways for all timeslots in the beam hopping frame. The specified weight set and the specified beam hop frame definition specifies, for at least one pathway of the plurality of pathways, configuration of the pathway as a forward pathway for a first fraction of time in the beam hopping frame and configuration of the pathway as a return pathway for a second fraction of time in the beam hopping frame. The specified weight set and the specified beam hop frame definition specifies configuration of at least one pathway of the plurality of pathways as a forward pathway for at least one timeslot in the beam hopping frame, and configuration of at least one pathway of the plurality of pathways as a return pathway for at least one timeslot in the beam hopping frame, wherein configuring a pathway as a forward pathway comprises configuring the pathway for reception of a multiplexed signal from a gateway destined for a plurality of terminals, the plurality of terminals located in a respective forward link coverage area; configuring a pathway as a return pathway comprises configuring the pathway for reception of a composite signal derived from a plurality of terminals and destined for a gateway, the plurality of terminals located in a respective return link coverage area; a union of the forward link coverage areas of all the forward pathways during the beam hopping frame defines a total forward link coverage area; a union of the return link coverage areas of all the return pathways during the beam hopping frame defines a total return link coverage area; and the total forward link coverage area differs from the total return link coverage area. The specified weight set and the specified beam hop frame definition specifies configuration of the pathways of the plurality of pathways such that each gateway transmits forward traffic on at least one forward pathway to a plurality of terminals and receives return traffic on at least one return pathway from the same plurality of terminals, implementing a one-to-one mapping between gateways and the pluralities of terminals the gateways service. The specified weight set and the specified beam hop frame definition specifies configuration of the pathways of the plurality of pathways such that each gateway of a plurality of gateways operates half-duplex by transmitting forward traffic on at least one forward pathway to a respective plurality of terminals, and all pluralities of terminals transmit return traffic on return pathways to a same shared receive gateway.

An example of a method for hub-spoke, bent-pipe satellite communication utilizing a satellite containing a plurality of pathways includes: specifying a first weight set and a first beam hop frame definition for a beam hopping frame, the beam hopping frame comprising a plurality of timeslots, the specified first weight set comprising a first plurality of receive weight vectors and a first plurality of transmit weight vectors for generating uplink beam signals and downlink beam signals in timeslots of the beam hopping frame, the specified first beam hop frame definition defining a first plurality of sequential dwell times and a first plurality of pathway gains, each timeslot associated with a dwell time; operating the satellite to generate the uplink beam signals and downlink beam signals for pathways in accordance with the specified first weight set and the specified first beam hop frame definition; specifying a second weight set and a second beam hop frame definition for a beam hopping frame, the specified second weight set comprising a second plurality of receive weight vectors and a second plurality of transmit weight vectors for generating uplink beam signals and downlink beam signals in timeslots of the beam hopping frame, the specified second beam hop frame definition defining a second plurality of sequential dwell times and a second plurality of pathway gains; and switching from operation of the satellite in accordance with the specified first weight set and the specified first beam hop frame definition to operation of the satellite to generate the uplink beam signals and downlink beam signals for pathways in accordance with the specified second weight set and the specified second beam hop frame definition, wherein the specified first weight set and the specified first beam hop frame definition support first targets of coverage area and capacity allocation based on a first time-based traffic estimate, and the specified second weight set and the specified second beam hop frame definition support second targets of coverage area and capacity allocation based on a second time-based traffic estimate.

Embodiments of such a method may include the following feature. The method further includes: pre-computing and uploading to the satellite for storage a plurality of weight sets, including the first weight set and the second weight set, and a plurality of beam hop frame definitions, including the first beam hop frame definition and the second beam hop frame definition, wherein switching comprises switching by the satellite in response to receiving a command transmitted from a ground entity.

An example of a method for hub-spoke, bent-pipe satellite communication utilizing a satellite containing a plurality of pathways, the method performed at the satellite, includes: obtaining a first weight set and a first beam hop frame definition for a beam hopping frame, the beam hopping frame comprising a plurality of timeslots, the specified first weight set comprising a first plurality of receive weight vectors and a first plurality of transmit weight vectors for generating uplink beam signals and downlink beam signals in timeslots of the beam hopping frame, the specified first beam hop frame definition defining a first plurality of sequential dwell times and a first plurality of pathway gains, each timeslot associated with a dwell time; generating a plurality of receive weights and a plurality of transmit weights in accordance with the specified weight set; setting the plurality of pathway gains in accordance with the specified beam hop frame definition; generating the uplink beam signals and downlink beam signals for pathways using the plurality of receive weights, the plurality of pathway gains, and the plurality of transmit weights in accordance with the plurality of sequential dwell times defined by the specified beam hop frame definition; obtaining a second weight set and a second beam hop frame definition for a beam hopping frame, the specified second weight set comprising a second plurality of receive weight vectors and a second plurality of transmit weight vectors for generating uplink beam signals and downlink beam signals in timeslots of the beam hopping frame, the specified second beam hop frame definition defining a second plurality of sequential dwell times and a second plurality of pathway gains; generating a second plurality of receive weights and a second plurality of transmit weights in accordance with the specified second weight set; setting the second plurality of pathway gains in accordance with the specified second beam hop frame definition; and switching generation of the uplink beam signals and downlink beam signals for pathways using the first plurality of receive weights, the first plurality of pathway gains, and the first plurality of transmit weights in accordance with the first plurality of sequential dwell times to generation of the uplink beam signals and downlink beam signals for pathways using the second plurality of receive weights, the second plurality of pathway gains, and the second plurality of transmit weights in accordance with the second plurality of sequential dwell times defined by the specified second beam hop frame definition, wherein the specified first weight set and the specified first beam hop frame definition support first targets of coverage area and capacity allocation based on a first time-based traffic estimate, and the specified second weight set and the specified second beam hop frame definition support second targets of coverage area and capacity allocation based on a second time-based traffic estimate.

Embodiments of such a method may include the following feature. The method further includes: receiving and storing a plurality of weight sets, including the first weight set and the second weight set, and a plurality of beam hop frame definitions, including the first beam hop frame definition and the second beam hop frame definition, the plurality of weight sets and the plurality of beam hop frame definitions pre-computed and uploaded to the satellite; and receiving a command transmitted from a ground entity, wherein switching is in response to receiving the command.

An example of a hub-spoke, bent-pipe satellite communications system includes: a plurality of terminals; a plurality of gateways configured to communicate with the plurality of terminals; a controller configured to: specify a first weight set and a first beam hop frame definition for a beam hopping frame, the beam hopping frame comprising a plurality of timeslots, the specified first weight set comprising a first plurality of receive weight vectors and a first plurality of transmit weight vectors for generating uplink beam signals and downlink beam signals in timeslots of the beam hopping frame, the specified first beam hop frame definition defining a first plurality of sequential dwell times and a first plurality of pathway gains, each timeslot associated with a dwell time; and specify a second weight set and a second beam hop frame definition for a beam hopping frame, the specified second weight set comprising a second plurality of receive weight vectors and a second plurality of transmit weight vectors for generating uplink beam signals and downlink beam signals in timeslots of the beam hopping frame, the specified second beam hop frame definition defining a second plurality of sequential dwell times and a second plurality of pathway gains; and a satellite containing a plurality of pathways, the satellite configured to: obtain the specified first weight set and the specified first beam hop frame definition for a beam hopping frame; generate a first plurality of receive weights and a first plurality of transmit weights in accordance with the specified first weight set; set the first plurality of pathway gains in accordance with the specified first beam hop frame definition; generate the uplink beam signals and downlink beam signals for pathways using the first plurality of receive weights, the first plurality of pathway gains, and the first plurality of transmit weights in accordance with the first plurality of sequential dwell times defined by the specified first beam hop frame definition; obtain the specified second weight set and the specified second beam hop frame definition for a beam hopping frame; generate a second plurality of receive weights and a second plurality of transmit weights in accordance with the specified second weight set; set the second plurality of pathway gains in accordance with the specified second beam hop frame definition; and switch generation of the uplink beam signals and downlink beam signals for pathways using the first plurality of receive weights, the first plurality of pathway gains, and the first plurality of transmit weights in accordance with the first plurality of sequential dwell times to generation of the uplink beam signals and downlink beam signals for pathways using the second plurality of receive weights, the second plurality of pathway gains, and the second plurality of transmit weights in accordance with the second plurality of sequential dwell times defined by the specified second beam hop frame definition, wherein the specified first weight set and the specified first beam hop frame definition support first targets of coverage area and capacity allocation based on a first time-based traffic estimate, and the specified second weight set and the specified second beam hop frame definition support second targets of coverage area and capacity allocation based on a second time-based traffic estimate.

Embodiments of such a system may include the following feature. The controller is further configured to pre-compute and upload to the satellite for storage a plurality of weight sets, including the first weight set and the second weight set, and a plurality of beam hop frame definitions, including the first beam hop frame definition and the second beam hop frame definition; and the satellite is configured to switch in response to receiving a command transmitted from a ground entity.

An example of a satellite for hub-spoke, bent-pipe satellite communication, the satellite containing a plurality of pathways, includes: one or more processors configured to: obtain a first weight set and a first beam hop frame definition for a beam hopping frame, the beam hopping frame comprising a plurality of timeslots, the specified first weight set comprising a first plurality of receive weight vectors and a first plurality of transmit weight vectors for generating uplink beam signals and downlink beam signals in timeslots of the beam hopping frame, the specified first beam hop frame definition defining a first plurality of sequential dwell times and a first plurality of pathway gains, each timeslot associated with a dwell time; generate a plurality of receive weights and a plurality of transmit weights in accordance with the specified weight set; set the plurality of pathway gains in accordance with the specified beam hop frame definition; obtain a second weight set and a second beam hop frame definition for a beam hopping frame, the specified second weight set comprising a second plurality of receive weight vectors and a second plurality of transmit weight vectors for generating uplink beam signals and downlink beam signals in timeslots of the beam hopping frame, the specified second beam hop frame definition defining a second plurality of sequential dwell times and a second plurality of pathway gains; generate a second plurality of receive weights and a second plurality of transmit weights in accordance with the specified second weight set; and set the second plurality of pathway gains in accordance with the specified second beam hop frame definition; and one or more beam forming networks configured to: generate the uplink beam signals and downlink beam signals for pathways using the plurality of receive weights, the plurality of pathway gains, and the plurality of transmit weights in accordance with the plurality of sequential dwell times defined by the specified beam hop frame definition; and switch generation of the uplink beam signals and downlink beam signals for pathways using the first plurality of receive weights, the first plurality of pathway gains, and the first plurality of transmit weights in accordance with the first plurality of sequential dwell times to generation of the uplink beam signals and downlink beam signals for pathways using the second plurality of receive weights, the second plurality of pathway gains, and the second plurality of transmit weights in accordance with the second plurality of sequential dwell times defined by the specified second beam hop frame definition, wherein the specified first weight set and the specified first beam hop frame definition support first targets of coverage area and capacity allocation based on a first time-based traffic estimate, and the specified second weight set and the specified second beam hop frame definition support second targets of coverage area and capacity allocation based on a second time-based traffic estimate.

Embodiments of such a satellite may include the following feature. The one or more processors are further configured to: receive and store a plurality of weight sets, including the first weight set and the second weight set, and a plurality of beam hop frame definitions, including the first beam hop frame definition and the second beam hop frame definition, the plurality of weight sets and the plurality of beam hop frame definitions pre-computed and uploaded to the satellite; and receive a command transmitted from a ground entity, wherein the one or more beam forming networks are configured to switch in response to receipt of the command.

An example of a method for hub-spoke, bent-pipe satellite communication including, performing at a satellite: creating, at a satellite-based phased array receive antenna and during a first timeslot dwell time, a first timeslot uplink beam signal, the first timeslot uplink beam signal associated with a first receive coverage area; generating, at a satellite-based phased array transmit antenna and during the first timeslot dwell time, a first timeslot downlink beam signal, the first timeslot downlink beam signal derived from the first timeslot uplink beam signal using a bent-pipe pathway through the satellite, and the first timeslot downlink beam signal further associated with a first transmit coverage area, wherein, during the first timeslot dwell time, the first timeslot uplink beam signal comprises either: (a) a first multiplexed signal from a first gateway destined for a first plurality of terminals, in which case the first gateway is located in the first receive coverage area and the first plurality of terminals is located in the first transmit coverage area, or (b) a first composite signal derived from the first plurality of terminals and destined for the first gateway, in which case the first plurality of terminals is located in the first receive coverage area and the first gateway is located in the first transmit coverage area; creating, at the satellite-based phased array receive antenna and during a second timeslot dwell time, a second timeslot uplink beam signal, the second timeslot uplink beam signal associated with a second receive coverage area; and generating, at the satellite-based phased array transmit antenna and during the second timeslot dwell time, a second timeslot downlink beam signal, the second timeslot downlink beam signal derived from the second timeslot uplink beam signal using the bent-pipe pathway through the satellite, and the second timeslot downlink beam signal further associated with a second transmit coverage area, wherein, during the second timeslot dwell time, the second timeslot uplink beam signal comprises either: (a) a second multiplexed signal from a second gateway destined for a second plurality of terminals, in which case the second gateway is located in the second receive coverage area and the second plurality of terminals is located in the second transmit coverage area, or (b) a second composite signal derived from the second plurality of terminals and destined for the second gateway, in which case the second plurality of terminals is located in the second receive coverage area and the second gateway is located in the second transmit coverage area.

Embodiments of such a method may include one or more of the following features. The first gateway differs from the second gateway. The first plurality of terminals differs from the second plurality of terminals. Each of the first multiplexed signal and the second multiplexed signal use a multiplexing scheme selected from the group comprising MF-TDM, TDM, FDM, OFDM, and CDM. Each of the first composite signal and the second composite signal is a multiple access composite signal created using a multiple access scheme selected from the group comprising MF-TDMA, TDMA, FDMA, OFDMA, and CDMA. The method further includes: selecting a beam hop frame definition comprising a plurality of sequential beam hop timeslot definitions, each beam hop timeslot definition associated with a respective timeslot dwell time and comprising respective beam forming weight representations indicative of a transmit coverage area and a receive coverage area; reading, from the selected beam hop frame definition, a current beam hop timeslot definition of the plurality of sequential beam hop timeslot definitions, the current beam hop timeslot definition associated with the first timeslot dwell time; determining, from the current beam hop timeslot definition, whether a communication received during the first timeslot dwell time of the current beam hop timeslot definition corresponds to a forward link or a return link; in response to determining that the communication corresponds to a forward link, selecting a selectable gain control for the forward link; and in response to determining that the communication corresponds to a return link, selecting a selectable gain control for the return link, wherein generating the first timeslot downlink beam signal includes deriving the first timeslot downlink beam signal from the first timeslot uplink beam signal after application of a channel amplifier gain based on the selected selectable gain control.

An example of a satellite for hub-spoke, bent-pipe communication includes: a satellite-based phased array receive antenna configured to: create, during a first timeslot dwell time, a first timeslot uplink beam signal, the first timeslot uplink beam signal associated with a first receive coverage area, and create, during a second timeslot dwell time, a second timeslot uplink beam signal, the second timeslot uplink beam signal associated with a second receive coverage area; and a satellite-based phased array transmit antenna configured to: generate, during the first timeslot dwell time, a first timeslot downlink beam signal, the first timeslot downlink beam signal derived from the first timeslot uplink beam signal using a bent-pipe pathway through the satellite, and the first timeslot downlink beam signal further associated with a first transmit coverage area, and generate, during the second timeslot dwell time, a second timeslot downlink beam signal, the second timeslot downlink beam signal derived from the second timeslot uplink beam signal using the bent-pipe pathway through the satellite, and the second timeslot downlink beam signal further associated with a second transmit coverage area, wherein, during the first timeslot dwell time, the first timeslot uplink beam signal comprises either: (a) a first multiplexed signal from a first gateway destined for a first plurality of terminals, in which case the first gateway is located in the first receive coverage area and the first plurality of terminals is located in the first transmit coverage area, or (b) a first composite signal derived from the first plurality of terminals and destined for the first gateway, in which case the first plurality of terminals is located in the first receive coverage area and the first gateway is located in the first transmit coverage area; and wherein, during the second timeslot dwell time, the second timeslot uplink beam signal comprises either: (a) a second multiplexed signal from a second gateway destined for a second plurality of terminals, in which case the second gateway is located in the second receive coverage area and the second plurality of terminals is located in the second transmit coverage area, or (b) a second composite signal derived from the second plurality of terminals and destined for the second gateway, in which case the second plurality of terminals is located in the second receive coverage area and the second gateway is located in the second transmit coverage area.

Embodiments of such a satellite may include one or more of the following features. The first gateway differs from the second gateway. The first plurality of terminals differs from the second plurality of terminals. Each of the first multiplexed signal and the second multiplexed signal use a multiplexing scheme selected from the group comprising MF-TDM, TDM, FDM, OFDM, and CDM. Each of the first composite signal and the second composite signal is a multiple access composite signal created using a multiple access scheme selected from the group comprising MF-TDMA, TDMA, FDMA, OFDMA, and CDMA. The satellite further includes: a beam weight processor configured to: select a beam hop frame definition comprising a plurality of sequential beam hop timeslot definitions, each beam hop timeslot definition associated with a respective timeslot dwell time and comprising respective beam forming weight representations indicative of a transmit coverage area and a receive coverage area; read, from the selected beam hop frame definition, a current beam hop timeslot definition of the plurality of sequential beam hop timeslot definitions, the current beam hop timeslot definition associated with the first timeslot dwell time; and determine, from the current beam hop timeslot definition, whether a communication received during the first timeslot dwell time of the current beam hop timeslot definition corresponds to a forward link or a return link; and a processor configured to: in response to the beam weight processor determining that the communication corresponds to a forward link, select a selectable gain control for the forward link; and in response to the beam weight processor determining that the communication corresponds to a return link, select a selectable gain control for the return link, wherein the satellite-based phased array transmit antenna is configured to derive the first timeslot downlink beam signal from the first timeslot uplink beam signal after application of a channel amplifier gain based on the selected selectable gain control.

An example of a method for hub-spoke, bent-pipe satellite communication includes: sending signals between at least one terminal and at least one gateway via a satellite during a first timeslot dwell time and a second timeslot dwell time, wherein sending of signals between the at least one terminal and the at least one gateway comprises: creating, at a satellite-based phased array receive antenna and during the first timeslot dwell time, a first timeslot uplink beam signal, the first timeslot uplink beam signal associated with a first receive coverage area; generating, at a satellite-based phased array transmit antenna and during the first timeslot dwell time, a first timeslot downlink beam signal, the first timeslot downlink beam signal derived from the first timeslot uplink beam signal using a bent-pipe pathway through the satellite, and the first timeslot downlink beam signal further associated with a first transmit coverage area, wherein, during the first timeslot dwell time, the first timeslot uplink beam signal comprises either: (a) a first multiplexed signal from a first gateway destined for a first plurality of terminals, in which case the first gateway is located in the first receive coverage area and the first plurality of terminals is located in the first transmit coverage area, or (b) a first composite signal derived from the first plurality of terminals and destined for the first gateway, in which case the first plurality of terminals is located in the first receive coverage area and the first gateway is located in the first transmit coverage area; creating, at the satellite-based phased array receive antenna and during a second timeslot dwell time, a second timeslot uplink beam signal, the second timeslot uplink beam signal associated with a second receive coverage area; and generating, at the satellite-based phased array transmit antenna and during the second timeslot dwell time, a second timeslot downlink beam signal, the second timeslot downlink beam signal derived from the second timeslot uplink beam signal using the bent-pipe pathway through the satellite, and the second timeslot downlink beam signal further associated with a second transmit coverage area, wherein, during the second timeslot dwell time, the second timeslot uplink beam signal comprises either: (a) a second multiplexed signal from a second gateway destined for a second plurality of terminals, in which case the second gateway is located in the second receive coverage area and the second plurality of terminals is located in the second transmit coverage area, or (b) a second composite signal derived from the second plurality of terminals and destined for the second gateway, in which case the second plurality of terminals is located in the second receive coverage area and the second gateway is located in the second transmit coverage area.

Embodiments of such a system may include one or more of the following features. The first gateway differs from the second gateway. The first group of terminals differs from the second group of terminals. Each of the first multiplexed signal and the second multiplexed signal use a multiplexing scheme selected from the group comprising MF-TDM, TDM, FDM, OFDM, and CDM. Each of the first composite signal and the second composite signal is a multiple access composite signal created using a multiple access scheme selected from the group comprising MF-TDMA, TDMA, FDMA, OFDMA, and CDMA. The satellite is further configured to: select a beam hop frame definition comprising a plurality of sequential beam hop timeslot definitions, each beam hop timeslot definition associated with a respective timeslot dwell time and comprising respective beam forming weight representations indicative of a transmit coverage area and a receive coverage area; read, from the selected beam hop frame definition, a current beam hop timeslot definition of the plurality of sequential beam hop timeslot definitions, the current beam hop timeslot definition associated with the first timeslot dwell time; determine, from the current beam hop timeslot definition, whether the signals sent during the first timeslot dwell time of the current beam hop timeslot definition corresponds to a forward link or a return link; in response to determining that the signals sent correspond to a forward link, select a selectable gain control for the forward link; and in response to determining that the signals sent correspond to a return link, select a selectable gain control for the return link, wherein generating the first timeslot downlink beam signal includes deriving the first timeslot downlink beam signal from the first timeslot uplink beam signal after application of a channel amplifier gain based on the selected selectable gain control.

An example of a hub-spoke, bent-pipe satellite communications system includes: a plurality of terminals; a plurality of gateways configured to communicate with the plurality of terminals; and a satellite configured, during a first timeslot dwell time, to create a first timeslot uplink beam signal associated with a first receive coverage area and to generate a first timeslot downlink beam signal derived from the first timeslot uplink beam signal using a bent-pipe pathway through the satellite, the first timeslot downlink beam signal associated with a first transmit coverage area, the satellite further configured, during a second timeslot dwell time, to create a second timeslot uplink beam signal associated with a second receive coverage area and to generate a second timeslot downlink beam signal derived from the second timeslot uplink beam signal using the bent-pipe pathway through the satellite, the second timeslot downlink beam signal associated with a second transmit coverage area, wherein, during the first timeslot dwell time, the first timeslot uplink beam signal comprises either: (a) a first multiplexed signal from a first gateway of the plurality of gateways, the first multiplexed signal destined for a first group of terminals of the plurality of terminals, in which case the first gateway is located in the first receive coverage area and the first group of terminals is located in the first transmit coverage area, or (b) a first composite signal derived from the first group of terminals and destined for the first gateway, in which case the first group of terminals is located in the first receive coverage area and the first gateway is located in the first transmit coverage area; and wherein, during the second timeslot dwell time, the second timeslot uplink beam signal comprises either: (a) a second multiplexed signal from a second gateway of the plurality of gateways, the second multiplexed signal destined for a second group of terminals of the plurality of terminals, in which case the second gateway is located in the second receive coverage area and the second group of terminals is located in the second transmit coverage area, or (b) a second composite signal derived from the second group of terminals and destined for the second gateway, in which case the second group of terminals is located in the second receive coverage area and the second gateway is located in the second transmit coverage area.

Embodiments of such a system may include one or more of the following features. The first gateway differs from the second gateway. The first group of terminals differs from the second group of terminals. Each of the first multiplexed signal and the second multiplexed signal use a multiplexing scheme selected from the group comprising MF-TDM, TDM, FDM, OFDM, and CDM. Each of the first composite signal and the second composite signal is a multiple access composite signal created using a multiple access scheme selected from the group comprising MF-TDMA, TDMA, FDMA, OFDMA, and CDMA. The satellite is further configured to: select a beam hop frame definition comprising a plurality of sequential beam hop timeslot definitions, each beam hop timeslot definition associated with a respective timeslot dwell time and comprising respective beam forming weight representations indicative of a transmit coverage area and a receive coverage area; read, from the selected beam hop frame definition, a current beam hop timeslot definition of the plurality of sequential beam hop timeslot definitions, the current beam hop timeslot definition associated with the first timeslot dwell time; determine, from the current beam hop timeslot definition, whether a communication received during the first timeslot dwell time of the current beam hop timeslot definition corresponds to a forward link or a return link; in response to determining that the communication corresponds to a forward link, select a selectable gain control for the forward link; and in response to determining that the communication corresponds to a return link, select a selectable gain control for the return link, wherein generating the first timeslot downlink beam signal includes deriving the first timeslot downlink beam signal from the first timeslot uplink beam signal after application of a channel amplifier gain based on the selected selectable gain control.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label with a dash and a second label that distinguishes among the similar components. If only the first reference label is used in the specification, the description is applicable to any one of the similar components having the same reference label irrespective of the second reference label.

FIG. 8A shows a simplified subset of a timeslot pathway in accordance with an embodiment of the present invention;

FIG. 8B shows an illustrative timeslot definition table in accordance with an embodiment of the present invention;

FIG. 8C shows illustrative timeslot pathways according to the timeslot definition table of FIG. 8B in accordance with an embodiment of the present invention;

FIG. 12B shows an illustrative timeslot definition table and illustrative timeslot pathways in accordance with an embodiment of the present invention;

FIG. 13A shows an illustrative interleaved timeslot allocation in accordance with an embodiment of the present invention;

FIG. 13B shows an illustrative timeslot definition table and illustrative timeslot pathways in accordance with an embodiment of the present invention;

FIG. 14B shows an illustrative timeslot definition table and illustrative timeslot pathways in accordance with an embodiment of the present invention;

FIG. 15B shows an illustrative timeslot definition table and illustrative timeslot pathways in accordance with an embodiment of the present invention;

FIG. 18A shows an illustrative beam hop pattern of a single beam for the timeslot dwell times of a beam hopping frame in accordance with an embodiment of the present invention.

FIG. 18B shows an illustrative timeslot dwell time table in accordance with an embodiment of the present invention.

FIG. 18C shows an illustrative beam hopping frame in accordance with an embodiment of the present invention.

DETAILED DESCRIPTION OF THE INVENTION

The present invention provides a more flexible high-capacity satellite communications architecture. Phased arrays are used to target spot beams on desired coverage areas across a given system coverage geography (e.g., high population areas in North America). The spot beams (or pathways) may then quickly hop from location to location according to weight vectors of a weight set and beam hop timeslot definitions included in a beam hopping frame definition. The beam hopping timeslot definitions include associated dwell times and pathway gains for all beams during one timeslot. The beam hopping timeslot definitions included within a beam hopping frame definition may be automatically repeated until a new beam hopping frame definition is received or an interrupt is signaled, allowing for dynamic changes to the transmit and receive coverage area and beam locations.

Figure 1:
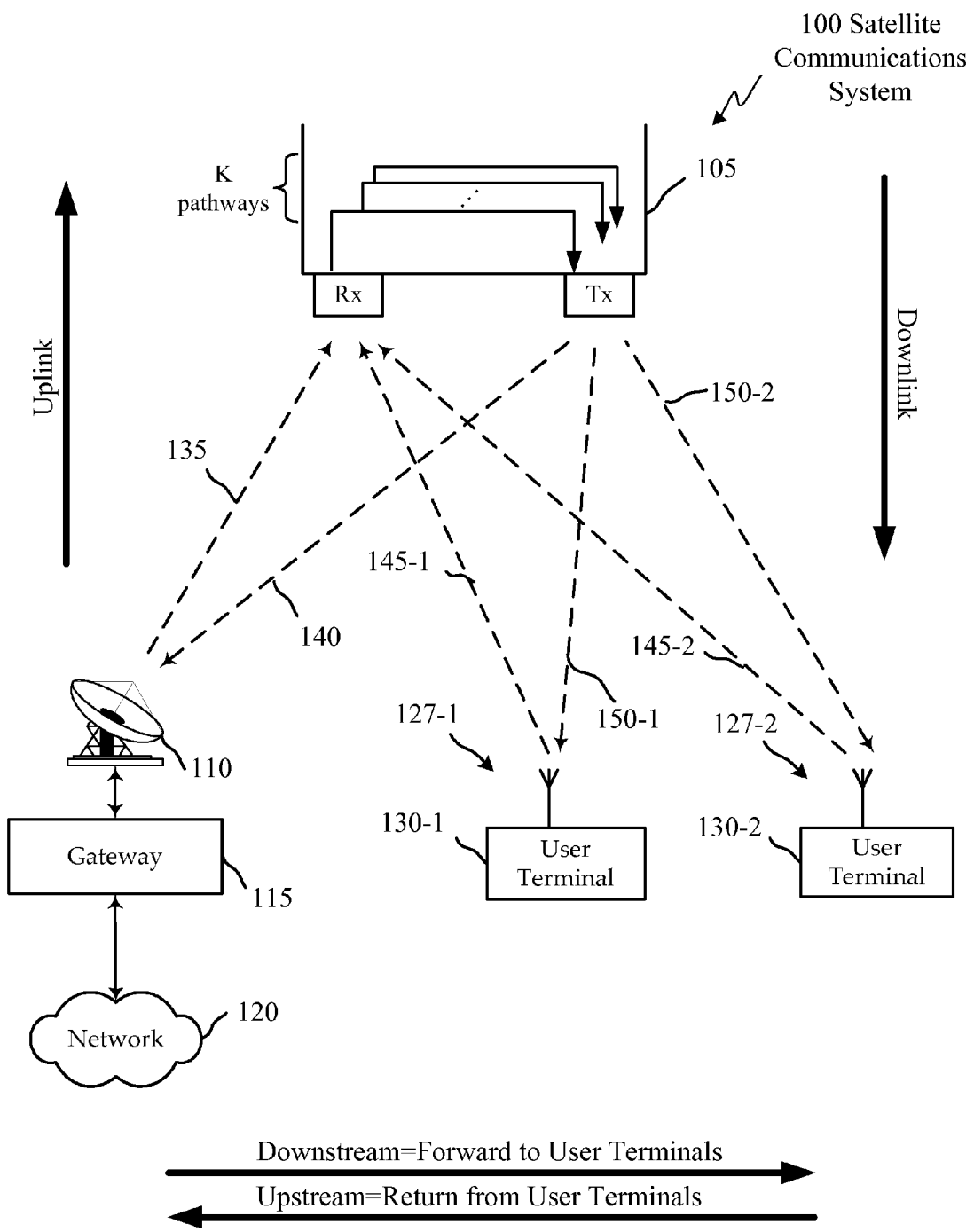
FIG. 1 is a simplified diagram of an illustrative satellite communications system in which the systems and methods disclosed herein may be used in accordance with embodiments of the present invention.

FIG. 1 is a simplified diagram of an exemplary satellite communications system 100 in which the systems and methods disclosed herein may be implemented. Satellite communications system 100 includes a network 120 interfaced with one or more gateway (GW) terminals 115. Gateway terminal 115 is configured to communicate with one or more user terminals 130 via satellite 105. As used herein, the term "communicate" refers to either transmitting or receiving (i.e., unidirectional communication) when applied to a given pathway for a given polarization at a given instant of time.

Gateway terminal 115 is sometimes referred to herein as a hub or ground station. Gateway terminal 115 services uplink 135 and downlink 140 to and from satellite 105. Gateway terminal 115 may also schedule traffic to user terminals 130. Alternatively, the scheduling may be performed in other parts of satellite communications system 100 (e.g., at one or more network operations centers (NOC) and/or gateway command centers (not shown)). Although only one gateway terminal 115 is shown in FIG. 1 to avoid over-complication of the drawing, embodiments of the present invention may be implemented in satellite communications systems having a plurality of gateway terminals each of which may be coupled to each other and/or one or more networks.

In some satellite communications systems, there may be a limited amount of frequency spectrum available for transmission. Communication links between gateway terminal 115 and satellite 105 may use the same, overlapping, or different frequencies as communication links between satellite 105 and user terminals 130. Gateway terminal 115 may also be located remote from user terminals 130 to enable frequency re-use.

Network 120 may be any type of network and can include, for example, the Internet, an IP network, an intranet, a wide-area network (WAN), a local-area network (LAN), a virtual private network (VPN), a virtual LAN (VLAN), a fiber optic network, a hybrid fiber-coax network, a cable network, a public switched telephone network (PSTN), a public switched data network (PSDN), a public land mobile network, and/or any other type of network supporting communications between devices as described herein. Network 120 may include both wired and wireless connections as well as optical links. Network 120 may connect gateway terminal 115 with other gateway terminals that may be in communication with satellite 105 or with other satellites.

Gateway terminal 115 may provide an interface between network 120 and satellite 105. Gateway terminal 115 may be configured to receive data and information directed to one or more user terminals 130. Gateway terminal 115 may format the data and information for delivery to respective user terminals 130. Similarly, gateway terminal 115 may be configured to receive signals from satellite 105 (e.g., from one or more user terminals 130) directed to a destination accessible via network 120. Gateway terminal 115 may also format the received signals for transmission on network 120.

Gateway terminal 115 may use antenna 110 to transmit forward uplink signal 135 to satellite 105. In one embodiment, antenna 110 may comprise a parabolic reflector with high directivity in the direction of satellite 105 and low directivity in other directions. Antenna 110 may comprise a variety of alternative configurations and include operating features such as high isolation between orthogonal polarizations, high efficiency in the operational frequency bands, low noise, and the like.

Satellite 105 may be a geostationary satellite that is configured to receive forward uplink signals 135 from the location of antenna 110. Satellite 105 may use, for example, a reflector, a phased array antenna, an antenna, or any other mechanism known in the art for reception of such signals. Satellite 105 may receive the signals 135 from gateway terminal 115 and forward corresponding downlink signals 150 to one or more of user terminals 130. The signals may be passed through a transmit reflector antenna (e.g., a phased array antenna) to form the transmission radiation pattern (e.g., a spot beam). Satellite 105 may operate in a multiple spot-beam mode, transmitting a number of narrow beams directed at a different region of the earth. This may allow for segregation of user terminals 130 into the various narrow beams.

Satellite 105 may be configured as a "bent pipe" satellite. In this configuration, satellite 105 may perform frequency and polarization conversion of the received carrier signals before re-transmission of the signals to their destination. A spot beam may use a single carrier, i.e., one frequency, or a contiguous frequency range per beam. A variety of physical layer transmission modulation and coding techniques may be used by satellite 105 (e.g., adaptive coding and modulation).

Satellite communications system 100 may use a number of network architectures consisting of space and ground segments. The space segment may include one or more satellites while the ground segment may include one or more user terminals, gateway terminals, network operations centers (NOCs), and satellite and gateway terminal command centers. The terminals may be connected via a mesh network, a star network, or the like as would be evident to those skilled in the art.

Forward downlink signals 150 may be transmitted from satellite 105 to one or more user terminals 130. User terminals 130 may receive downlink signals 150 using antenna 127. In one embodiment, antenna 127 and user terminal 130 together comprise a very small aperture terminal (VSAT), with antenna 127 measuring approximately 0.6 meters in diameter and having approximately 2 watts of power. In other embodiments, a variety of other types of antennas 127 may be used at user terminals 130 to receive downlink signals 150 from satellite 105. Each of user terminals 130 may comprise a single user terminal or, alternatively, may comprise a hub or router (not shown) that is coupled to multiple user terminals. Each user terminal 130 may be connected to various consumer premises equipment (CPE) comprising, for example, computers, local area networks, internet appliances, wireless networks, and the like.

In some embodiments, a Multi-Frequency Time-Division Multiple Access (MF-TDMA) scheme is used for upstream links 140 and 145, allowing efficient streaming of traffic while maintaining flexibility in allocating capacity among each of user terminals 130. In these embodiments, a number of frequency channels are allocated which may be fixed, or which may be allocated in a more dynamic fashion. A Time Division Multiple Access (TDMA) scheme may also employed in each frequency channel. In this scheme, each frequency channel may be divided into several timeslots that can be assigned to a connection (i.e., a user terminal 130). In other embodiments, one or more of the upstream links 140, 145 may be configured using other schemes, such as Frequency Division Multiple Access (FDMA), Orthogonal Frequency Division Multiple Access (OFDMA), Code Division Multiple Access (CDMA), or any number of hybrid or other schemes known in the art.

User terminal 130 may transmit data and information to a network 120 destination via satellite 105. User terminal 130 may transmit the signals via upstream uplink 145 to satellite 105 using the antenna 127. User terminal 130 may transmit the signals according to a variety of physical layer transmission modulation and coding techniques, including, for example, those defined with the DVB-S2, WiMAX, LTE, and DOCSIS standards. In various embodiments, the physical layer techniques may be the same for each of the links 135, 140, 145, 150, or may be different.

Satellite 105 may support a non-processed, bent pipe architecture with phased array antennas (e.g., phased array antennas) used to produce the small spot beams. The satellite 105 contains K generic pathways, each of which can be allocated as a forward pathway or a return pathway at any instant of time. Large reflectors may be illuminated by a phased array providing the ability to make arbitrary beam patterns within the constraints set by the size of the reflector and the number and placement of the antenna elements. Phased array fed reflectors may be employed for both receiving uplink signals 135, 145, or both, and transmitting downlink signals 140, 150, or both. The beam forming networks (BFN's) associated with the receive (Rx) and transmit (Tx) phased arrays may be dynamic, allowing for quick movement of the locations of both the Tx and Rx beams. The dynamic BFN's may be used to quickly hop both the Tx and Rx beam positions. The BFN may dwell in one beam hopping pattern (e.g., both Tx and Rx beams) for a period of time called a timeslot dwell time. Individual timeslots may all be associated with the same dwell time or different dwell times. A number Q of these timeslots, with each timeslot associated with a potentially different receive and transmit beam location pattern, are arranged into a sequence called a beam hopping frame. These frames can repeat, but may also be dynamic and time-varying. The duration and location of the receive and transmit beams associated with beam hop timeslots can also vary, both between frames and within a frame.

Figure 2A:
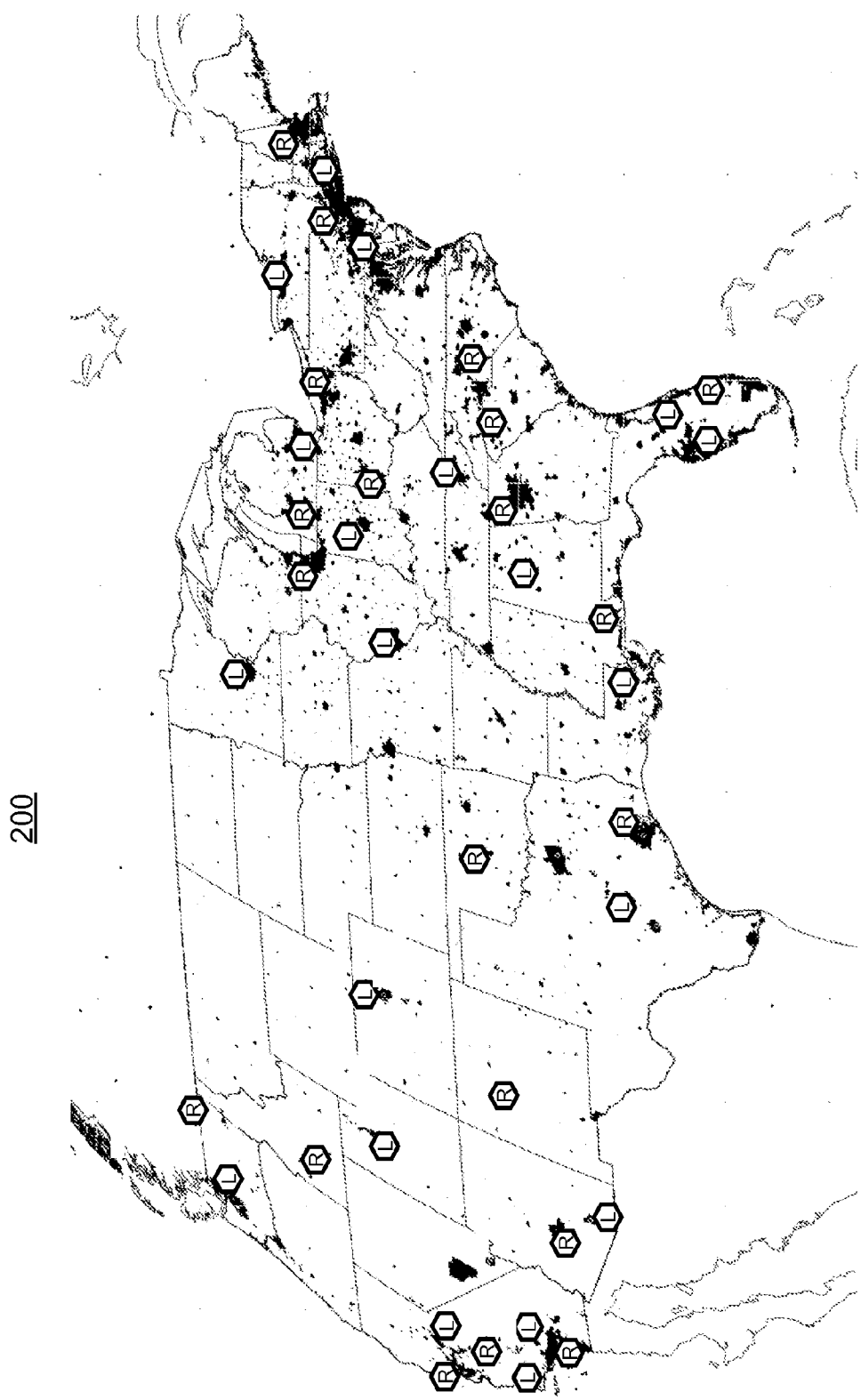
FIGS. 2A-2E show illustrative user beam locations in accordance with an embodiment of the present invention.
Figure 2B:
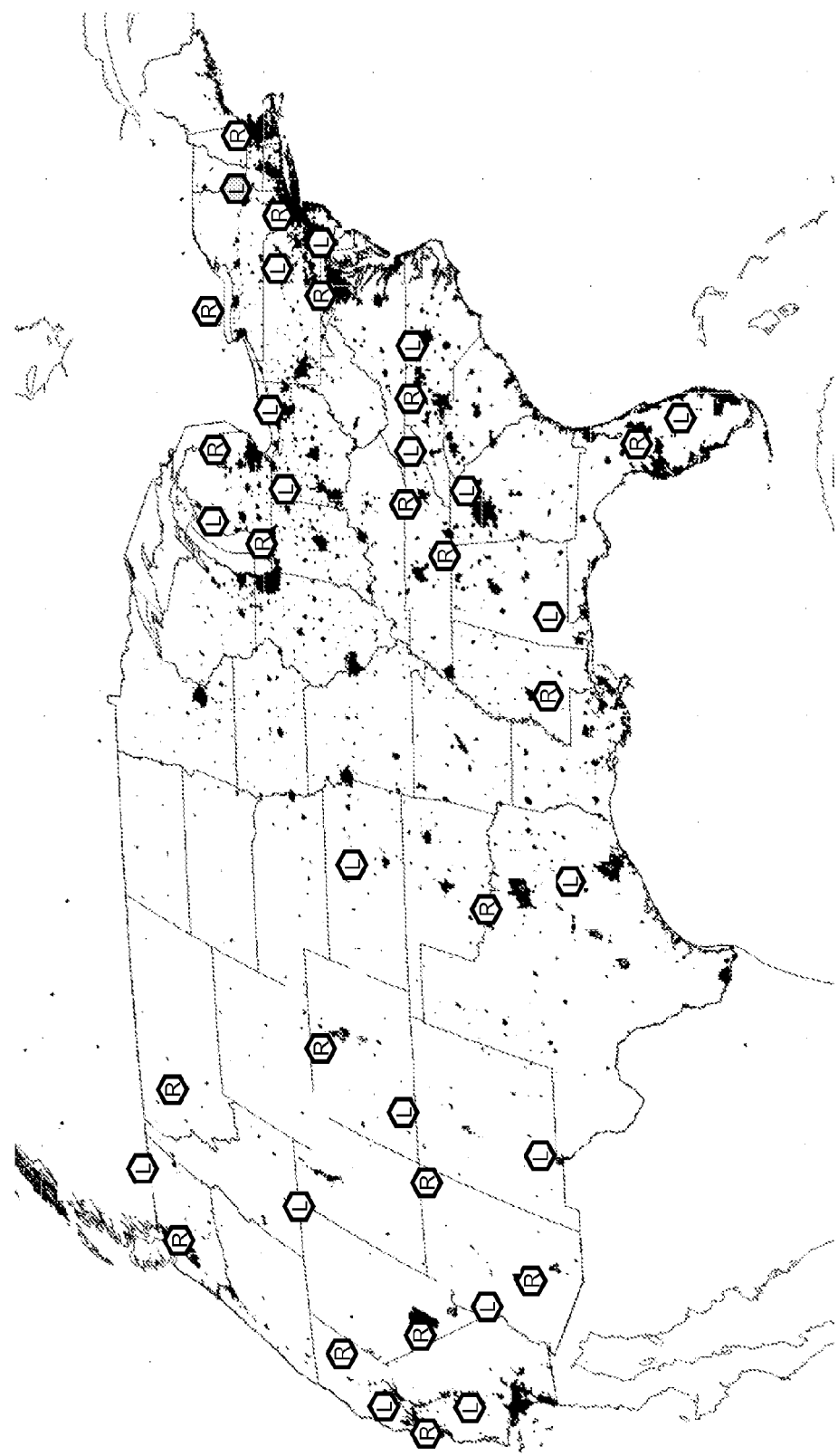
Figure 2C:
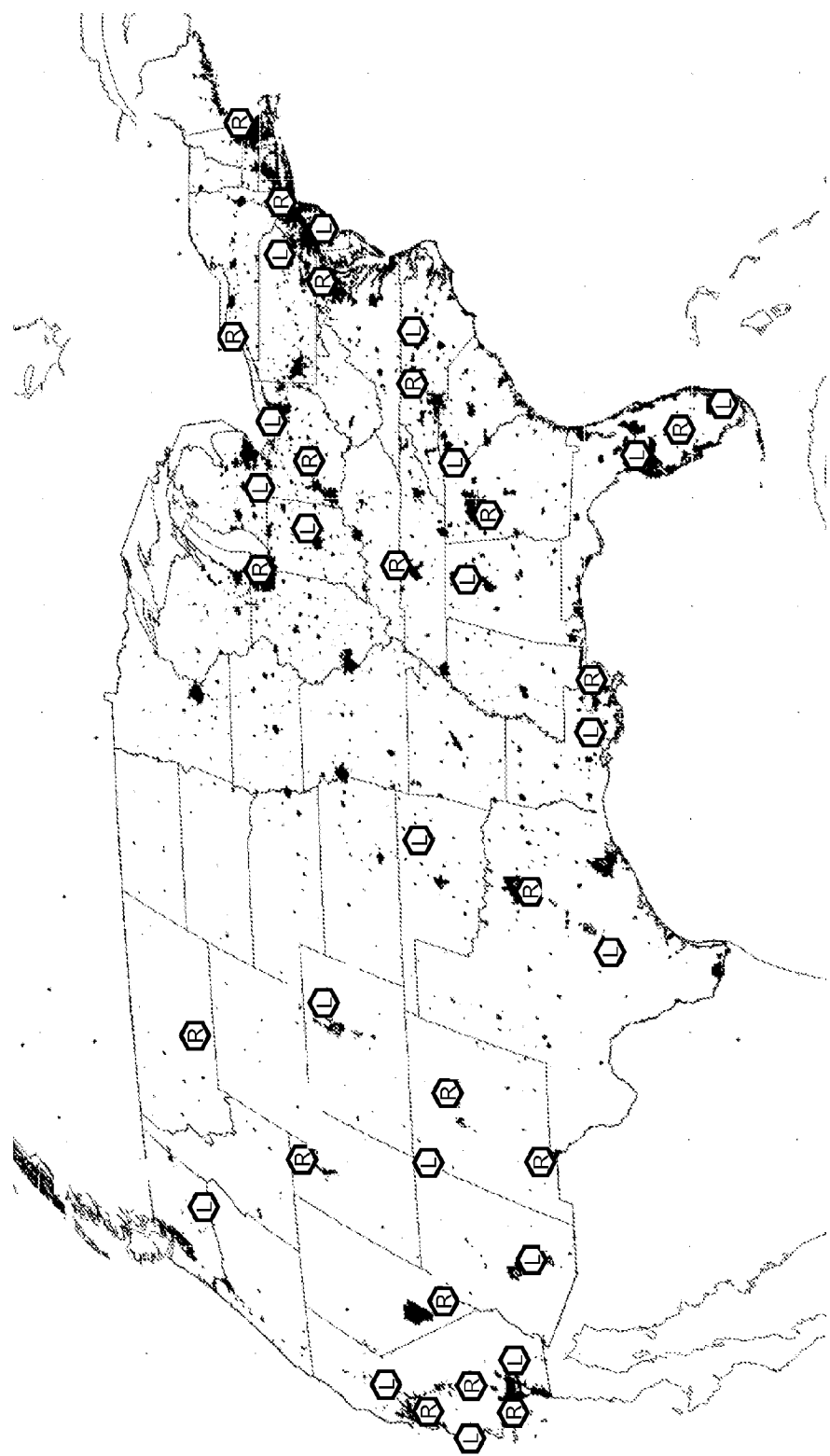
Figure 2D:
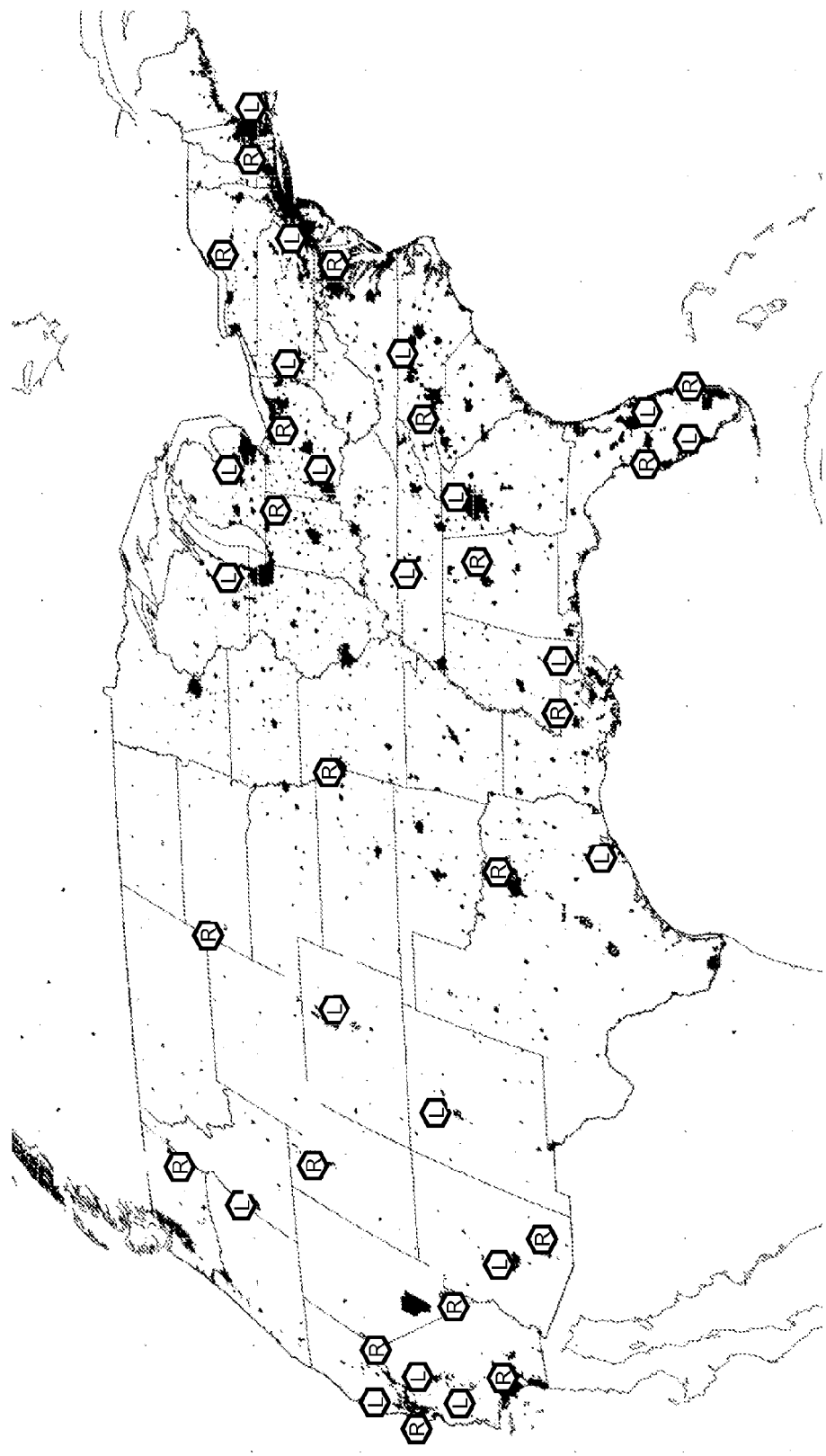

An example of user beam locations is shown in FIGS. 2A-2E. In this example, the allocated spectrum is W Hz, and two polarizations (e.g., LHP and RHP) are available. At any instant of time, 40 user beams may be active, 20 LHP and 20 RHP, although more or fewer beams may be active in actual implementations. Each user beam may use the full W Hz of allocated spectrum, but only one polarization. In other embodiments, each user beam may use only a portion of the allocated spectrum. In the described example, a frame consists of Q=4 timeslots, although actual implementations may use frames with more or fewer timeslots. During each timeslot, the user receive and transmit beams may reside at different locations. The hopping pattern may automatically repeat at the conclusion of each frame or a new frame definition may be applied to vary the hopping pattern. For example, FIG. 2A includes beam map 200 showing exemplary beam locations during the first timeslot of the frame. A beam labeled with an "L" in the center indicates a LHP beam and a beam labeled with an "R" indicates a RHP beam, although any number of other polarizations may be used in other embodiments. Due to the small beam diameters, desired large spread of the coverage area, and the relatively small number of beams active at one time, beams that use the same polarization during a given timeslot may be spaced relatively far apart. This may lead to low interference levels between the beams. The resulting high carrier to interference ratio (C/I) may help to increase the capacity per beam. FIG. 2B includes beam map 210 showing exemplary beam locations during the second timeslot of the frame. FIG. 2C includes beam map 220 showing exemplary beam locations during the third timeslot of the frame. FIG. 2D includes beam map 230 showing exemplary beam locations during the fourth timeslot of the frame. As described in more detail below, each beam shown in FIGS. 2A-2D may be part of a dedicated receive pathway, a dedicated transmit pathway, or a hybrid transmit/receive pathway.

Figure 2E:
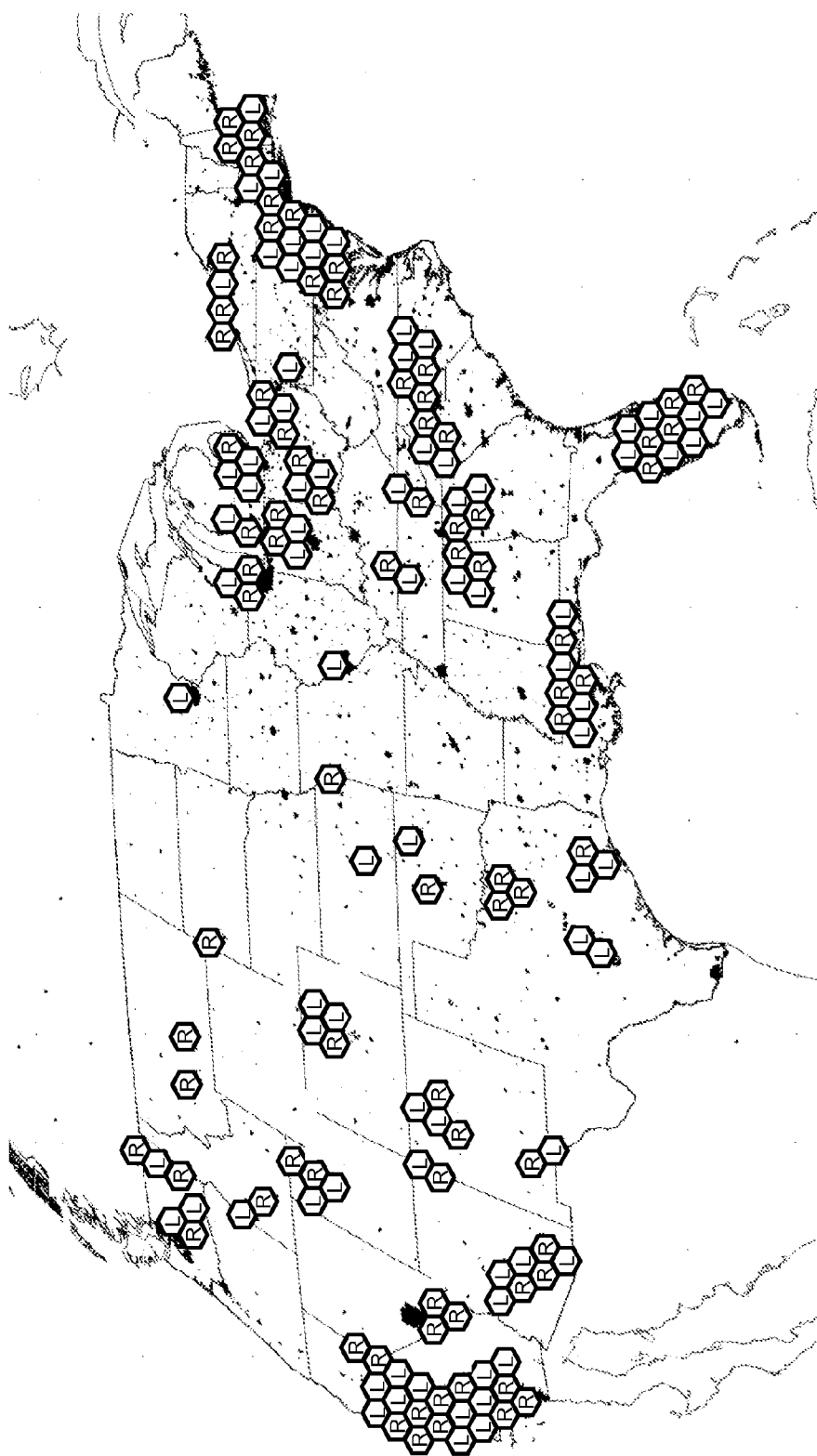

In each of the beam maps shown in FIGS. 2A-2D, beams of the same polarization are generally spaced very far apart (e.g., at the maximum distance possible). This spacing enables large values of C/I by minimizing interference from other active beams of the same polarization. The selection of the actual locations for the beams may depend on such factors as the desired system coverage area, the coverage diameter of each beam, the number of polarizations used, and the number of timeslots per frame. FIGS. 2A-2D provide just one example. Finally, FIG. 2E includes coverage map 240 showing a composite overlay of all the beams during all four timeslots (e.g., the system coverage area). Only beams of the same timeslot in FIG. 2E are active at the same time. Only beams of the same timeslot and the same polarization (e.g., LHP or RHP) present the potential for significant interference. As mentioned above, the location of these beams should be selected so as to maximize their spatial separation. Several geometric models may be used to maximize the separation of beams of like polarizations.

Figure 3:
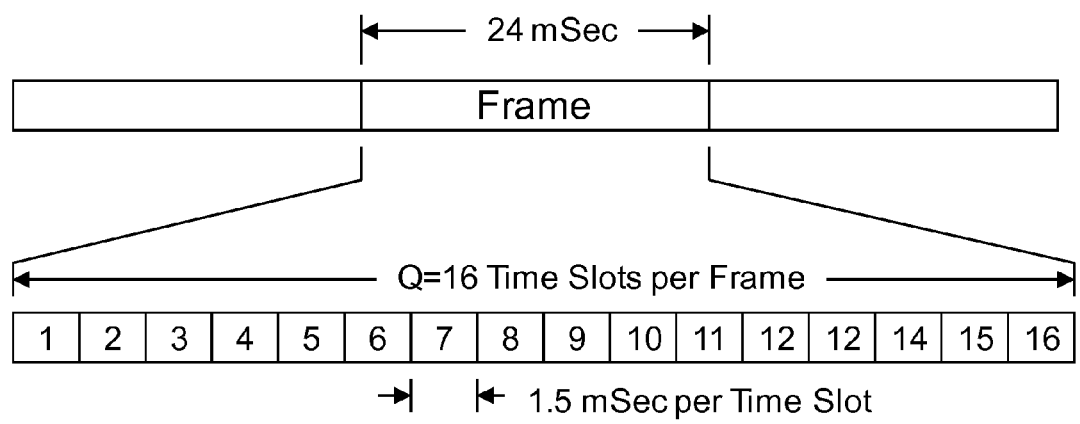
FIG. 3 shows an illustrative beam hopping frame in accordance with an embodiment of the present invention.

FIG. 3 shows illustrative beam hopping frame 300 with Q=16 timeslots per frame. In the depicted example, each timeslot occupies a 1.5 mSec interval resulting in a total beam hopping frame duration of 24 mSec. A beam, therefore, may be active in a given area for a minimum of 1.5 mSec or 1 timeslot, although a beam may be active in the same cell for more than 1 consecutive timeslot depending on the timeslot definitions included in the beam hop frame definition. In some embodiments, a single region within the composite coverage area, denoted a cell, might only have one active beam on the region for one timeslot in the beam hopping frame. The length of the beam hopping frame, therefore, may represent the potential waiting duration before information can be transmitted or received. It may be desirable to use this architecture for low latency applications, such as voice, so this hopping frame delay should be made insignificant relative to other unavoidable delays. For example, for a satellite in a Geo-Synchronous Orbit (GSO), the one-way path delay is approximately 250 mSec and is an unavoidable delay. Therefore, selection of a beam hopping frame length approximately 1/10 this value or less renders the framing delay insignificant relative to the unavoidable one-way path delay. Thus for a GSO satellite a frame size on the order of 25 mSec is generally adequate. Shorter frame sizes may not significantly change the total delay experienced, as it is dominated by the one-way path delay, and will generally result in more overhead and increased complexity due to the fact that the beams are hopping faster. Thus, a beam hopping frame size of approximately 25 mSec is suitable for most applications.

In other embodiments, more than one beam may be active in a cell during a single frame. For example, regions or cells may be assigned priorities indicative of the maximum acceptable delay for supported applications with the region or cell. Assigned priorities may then be used, at least in part, to determine the number of active beams in a particular region or cell per frame. For example, to support higher bandwidth or lower latency applications within a region or cell, the region or cell may be assigned a higher priority than a region or cell supporting lower bandwidth or higher latency applications. Cells or regions assigned higher priorities may have more than one active beam covering that cell or region in a single frame. Any number of priorities may be defined corresponding to any number of active beams for an individual cell per frame. A single cell may have a maximum of Q transmit beams and Q receive beams active in that cell in a single frame (e.g., beams are active in the cell during all timeslots). In some embodiments, a transmit beam and a receive beam may be active in the same cell during the same timeslot, allowing for both transmission and reception of data in the same timeslot.

Satellite Payload Block Diagram

Figure 4:
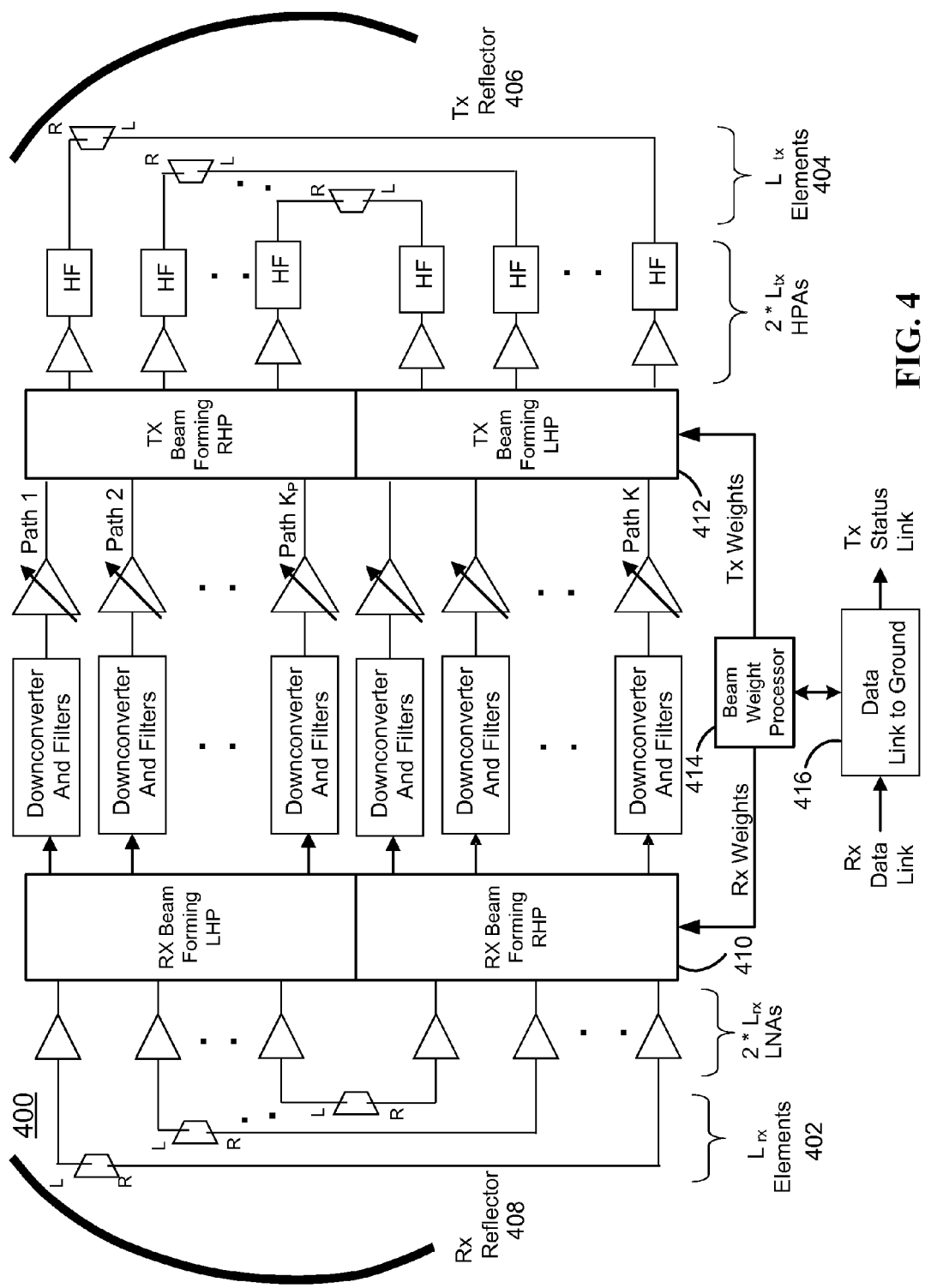
FIG. 4 is a simplified block diagram of an illustrative satellite in accordance with an embodiment of the present invention.

FIG. 4 shows a block diagram for part of exemplary satellite architecture 400 built in accordance with the present invention. Antenna elements 402 and 404 are shown for both LHP and RHP to support multiple polarizations. In some embodiments (not shown), the satellite architecture supports only a single polarization. In other embodiments, the satellite architecture operates with a single polarization although it supports multiple polarizations. Two separate antenna systems are used in the example of FIG. 4, one for Rx and one for Tx, but an integrated Tx/Rx antenna system could also be used. Each antenna system may include large reflector 406, 408 which is illuminated by a phased array consisting of L antenna elements in the array. The example of FIG. 4 uses a phased array fed reflector as its antenna system, but Direct Radiating Array (DRA) or any other type of phased array based antenna system that uses a beam forming network may be used in other embodiments. The Rx system may consist of $L_{rx}$ elements in the phased array, the output of each element port may be connected to a Low Noise Amplifier, LNA. Each LNA may be located close to the associated feed element to minimize the system noise temperature. Ideally, the LNA's may be attached directly to the feed elements, which will yield an optimal noise figure. The output of each of the $2 \times L_{rx}$ LNA's is routed to Rx beam forming network 410, which is composed of both LHP and RHP sections. Since the system noise figure is essentially set by the LNA's, Rx beam forming network 410 can be located away from the LNA's with an interconnection of, for example, coaxial cable or a waveguide. Rx beam forming network 410 may take the $2 \times L_{rx}$ inputs and provide K output signals, each corresponding to one of the K Rx beams. Rx beam forming network 410 may operate at the Rx frequency and provide no frequency translation, in this example.

The K outputs of Rx beam forming network 410 from both the LHP and RHP sections may be fed through K signal pathway hardware sections. In some embodiments, the same number of pathways are used for each available polarization (e.g., LHP and RHP), although in general there may be a different number of pathways connected to the received signals of each polarization. Each pathway of the bent-pipe architecture typically consists of a frequency conversion process, filtering, and selectable gain amplification. Other forms of processing (e.g., demodulation, remodulation, or remaking of the received signals, like in a "regenerative" system) are not performed when using a bent-pipe architecture. The frequency conversion may be required to convert the beam signal at the uplink frequency to a separate downlink frequency, for example, in a bent-pipe architecture. The filtering generally consists of pre-filtering before the downconverter and post-filtering after the downconverter and is present to set the bandwidth of the signal to be transmitted as well as to eliminate undesired mixer intermodulation products. The selectable gain channel amplifier may provides independent gain settings for each of the K pathways in the example of FIG. 4.

Tx beam forming network 412, which may include both LHP and RHP sections, may generate $2 \times L_{tx}$ outputs from the K pathway output signals. In some embodiments, the pathway output signals that derive from an LHP receive beam may be output on a RHP transmit beam, and vice versa. In other embodiments, the pathway output signals that derive from an LHP receive beam may be output on a LHP transmit beam. Tx beam forming network 412 may operate at the Tx frequency and may provide no frequency translation in this example. The outputs of Tx beam forming network 412 are routed to $2 \times L_{tx}$ high power amplifiers (HPA's). The harmonic filters (HF) connected to the output of each HPA may perform low pass filtering to provide suppression of the $2^{nd}$ and higher order harmonics, for example, from the output of the HPA's. The output of the harmonic filters may then be input to the $2 \times L_{tx}$ feed elements in the Tx phased array. Each HPA and harmonic filter may be located close to the associated Tx feed element to minimize the losses. Ideally, the HPA/HFs may be attached directly to the Tx feed elements, which may yield an optimal radiated power.

As shown in FIG. 4, separate reflectors 406, 408 and feed arrays may be used for the Tx and Rx beams. However, as described above, in some embodiments a single reflector and a single feed array are used to perform both Tx and Rx functions. In these embodiments, each feed may include two ports, one for Tx and one for Rx. For a system using two polarizations (e.g., RHP and LHP), a 4-port feed (2 for Tx and 2 for Rx) may be included. To maintain acceptable Tx to Rx isolation, such a single reflector approach may also employ diplexors or other filtering elements within some or all of the feed elements. These filtering elements may pass the Rx band while providing suppression in the Tx band. The increased number of feed elements and the phase matching requirements for the BFN's can make this approach more complex to implement but may reduce costs associated with multiple reflectors and multiple feed arrays.

In some embodiments, Rx beam forming network 410, Tx beam forming network 412, or both, may use time-varying beam weights to hop receive beams location, transmit beam locations, or both, around over time. These beam weight values may be stored in Beam Weight Processor (BWP) 414. BWP 414 may also provide the control logic to generate the proper beam weights at the proper times. BWP 414 may be connected to the ground via bi-directional data link 416, which can be in-band with the traffic data or out-of-band with its own antenna and transceiver. Bi-directional data link 416 is shown as bi-directional in the example of FIG. 4 to assure that the correct beam weights have been received by BWP 414. As such, error detection and/or correction techniques, including retransmission requests, may be supported using the bi-directional link. In other embodiments, a uni-directional link is used with error detection and/or correction. In some embodiments, an initial set of beam weights can be loaded into the memory of BWP 414 before launch.

Data link 416 may be used, for example, to receive pre-computed beam weights and deliver such weights to BWP 414. In some embodiments, the beam weights are generated on the ground at a network management entity such as a Network Operational Center (NOC). The desired locations of each of the K Tx and Rx beams, along with the feed element radiation patterns, may be used to generate the beam weight values. There are several techniques for generating appropriate beam weights given the desired beam locations. For example, in one approach, beam weights may be generated on the ground in non-real time. The dynamic weights may then be uploaded to BWP 414 through data link 416, and then applied to the BFN's in a dynamic manner to produce hopping beams on both the Rx uplink and the Tx downlink.

The downlink portion of data link 416 may be used to report the status of the BFN's and to provide confirmation of correct reception of the uplinked beam weights. Correct reception of the beam weights can be determined by use of a traditional CRC code, for example. In the event of incorrect reception, as indicated by a failure of the CRC to check, for example, the uplink transmission of the beam weights (or the portion of the beam weights that was deemed incorrect or invalid), may be retransmitted. In some embodiments, this process may be controlled by an automatic repeat request ARQ retransmission protocol (such as, for example, selective repeat ARQ, stop-and-wait ARQ, or go-back-N ARQ, or any other suitable retransmission, error detection, or error correction protocol) between the ground station and BWP 414.

In general, satellite architecture 400 provides for K generic hopping pathways. Each pathway functionally consists of an Rx beam and a Tx beam, connected together through electronics and circuitry that provide signal conditioning, such as one or more of filtering, frequency conversion, amplification, and the like. The pathways may each be represented as bent pipe transponders that can be used in a hub-spoke configuration or a mesh configuration. For example, in one embodiment with a mesh configuration, a pathway carries signals between a first plurality of terminals and a second plurality of terminals via the satellite. In accordance with the systems and methods described herein, the termination points (e.g., the Tx beam location and Rx beam location) for each pathway may be dynamic and programmable, resulting in a highly flexible satellite communications architecture.

Receive Beam Forming Network

Figure 5:
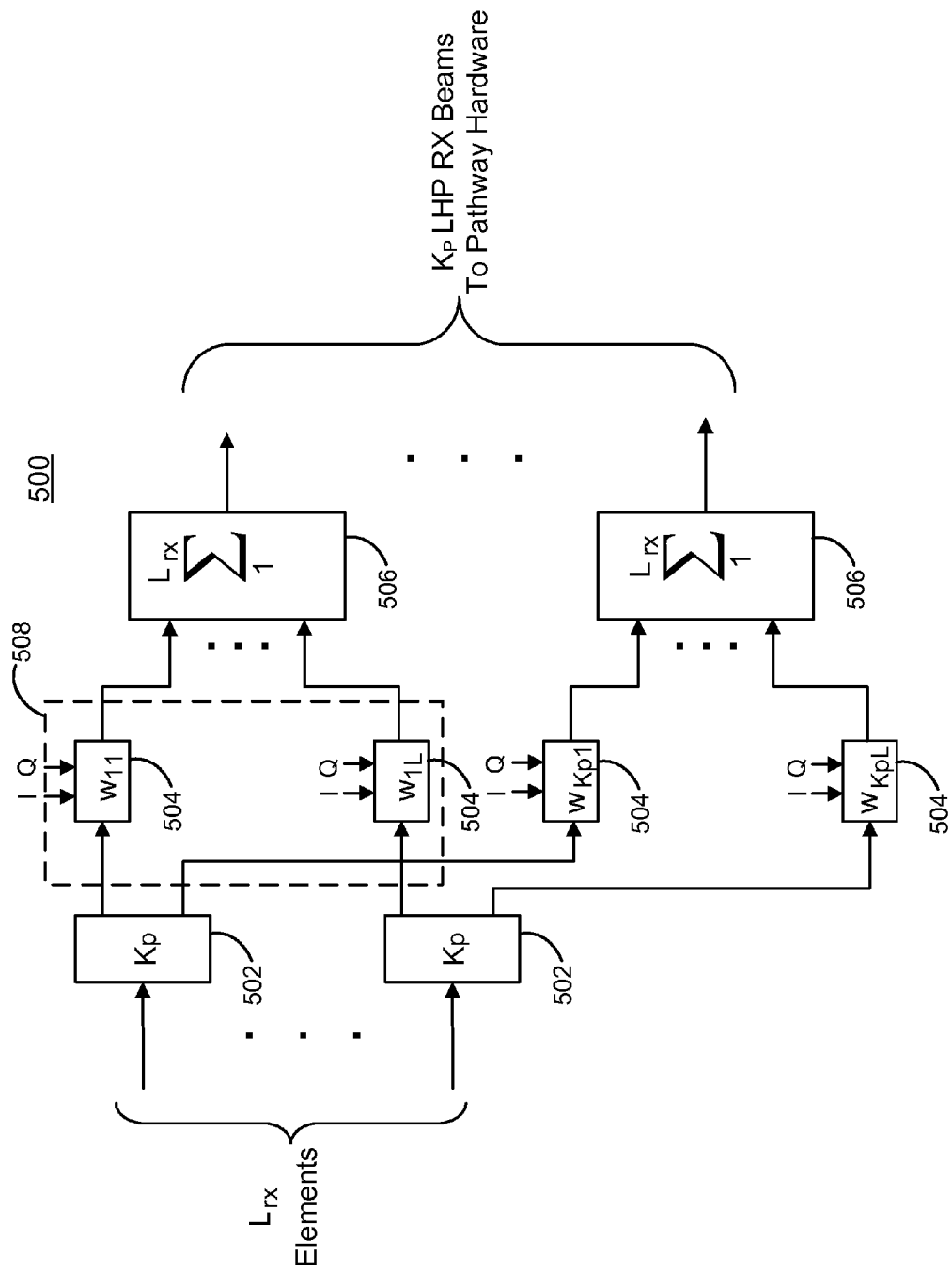
FIG. 5 is a simplified block diagram of an illustrative receive beam forming network in accordance with an embodiment of the present invention.

FIG. 5 shows example block diagram 500 of one polarization of a receive beam forming network. The network may take in signals from $L_{rx}$ feed elements and provides the signals of $K_p$ LHP and RHP formed beams as outputs. In this example, there are $K_p$=K/2 LHP receive beams and K/2 RHP receive beams although different numbers of receive beams of each polarization may be used in other embodiments. Each input signal from a feed element is first split, via splitters 502, into K identical copies, one for each beam. Then $K_p$ parallel beam formers are realized. Each beam former may include, among other components, amplitude and phase adjustment circuitry 504 and summer 506. Each instance of amplitude and phase adjustment circuitry 504 may take an input signal from one of the $L_{rx}$ splitters and provide an amplitude and phase adjustment to the signal. The $L_{rx}$ amplitude and phase adjusted signals may then be summed using summer 506 to produce the signal from one formed beam. Each Rx beam output may then be fed into one of $K_p$ independent signal pathways as discussed previously. The coefficients used to create the receive beam of pathway 1 of the satellite are shown by dashed line 508 in FIG. 5.

The process of adjusting the amplitude and phase of the signal may be mathematically described as the multiplication of the complex base band representation of the signal by a complex number (e.g., a complex weight). Letting the complex number be represented as w=I+jQ, the magnitude of w is the amplitude adjustment and the phase of w is the phase adjustment. In practice the amplitude and phase adjustment can be realized in a number of ways. Two common techniques in phased array antennas are vector multiplier circuits that take as an input the I and Q values, and circuits that have independent phase and amplitude adjustment mechanisms and take as input the desired amplitude and phase adjustments. One should recognize I+jQ as the rectangular coordinates of the complex number, w, and Amplitude/Phase as the polar coordinates of the complex number, w. The BFN may provide dynamic (changing) and programmable complex weight values on each of the K beam formers in both halves of the BFN. In practice, the BFN may generally have amplification stages within the BFN structure to account for some or all of the insertion losses of the devices used to perform the BFN functions (e.g., splitting, weighting, and combining).

Transmit Beam (Feed) Forming Network

Figure 6:
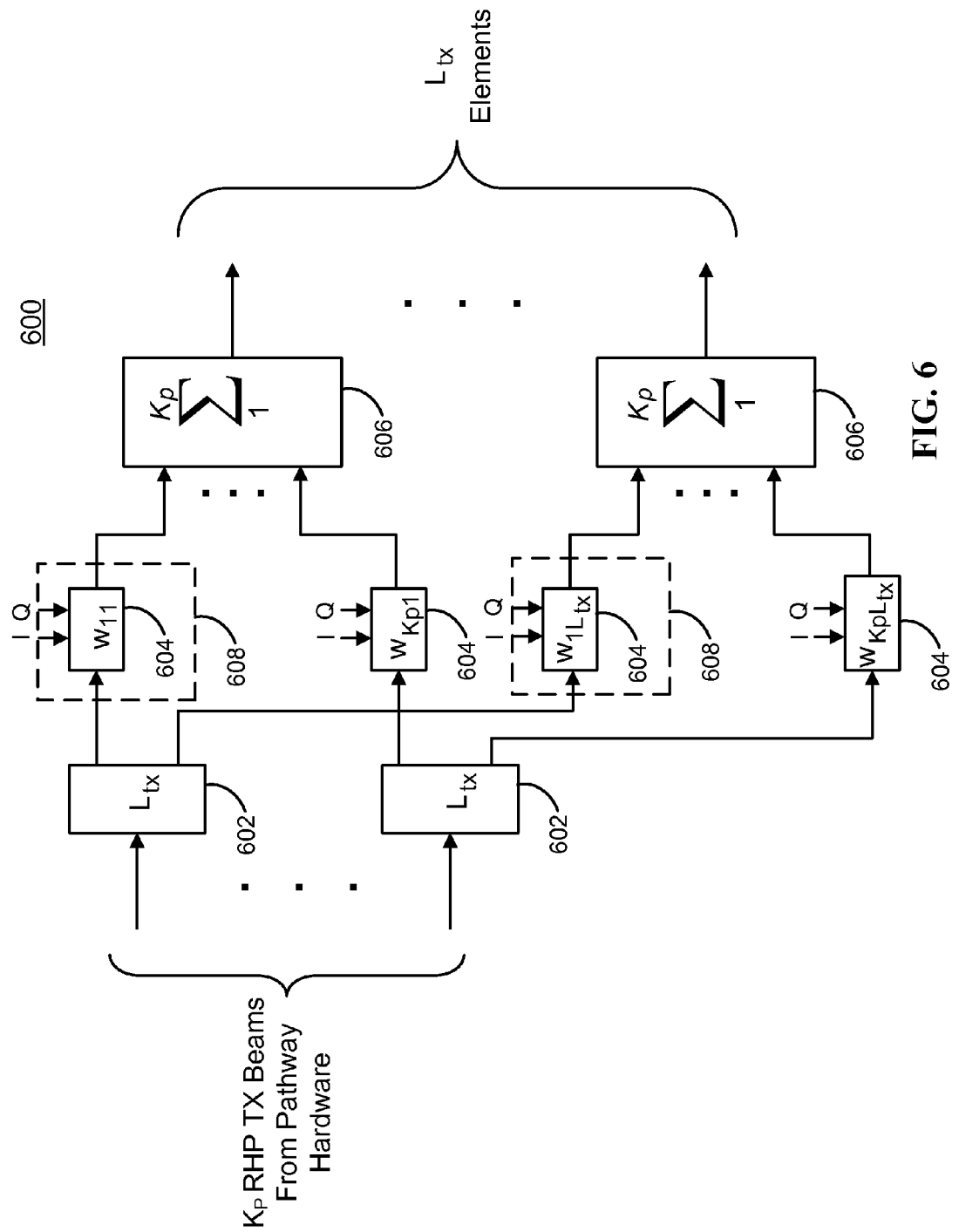
FIG. 6 is a functional block diagram of a transmit feed forming network in accordance with an embodiment of the present invention.

FIG. 6 shows functional block diagram 600 of one polarization of a transmit feed forming network (FFN). The network takes in signals from $K_p$ signal pathways (e.g., K/2 LHP and K/2 RHP pathways) and provides the signals to each of the $L_{tx}$ feed elements. Each input signal from a pathway is first split, via splitters 602, into $L_{tx}$ identical copies, one for each feed element. Then $L_{tx}$ parallel "feed formers" are realized. Each feed former may include amplitude and phase adjustment circuitry 604 and summer 606. Amplitude and phase adjustment circuitry 604 may take an input signal from one of the $K_p$ splitters and provides an amplitude and phase adjustment. The $L_{tx}$ amplitude and phase adjusted signals are then summed using summer 606 to produce the signal for transmission in one feed.

The process of adjusting the amplitude and phase of the signal may be mathematically described as multiplication of the complex base band representation of the signal by a complex number (e.g., a complex weight). Letting the complex number be represented as w=I+jQ, the magnitude of w is the amplitude adjustment and the phase of w is the phase adjustment. In practice, the amplitude and phase adjustment can be realized a number of ways (as described above with regard to FIG. 5). The first and last coefficients used to form the transmit beam of pathway 1 of the satellite are shown by dashed line 608. The remaining coefficients are not explicitly shown in the example of FIG. 6.

As described above with regard to the receive beam forming network, the FFN may provide dynamic (changing) and programmable complex weight values on each of the K feed formers in the FFN. In practice, the FFN will also have amplification stages within the FFN structure to make up for some or all of the insertion losses of the devices used to perform the FFN functions (e.g., splitting, weighting, and combining).

Beam Weight Processor

Figure 7:
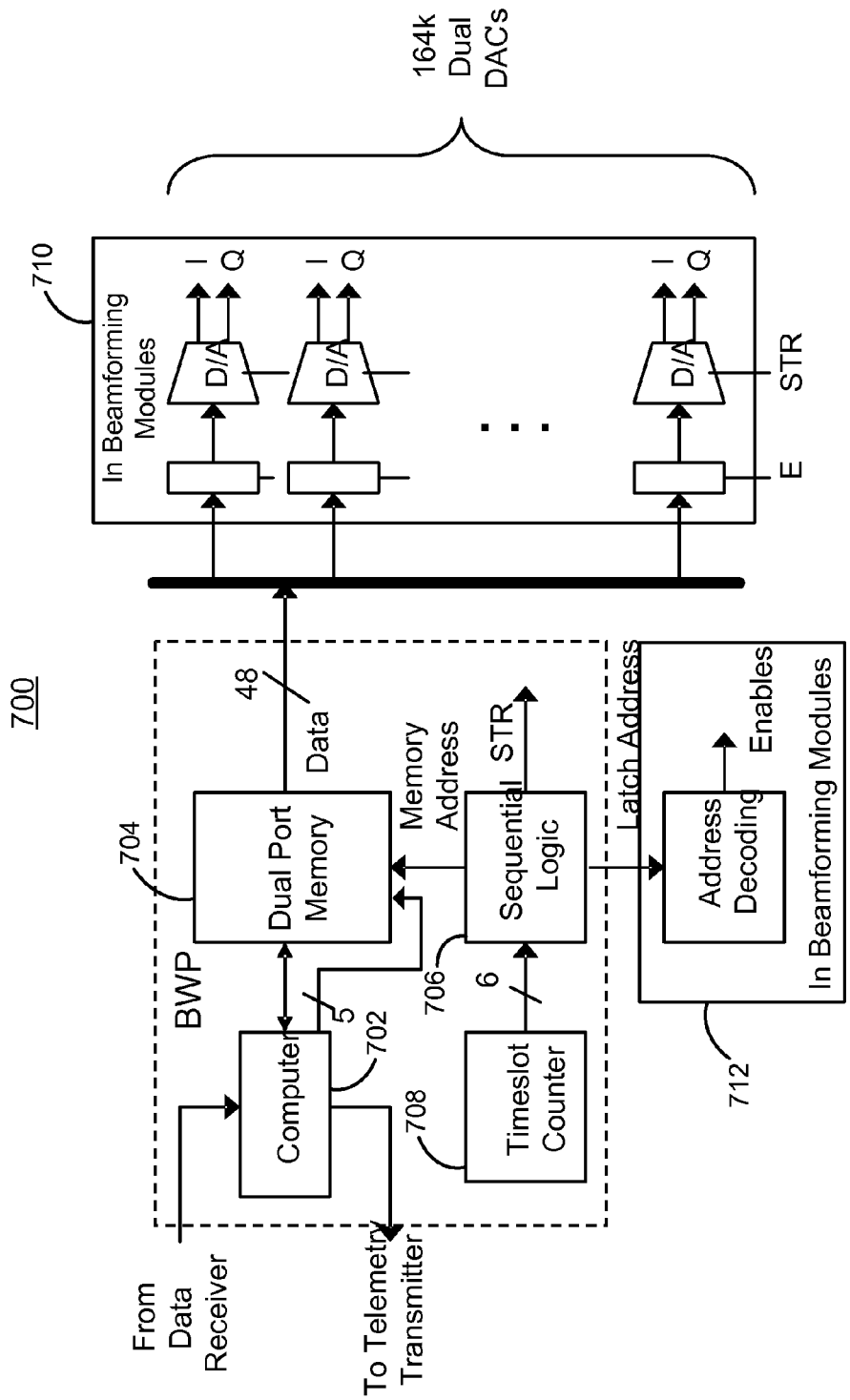
FIG. 7 is a simplified block diagram of an illustrative beam weight processor in accordance with an embodiment of the present invention.

FIG. 7 shows example block diagram 700 of a Beam Weight Processor (BWP). Single or multiple board computer 702 (or equivalent) may be used to interface with a bi-directional data link (e.g., data link 416 (FIG. 4)) to a control station, which is typically a ground control station such as a NOC. Generally, the NOC is different than the Telemetry, Tracking, and Control (TT&C) station, but it may be implemented in the TT&C if desired. The beam weights may be received for all the beams and all timeslots. Computer 702, which may include one or more processors coupled to memory, may implement an ARQ protocol providing feedback data to the data link transmitter for transmission down to the control station. The feedback data may include a notification of successful or unsuccessful reception of the uplink data. Uplink data may include, for example, beam weights, dwell times, pathway gains, commands, and any other suitable data.

The BWP or affiliated hardware may provide the bulk storage for a plurality of weight matrices. A weight matrix may include the set of all weight vectors used for transmission and reception of all beams in one timeslot. A weight vector may include the group of $L_{tx}$ or $L_{rx}$ individual complex weights used to create one beam during one timeslot. Thus, a transmit weight vector includes individual complex transmit weights, while a receive weight vector includes individual complex receive weights. Weight matrices are generally computed at the control station based on the desired beam locations (e.g., the desired locations of the transmit beams, the receive beams, or both) for each timeslot in the beam hop frame. A beam hop frame may include a sequence of beam hop timeslots, each timeslot with an associated dwell time. The dwell time may be fixed for all slots, or the dwell time can be variable on a timeslot by timeslot basis, with the dwell times potentially changing frame by frame. In one example, a dwell time can be the duration of a variable number of timeslots, where each timeslot is of fixed duration. In another example, a dwell time can be the duration of one or more timeslots, where the durations of the timeslots vary.

In some embodiments, a weight set includes the set of all weight vectors used for transmission and reception of all beams in all timeslots of a beam hopping frame. Additionally or alternatively, a beam hop frame definition may include a linked list of beam hop timeslots. In the linked list approach, a dynamic dwell time for each timeslot may be easily incorporated into the linked list. Any other suitable data structure may also be used for frame definitions. The beam hop frame definition can also include pathway gains for setting a selectable gain channel amplifier for each pathway, for example, as illustrated in FIG. 4.

In an example satellite using the beam weight set approach, a small number (e.g., tens) of weight sets can be pre-computed and uploaded to the BWP in the satellite. These weight sets can then be switched into operation at any time via a single command from the ground indicating which weight set to use and at what time. This allows switching weight sets without requiring a significant amount of information to be uploaded to the BWP. For example, in some embodiments, 24 complete weight sets are pre-computed, uploaded, and stored in the BWP computer. Once an hour (or on any other suitable schedule), a different weight set may be selected for use by the BWP via the data link. This allows the coverage and capacity allocation to track, for example, the hourly variations of the demand on a daily or 24-hour basis.

A beam weight set may include a significant amount of data. For example, in some embodiments, a weight set may include data corresponding to $L_{tx}+L_{rx}$ feed elements (e.g., 1024)×K pathways (e.g., 80)×Q timeslots (e.g., 64)×the number of bits required per weight (e.g., 12, 6 bits for I and 6 bits for Q). For example, in FIG. 7, this sums to approximately 16 MB of data per weight set. Data and command uplink to the satellite may typically not be very fast. Even at a 1 Mbps data link, it would take 128 seconds to upload the 16 MB weight set. Thus, pre-loading many weight sets in non-real time may be more convenient for certain applications.

One of the stored weight sets in the BWP may be selected as the active weight set and used in the generation of the hopped beams. This active weight set may be stored in memory 704, such as a dual port RAM, that allows computer 702 to load the next active weight set and some external logic to dynamically access the individual weight vectors of the current active weight set. The individual weight vectors of the active weight set may then be output as beam weights at the proper time under control of sequential logic 706. An example of sequential logic 706 may include timeslot counter 708 that is incremented once per timeslot. Timeslot counter 708 may be a simple 6-bit counter in some embodiments and may handle frames with up to $2^6=64$ timeslots per frame. The counter value may represent the slot number (e.g., 1 ... 64) of the beam hopping frame. Sequential logic 706 takes the output of timeslot counter 708 and may generate (1) the proper addresses for memory 704, (2) addresses for the latches in the BFN modules, and (3) the control signals to place the beam weights on the data bus. Sequential logic 706 may then load this data into the appropriate latches in beam forming modules 710.

Within beam forming modules 710, data may be double latched to allow all of the beam weights within each weight vector to change at the same time. This may ensure hopping of all beams synchronously with the timeslot boundary. The data may be loaded into the first latch based on enable signals, which are decoded from the latch address by decoder 712. Then all data may be simultaneously loaded into the digital-to-analog (D/A) converters synchronously with a strobe signal from the sequential logic. The strobe may be generated within sequential logic 706 to occur at the start of each timeslot.

In the example of FIG. 7, certain components are shown within the BFN modules. This approach may be advantageous since it may reduce or minimize the number of connections between the BWP and the BFN modules, but other possible implementations may be used. For example, the interconnect signals may be limited to the 48-bit data bus, the latch address bus, plus a strobe line. The 48-bit data bus may enable loading of 4 complex weights at one time (based on 6 bits for I+6 bits for Q×4 weights=48 bits). In this example, there is a total of L=1024 feed elements×K=80 pathways×2 (for Tx and Rx), for a total of 163,840 complex weights. Loading 4 complex weights at a time requires 40,960 addressable locations, or a 16-bit latch address bus resulting in a total interconnect of 48+16+1=65 lines.

In some embodiments, the address decoding, latches, and D/A's are incorporated in the BWP itself This may simplify the BFN modules, but significantly increase the required number of interconnects. For example, using L=1024 elements×K=80 pathways×2 (for Tx and Rx)×2 (I and Q)=327, 680 analog voltage (D/A output) lines.

Example Satellite and Pathways

FIG. 8A shows subset 800 of the payload of a K=4 pathways satellite. The instantaneous (e.g., timeslot) signal flow for an example pathway that conveys traffic that originates in Cleveland (designated Beam 124) and destined is for Pittsburgh (designated Beam 319) is shown within dashed line 802. Beam Weight Processor 804 will set the coefficients shown in FIG. 5 to the proper values to focus the LHP elements of the phased array receive antenna upon the area designated as the Cleveland beam. Terminals, either hubs or subscriber terminals, within the designated receive coverage area will broadcast on the designated uplink frequency through a left-handed polarized antenna. The received version of these signal(s) will be output from the BFN to pathway 1 and will then go through the pathway processing as discussed above. The output from pathway 1 will then be input into the transmit beam (feed) forming network. Beam Weight Processor 804 will set the coefficients (as shown in FIG. 6) to the proper values to focus the RHP elements of the phased array transmit antenna upon the area designated as the Pittsburgh beam. Terminals, either hubs or subscriber terminals, within the designated transmit coverage area will receive on the designated downlink frequency through a right-handed polarized antenna.

From the perspective of the satellite, uplink signals are received by the satellite from transmitting user terminals or from transmitting gateways located in the satellite's receive coverage area. Downlink signals are transmitted from the satellite to receiving user terminals or to receiving gateways located in the satellite's transmit coverage area. From the perspective of the ground equipment (e.g., user terminals and gateways), the receive coverage area and the transmit coverage area may be reversed.

FIG. 8B shows a configuration table 810 of the instantaneous configuration of the example satellite. Each row corresponds to one pathway. Column 812 includes the number of the pathway, 1 . . . K. Column 816 includes
1. a unique designation of the uplink receive beam, which may be an alphanumeric string
2. an alphanumeric 'arrow' to designate the direction of signal travel
3. the corresponding downlink transmit beam, which may also be an alphanumeric string In these examples, pathways may cross polarizations, in accordance with typical industry practice. The convention for the example satellites in this document is that the first K/2 pathways receive LHP uplink beams and transmit RHP downlink beams, while the second K/2 pathways receive RHP uplink beams and transmit LHP downlink beams.

FIG. 8C shows an example timeslot coverage area superimposed on area map 820. As discussed previously, pathway 1 has a left-handed polarized uplink from Cleveland and a right-handed polarized downlink to Pittsburgh. The satellite is shown for this pathway, but is omitted for the other three pathways shown in this figure. For example, pathway 3 has a right-handed polarized uplink from Washington, D.C. and a left-handed polarized downlink to Columbus and is indicated by a straight line on the figure.

At any timeslot in the beam hopping frame, the forward capacity in each beam can be calculated by performing a link analysis including the characteristics of the ground equipment. By performing a standard link analysis, one can calculate the end-to-end carrier-to-noise-plus-interference ratio, $E_s/(N_o+I_o)$, to a particular point in the beam. The end-to-end carrier-to-noise ratio, $E_s/N_o$, typically includes the effects of thermal noise, C/I, intermodulation distortion, and other interference terms on both the uplink and the downlink. From the resulting end-to-end $E_s/(N_o+I_o)$, the modulation and coding may be selected from a waveform library that maximizes the capacity. An example of a waveform library is contained in the DVB-S2 specification, although any suitable waveform library may be used. The selected waveform (modulation and coding) results in a spectral efficiency, measured in bps/Hz, to that specific point in the beam.

For broadcast data delivery, the spectral efficiency may be computed at the most disadvantaged point within the beam (e.g., at the worst link budget). For multicast data delivery, the spectral efficiency may be computed at the location of the most disadvantaged user in the multicast group. For unicast data delivery, Adaptive Coding and Modulation (ACM) may be employed, where the data delivered to each spot in the beam is individually encoded to fit the link budget for that particular point in the beam. This is also the case with the DVB-S2 standard. When ACM is employed, the average spectral efficiency is relevant. As described in U.S. Patent Application Publication No. 2009-0023384 to Mark J. Miller, filed Jul. 21, 2008, which is incorporated by reference herein in its entirety, the average spectral efficiency may be generated by computing the weighted average of the spectral efficiency for every point in the beam.

The link capacity in a beam may then be calculated as the product of the spectral efficiency (bps/Hz) and the allocated BW in the beam. The total capacity during one timeslot in the beam hopping frame is the sum of capacities of all the beams that are active during that timeslot. The total capacity is the average of the capacities of the individual beam hopping frames. To maximize total capacity, the beam weights may be set for all beams and all timeslots to yield the largest antenna directivity. Beams that are formed in the same timeslot and use the same polarization and spectrum should be spaced as far apart as possible to maximize the C/I (and hence minimize the interference into other beams). Under these requirements, it is not uncommon for the spectral efficiency of each beam to be approximately the same for all beams in all timeslots. Under this assumption, the system forward capacity can be approximated in accordance with:

$$C_F = K_F \cdot \eta_{Hz} \cdot W \qquad (1)$$

where $\eta_{Hz}$ is the spectral efficiency in bps/Hz, $K_F$ is the number of forward beams, and W is the spectrum allocated per beam. From equation (1), it can be seen that increasing any of the parameters increases the capacity.

The maximum number of beam pairs that can be active at one time, $K_F$, is essentially determined by the mass and volume budgets of the satellite. The power limitations on the satellite can also affect the value $K_F$, but the volume and mass constraints generally are more limiting.

The satellite architecture disclosed herein is very effective in maximizing $\eta_{Hz}$ and W. Due to the small size of the beams, and the relatively small number of beams that can be active at one time (due to payload size, weight, and power limits on $K_F$), all of the allocated spectrum can be used within each beam with minimal interference between beams. To accomplish this, beams of the same polarization that are active in the same timeslot should be positioned as far apart as possible. Alternatively, one could use only a fraction of the spectrum per beam in order to improve the C/I, but due to the beam hopping nature of the present architecture this may result in less capacity. For example, suppose each beam used one-half of the available spectrum, or W/2 Hz. Then at any instant in time, there would be half as many beams that are co-frequency and present the potential for interference. The resulting C/I would increase, thus slightly increasing the spectral efficiency, $\eta_{Hz}$, as C/I is just one of many components in the end-to-end $E_s/(N_o+I_o)$ budget and spectral efficiency generally varies as the logarithm of the $E_s/(N_o+I_o)$. But the BW per beam is reduced by a factor of 2, and as expected, the total capacity will be reduced, since the number of beams is limited by the number of signal pathways in the satellite payload.

The spectral efficiency per beam is quite high using the present architecture because active beams can be spaced far apart and the directivity of the beams may be large. The former is a result of the large coverage areas, the small beam sizes, and the relatively small number of beams that can be active at one time. The latter is a result of the small beam sizes.

In some embodiments, it may also be desirable to increase the spectral efficiency of a beam by reducing the coverage area of a beam relative to its beam diameter. Typically, the coverage area in spot beam systems may extend out to the −3 dB contours of a beam or beyond. Some systems extend the coverage area out to the −6 dB contours. These low contour regions are undesirable for many reasons. First, they may reduce the downlink $E_s/N_o$ and reduce the downlink C/I. The reduced C/I is a result of the reduced signal power (C) and the increased interference (I) as the locations at the edge of a beam are closer to other beams. When computing the weighted average capacity (e.g., for unicast data delivery) or the edge of beam capacity (e.g., for broadcast data delivery), this large antenna roll off at the edge of the beam may reduce capacity. In accordance with the present architecture, however, the beam coverage area may be constrained to regions within the beam where the antenna roll-off is much less, such as approximately −1.5 dB. This may increase the spectral efficiency since there are no locations in the beam at the −3 to −6 dB levels relative to beam center. The beam coverage area may be smaller, however, but this is compensated for by hopping to more areas within the beam hopping frame (e.g., increasing the number of timeslots per frame).

The link capacity may be enhanced by:
Use of the full allocated spectrum per beam.
Use of small beams resulting in high beam directivity and large uplink $E_s/N_o$ and ultimately better return link spectral efficiency.
Large service areas realized by hopping small beams around in a beam hopping frame with many slots per frame resulting in a relatively small number of beams active at one time and spread over a large service area. Thus, beams can be spaced far apart resulting in high C/I values leading to higher spectral efficiency.
Defining smaller beam coverage areas such that the edge of beam roll off is relatively small, such as approximately −1.5 dB. This increases the average spectral efficiency, and the capacity per beam, as the relatively high roll-off beam locations that degrade both uplink C/I and $E_s/N_o$ have been eliminated.

Figure 9:
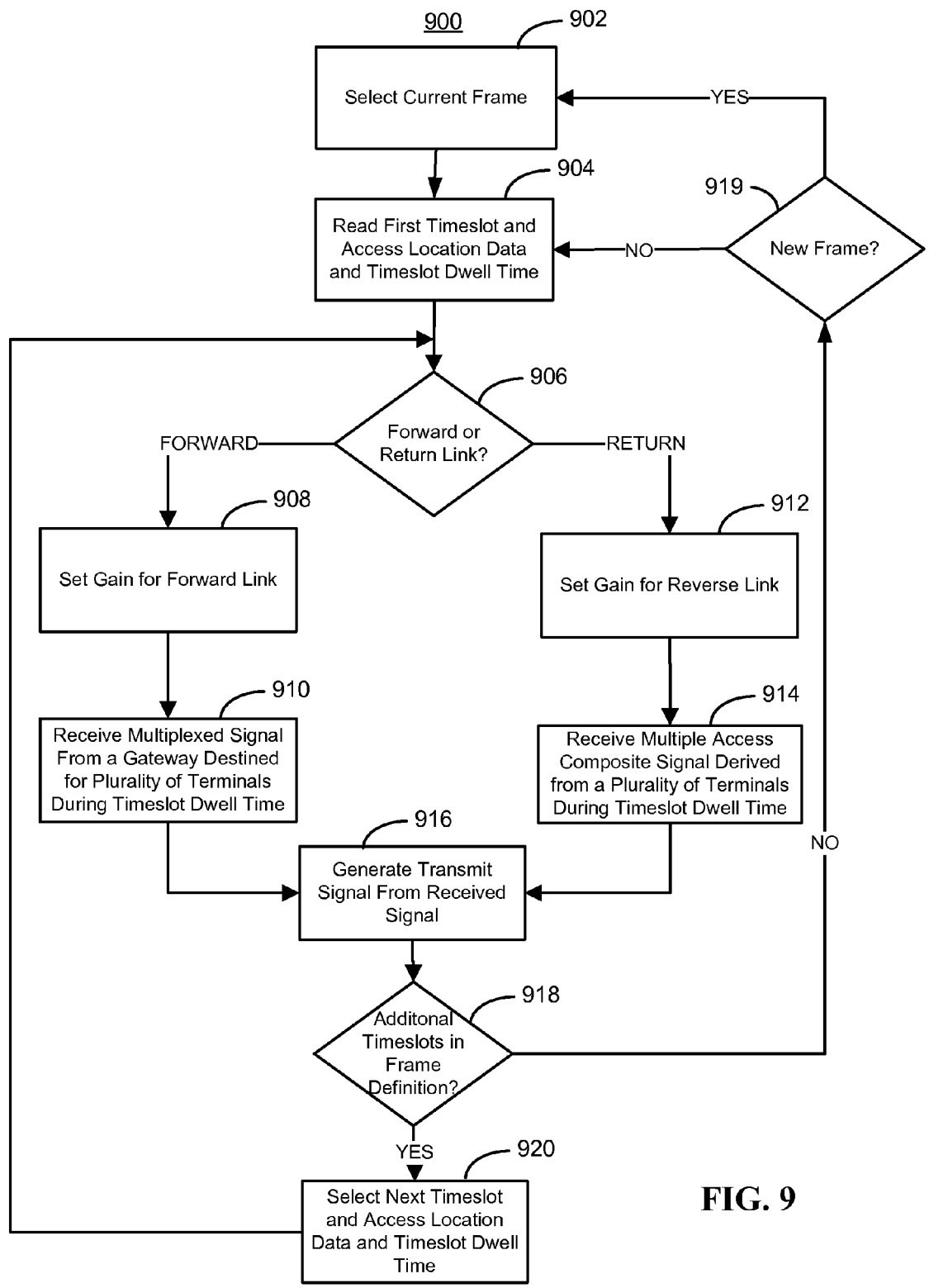
FIG. 9 shows an illustrative process for supporting satellite communication in accordance with an embodiment of the present invention.

FIG. 9 shows illustrative process 900 for supporting satellite communication in accordance with the present invention. Illustrative process 900 corresponds to one pathway (such as the pathway shown within dashed line 802 of FIG. 8A), which can service a forward and/or return link of a hub-spoke satellite communication system, such as satellite communications system 100 (FIG. 1). It should be understood that in practical applications, a large number of these pathways will be active during a single timeslot dwell time, and thus a corresponding large number of these processes will be operating in parallel.

At step 902 of FIG. 9, a current frame is selected. For example, beam weight processor 414 (FIG. 4) may receive one or more pre-computed weight sets via data link 416 (FIG. 4). The frame selected at step 902 will include one or more timeslot definitions and one or more weight matrices. For example, beam weight processor 414 (FIG. 4) or affiliated hardware may provide the bulk storage for a plurality of beam hop timeslot definitions and a plurality of weight matrices. A weight matrix may include the set of all complex weight vectors used for transmission and reception of all beams in one timeslot. A weight vector may include the group of $L_{tx}$ or $L_{rx}$ individual complex weights used by a phased array to create one beam during one timeslot. A beam hop timeslot definition may include the set of all pathway gains of all beams in one timeslot and may specify all dwell times associated with the timeslot.

At step 904, a first timeslot definition and a first weight matrix are selected for the current frame. For example, sequential logic 706 (FIG. 7) of beam weight processor 700 (FIG. 7) may include a counter for selecting a timeslot. Timeslot definitions and/or weight matrices may also include location data used to create one or more receive beams, one or more transmit beams, or both. For example, the location data may include the set of all complex weight vectors used to generate the active beams for the timeslot.

At step 906, a determination is made whether the communication is part of a forward link or a return link. As explained above, in a hub-spoke system, a gateway (e.g., gateway 115 of FIG. 1) may communicate with user terminals (e.g., user terminals 130 of FIG. 1) using downstream (e.g., forward) links, while user terminals (e.g., user terminals 130 of FIG. 1) may communication with a gateway (e.g., gateway 115 of FIG. 1) using upstream (e.g., return) links. The gateway may service its own uplinks and downlinks to and from a satellite (e.g., satellite 105 of FIG. 1). The gateway may also schedule traffic to and from the user terminals. Alternatively, the scheduling may be performed in other parts of the satellite communications system (e.g., at one or more network operations centers (NOC) and/or gateway command centers). For example, in some embodiments, the gain settings included in the frame definition (e.g., as part of each timeslot definition) may be used to determine whether a communication is a forward link or a return link.

If, at step 906, a forward link is being processed, then at step 908 the gain for the pathway may be adjusted, if necessary, to support a forward link. For example, a selectable gain channel amplifier may provide the gain setting for the pathway in use, as shown in FIG. 4. The gain setting can be determined from the first timeslot definition. At step 910, a receive beam signal is created for the duration of the timeslot dwell time. For example, a satellite-based receive phased array including a receive beam forming network (e.g., BFN 410 of FIG. 4) may be configured to create one or more receive beams on the satellite for the duration of the timeslot dwell time. The receive beams may be used to receive one or more multiplexed signals (e.g., a multiplexed signal from a gateway, such as gateway 115 (FIG. 1)) destined for a plurality of terminals. For example, the multiplexed signal may be destined for user terminals 130 (FIG. 1). At least some of the individual component signals of the multiplexed signal can differ in content, for example, if destined for different user terminals. The multiplexed signal may be multiplexed using any suitable multiplexing scheme, including, for example, MF-TDM, TDM, FDM, OFDM, and CDM. In general, TDM is used for simplicity.

If, at step 906, a return link is being processed, then at step 912 the gain may be adjusted, if necessary, to support a return link. For example, a selectable gain channel amplifier may provide independent gain settings for the pathways in use, as shown in FIG. 4. The gain setting can be determined from the first timeslot definition. At step 914, a receive beam signal is created for the duration of the timeslot dwell time. For example, a satellite-based receive phased array including a receive beam forming network (e.g., BFN 410 of FIG. 4) may be configured to create one or more receive beams on the satellite for the duration of the timeslot dwell time. The receive beam is used to receive one or more multiple access composite signals (e.g., a composite signal derived from a plurality of terminals, such as user terminals 130 (FIG. 1)) destined for a gateway (e.g., gateway 115 (FIG. 1)). The multiple access composite signal may be formed using any suitable multiple access scheme, including, for example, MF-TDMA, TDMA, FDMA, OFDMA, and CDMA. The multiple accesses during the slot period may be all random access, all scheduled transmissions, or a mixture of random access and scheduled transmissions.

At step 916, a satellite-based transmit phased array including a transmit beam forming network (e.g., BFN 412 of FIG. 4) is configured to generate one transmit beam signal for the duration of the timeslot dwell time. The transmit beam signal is derived from the received multiplexed or multiple access composite signal using a bent-pipe pathway on the satellite. For example, one or more of frequency conversion, filtering, and selectable gain amplification may be performed on the received signal to create the transmit signal.

At step 918, the timeslot dwell period has passed and a determination is made whether there exist additional timeslots in the frame definition to process. For example, sequential logic 706 (FIG. 7) may be instructed to automatically loop timeslots included in a frame definition at the conclusion of each frame. As described above, frame definitions and weight sets may be time-varying and dynamically adjusted locally at the satellite (e.g., by sequential logic 706 (FIG. 7) or computer 702 (FIG. 7), or remotely at a ground facility using data link 416 (FIG. 4)). If, at step 918, there are more timeslots to process, then at step 920 the next timeslot may be selected for processing. For example, a new timeslot may be selected immediately after the timeslot dwell time of the timeslot selected in step 904 has elapsed. In practice, multiple timeslot definitions and multiple weight sets may be loaded into memory 704 (FIG. 7) of BWP 700 (FIG. 7) and timeslot definitions and weight matrices may be accessed by following a pointer, for example, of a linked list or other data structure. Illustrative process 900 may then return to step 906 to create new receive beam signals and generate new transmit beam signals for the new timeslot dwell time. If, at step 918, a determination is made that there are no more timeslots to process in the frame, then at step 919 a determination is made whether or not a new frame definition or a new weight set has been received. For example, a command to change frame definitions and/or weight sets may have been received (e.g., from computer 702 (FIG. 7) or from a remote scheduler) or a new frame definition and/or a new weight set may have been uploaded to the satellite. If, at step 919, neither a new frame definition or a new weight set has been received, then the current frame may be processed again (e.g., automatically repeated). If a new frame definition or a new weight set has been received, this new frame definition or this new weight set may be selected for processing.

As an example of the high capacity offered, consider a system with the following parameters:

- A 5.2 m reflector on satellite with a 15 kW power available for use by the payload.
- Ka band operation with an allocated spectrum of 1.5 GHz on each of 2 polarizations.
- Payload volume and mass constraints support up to 100 pathways, each 1.5 GHz wide (using all spectrum on one polarization) active at one time. Assume 50 pathways are used for forward traffic and 50 pathways for return traffic, yielding a total of 50*1.5 GHz=75 GHz of spectrum in each direction.
- A 75 cm user terminal. For large beam spacing (large coverage area), the resulting forward link budget supports a spectral efficiency of about 3 bps/Hz resulting in about 225 Gbps of forward capacity
- The return link budget supports 1.8 bps/Hz resulting in 135 Gbps of return link capacity. The total capacity is about 360 Gbps.

Flexible Allocation Between Forward and Return Capacity

As shown in FIG. 4, the satellite contains K generic sets of pathways. Each pathway consists of a formed receive beam and a formed transmit beam which are interconnected by path electronics nominally consisting of filters, a downconverter, and amplifiers. In accordance with one embodiment of the subject invention employing a hub spoke system architecture, these K pathways can be used to flexibly and programmably allocate capacity between the forward direction (GW to user terminals) and the return direction (user terminals to GW). The allocation is flexible in that that the total resources can be split amongst forward and return in any proportion desired resulting in any desired ratio between forward and return channel capacity. The allocations are programmable in that the splitting of the resources can be altered at every frame, thus rapidly changing the ratio between forward and return capacity. This is particularly useful for changing the forward/return capacity allocation to accommodate new and evolving applications using data/information transfer over a satellite system.

The flexible capacity allocation is accomplished by a flexible allocation of resources in the satellite architecture. The resources of interest here are the number of physical pathways on the satellite and the time fractions in each beam hopping frame. Two approaches are presented for flexible capacity allocation. Approach 1 flexibly allocates time resources, where approach 2 flexibly allocates HW resources.

Approach 1: Flexible Allocation of Time Resources

In this approach, one or more pathways are allocated for use in the forward direction a fraction of the time, $\alpha_F$. The remainder of the time ($1\alpha_F$) it is used for return traffic. Suppose there are Q fixed length time slots in the beam hopping frame. Then for $Q_F \approx \alpha_F Q$ out of the Q time slots the pathway will be configured for forward traffic. Alternatively, the forward time slots and return time slots could vary in length by the same ratio, although the examples that follow will be limited to the case of fixed length time slots.

Configured for forward traffic means that the Rx beam uses a weight vector that has the beam pointed to a GW site, the transmit beam uses a weight vector that has the beam pointed at a user service area, and the channel amplifier associated with the pathway is set to yield the satellite net gain that is consistent with a forward channel. Configured for return traffic means that the Rx beam uses a weight vector that has the beam pointed to a user service area, the transmit beam uses a weight vector that has the beam pointed at GW site, and the channel amplifier associated with the pathway is set to yield the satellite net gain that is consistent with a return channel.

In many, if not most, hub spoke applications the user terminal and GW terminal sizes are quite different. For example, the GW terminal might be 7 m in diameter with 100's of Watts of output power capability in the HPA behind it and the user terminal may be less than 1 m in diameter with only several Watts of output power capability in the HPA behind it. In such scenarios, it is common for the desired net electronic gain of the satellite to be different in the forward direction from the return direction. Thus, in general, the channel amplifier in a pathway needs to be configured for different gains in the forward and return directions.

In an extreme example, let $Q_F=Q$ for all pathways. The result is a Forward Link Only (FLO) system in which all capacity is allocated to the forward link and no capacity is allocated to the return link. This is useful for a media broadcast system. However, the same satellite can be configured (via uploading a different beam weight set and channel amplifier gain set) to allocate 75% (for example) of the time slots for forward transmission and 25% for return transmission. This would result in a forward direction capacity of 75% of the FLO example and a return capacity of 25% of the maximum of what could be achieved. In general, let $C_{F\_max}$ be the forward channel capacity with all time slots allocated to the forward direction and let $C_{R\_max}$ be the return channel capacity with all time slots allocated to the return direction. Then for $Q_F$ forward time slot allocations and $Q_R=Q-Q_F$ return channel time slot allocations, the forward and return capacity is $$C_F = \frac{Q_F}{Q} \cdot C_{F\_max} \text{ and} \quad (2)$$
$$C_R = \left(1 - \frac{Q_F}{Q}\right) \cdot C_{R\_max}$$

where $Q_F$ can assume any value from 0 (all return traffic) to Q (all forward traffic). It is clear from (2) that the allocation of capacity between forward and return can take on any arbitrary proportion limited only by the value of Q, the number of time slots per beam hopping frame. For reasonable sizes of Q, such as Q=64, this limitation is not very limiting as it allows allocation of capacity in increments of 1/64 of the maximum value.

In this approach, all K pathways are used exclusively for forward traffic or exclusively for return traffic at any instant of time. The requirements for the total number of GW locations can be determined as follow. Let there be K pathways each using W Hz of spectrum on a single polarization. Furthermore, let there be $N_{GW}$ gateway sites, each capable of using W Hz of spectrum on each of two polarizations. At any instant of time, the total user link spectrum is KW Hz, which is being used for either forward link or return link transmissions (but never both). The total feeder link spectrum utilized at any given instant is $2N_{GW}W$, which is also used for either forward link transmission or return link transmission, but never both. Equating the two spectrum quantities results in the required number of GWs, $N_{GW}=K/2$.

This approach is inefficient since a GW is not both transmitting and receiving 100% of the time. The fraction of time a GW spends transmitting added to the fraction of time that the GW spends receiving is equal to 1. However, a GW could both transmit and receive 100% of the time and is thus being inefficient and underutilized.

Figure 12A:
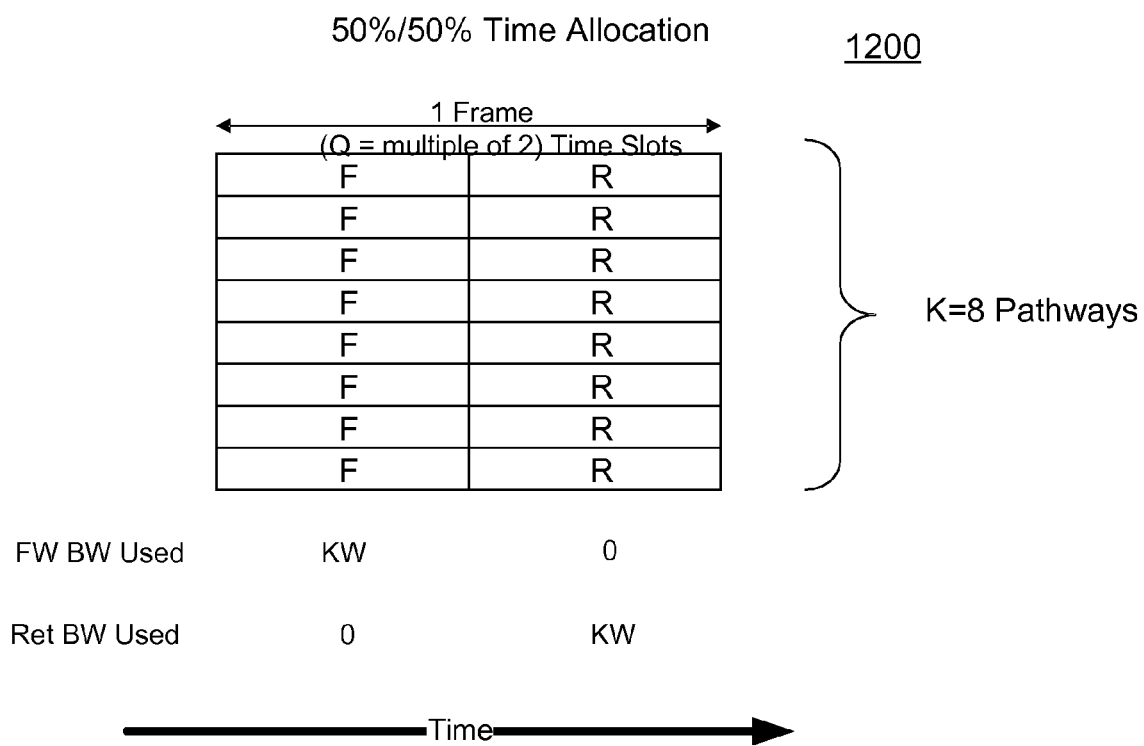
FIG. 12A shows an illustrative synchronized timeslot allocation in accordance with an embodiment of the present invention.

Such an approach is said to be synchronized, as illustrated in FIG. 12A which shows a 50%-50% time resource allocation between the forward and return link for each pathway.

The pathways are synchronized in that they all service the forward link at some times and all service the return link at other times. As can be seen in the figure, the total feeder link spectrum used is always KW Hz, and it is always either all forward link spectrum or all return link spectrum. As discussed above, this synchronized system requires K/2 GW's.

FIG. 12B shows an example synchronized time allocation system on a demonstration 8 pathway satellite with 8 user beams and 4 GW's. In Slot 1, FIG. 12B, all four gateways GW1, GW2, GW3 and GW4 are transmitting to beams B1-B8 as shown in the slot configuration table. Below the slots, the pathway (PW) usage of the slot is detailed. In Slot 1, all 8 pathways are used for forward links, thus the entry 8F. In Slot 2, terminals in all the beams are transmitting to their respective gateways, so the pathways usage is denoted 8R. To the right of the table, the slot usage is listed for each pathway. For all pathways, the first slot is forward and the second slot is return, so each slot usage entry is FR.

In this example, the gateways may be autonomous from each other, although equivalently the transmit gateway to a user beam could be different than the receive gateway for that user beam. In that case, the gateways would need to cooperate in order to provide coherent two-way communication to and from user terminals. Note that in all such synchronized cases, half-duplex (transmit and receive at different times) user terminals could be deployed, as all the user beams can be scheduled such that the user terminal transmit slots do not overlap with corresponding receive slots.

The approach can be improved by interleaving the forward and return time allocations as shown in FIG. 13A. The forward and return time allocations for each pathway are structured such that at any instant of time, half of the pathways are used for forward traffic and half are used for return traffic. This results in the total feeder link spectrum requirement at any instant of time being the same (KW Hz), but it is evenly split between the forward link and the return link. Since a GW has 2W Hz of spectrum to use in forward direction and 2W Hz to use in the return direction, the total number of GW's required is K/4. This is half the number of GW's as required when synchronizing the forward and return time allocations, and hence the preferred way to operate.

FIG. 13B shows a 50%-50% time allocation example with a similar 8-path satellite and 8 user beams as in FIG. 12B. Now, however, only two GW's are required, GW1 and GW2. In FIG. 13B, GW1 is transmitting LHP to B1 (which receives RHP) and transmitting RHP to B2 (which receives LHP). Due to the separate polarization, there is no signal interference between beams, even though they are physically adjacent and could even overlap partially or totally. At the exact same time (during that first time slot), the terminals in B7 and B8 are transmitting to GW1. Also during this first time slot of FIG. 13B, GW2 is transmitting to B3 and B4, while B5 and B6 are transmitting to GW2. In the second slot, as in FIG. 12B, the transmission directions are reversed from those of slot 1. Comparing FIG. 13B to FIG. 12B, it can be seen that each user beam has exactly the same number of transmission and reception opportunities. Note that in this specific case, half-duplex user terminals could be deployed, as the user beams are scheduled such that the user terminal transmit slots do not overlap with corresponding receive slots. A different schedule could be used that would also achieve the 50%-50% time allocation, but with user beam transmit and receive slot overlap, possibly requiring that user terminals operate full-duplex, where they could transmit and receive at the same time.

In this example, again the gateways may be autonomous from each other, since each user beam has a single gateway for both its forward (to the user beam) and return (to the gateway) transmissions. Also equivalently to the scenario of FIG. 12B, the transmit gateway to a user beam could be different than the receive gateway for that beam. In that case, the gateways would need to cooperate in order to provide coherent two-way communication to and from user terminals.

Figure 14A:
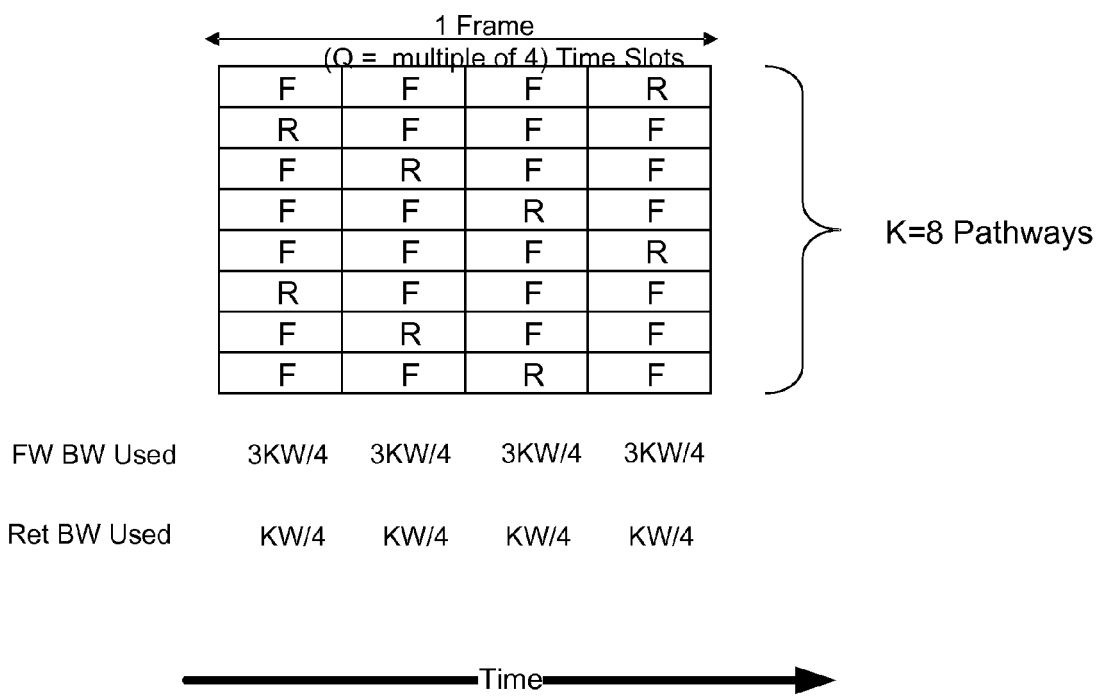
FIG. 14A shows an illustrative interleaved timeslot allocation in accordance with an embodiment of the present invention.

The example shown in FIGS. 13A-B employed 50%-50% time resource allocation. The example in FIG. 14A shows an interleaved time allocation approach for a 75%-25% time allocation between the forward and return traffic. In this example, 75% of the pathways are used for forward traffic at each instant of time. The remaining 25% are used for return traffic. Each individual pathway is also used for forward traffic during 75% of the beam hopping frame and return traffic during 25% of the beam hopping fame. The result is that at any and every instant of time, the BW used for forward traffic is 3KW/4 and the BW used for return traffic is KW/4. Since each GW can use 2W Hz of bandwidth for forward traffic and 2W Hz of bandwidth for return traffic, the total number of GW's required is 3K/8 and is limited by the forward link BW utilization. This number is still smaller than the K/2 value required for the synchronized approach for a 50%-50% time resource allocation, as shown in FIGS. 12A-B.

FIG. 14B shows the 4 time slots of an example system including the eight user beams and four gateways of FIG. 12B. As in that example, gateways either transmit or receive during each slot, but never both transmit and receive in the same slot. The usage summary at the bottom of the configuration table shows that each slot has 6 forward (GW-user) pathways and 2 return (user-GW) pathways.

In the first slot, user terminals in B1 and B2 transmit to GW1, while all other user terminals receive. In the second slot, the user terminals in B7 and B8 transmit, while the others receive. In the third slot, the user terminals in B3 and B4 are the only ones to transmit, while in the fourth slot, the user terminals in B5 and B6 are the only transmitters. Tabulation of the slots will confirm that each user beam has 3 forward pathways from a single gateway to the beam, and one return pathway from the user beam to that same gateway. In this case, K/2=4 gateways are used, although the minimum number of gateways is 3K/8=3 gateways.

If 100% of the traffic were allocated to the forward link, all pathways would be used for forward traffic 100% of the time. This would result in the total forward spectrum of KW Hz and the required number of GW's would be K/2, the same number as in the synchronized approach.

In the general case, each pathway is allocated to be a forward pathway for a fraction $\alpha_F$ of the time in the beam hopping frame. The allocations are interleaved with the objective of having a fraction $\alpha_F$ of the K total pathways operating as forward pathways at each instant of time. The remainder, $K(1-\alpha_F)$, would be operating as return link pathways. At each instant of time, the required forward link spectrum is KW $\alpha_F$ and the required return link spectrum is $KW(1-\alpha_F)$. Hence the total number of required GW's is $N_{GW}=Max(\alpha_F, 1-\alpha_F)K/2$. Note this may require coordination among the GW's.

Approach 2: Flexible Allocation of Hardware Resources

Figure 15A:
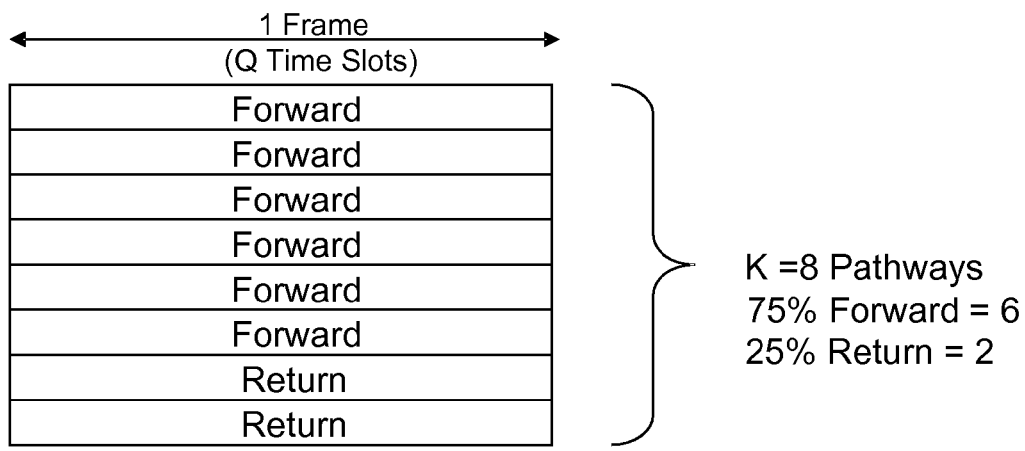
FIG. 15A shows an illustrative dedicated pathways allocation in accordance with an embodiment of the present invention.

In this approach, any single pathway is either dedicated entirely (all times slots in the beam hopping frame) to forward link transmissions or dedicated entirely to return link transmissions. What is flexible is the number of pathways that are dedicated to forward pathways and the number of pathways that are dedicated to return pathways. This is illustrated in FIG. 15A for an example allocation of 75% of the pathways to forward links and 25% to return links.

FIG. 15B shows the timeslots for a 75%-25% pathway allocation 4 slot frame for the example 8 pathway satellite communication system as discussed previously. Here, the pathways are identified by number in the map view. Pathway 1 (LHP→RHP) and Pathway 5 (RHP→LHP) are dedicated to return traffic, while the remaining pathways are dedicated to forward traffic.

In slot 1, GW 1 receives data from user beams B1 and B2, while all three gateways transmit to the remaining user beams. In slot 2, B3 and B4 transmit to GW1, while all three gateways transmit to the remaining user beams. In slot 3, B5 and B6 transmit to GW1, while all three gateways transmit to the remaining user beams. In slot 4, B7 and B8 transmit to GW1, while all three gateways transmit to the remaining user beams.

Consider one polarization of this example two-pole system. We still have the three gateways, GW1-GW3 (each operating in one of the two available polarities), but now only consider user beams B1-B4 and pathways 1-4. There are still 4 slots per frame and thus 4 pathways×4 slots=16 total slots available. We have allocated 75% (12) of these slots to forward traffic and 25% (4) of these slots to return traffic. The 4 return slots fill the entire frame exactly. The 12 forward slots need to be distributed across the 4 user beams, so each user beam gets 3 slots. These same 12 forward slots, however, need to be distributed across 3 gateways, so each gateway must fill 4 forward slots. Thus, there cannot be a one-to-one mapping between gateways and user beams such that all the traffic for any user beam passes through the same gateway.

Figures 15C, 15D, 15E:
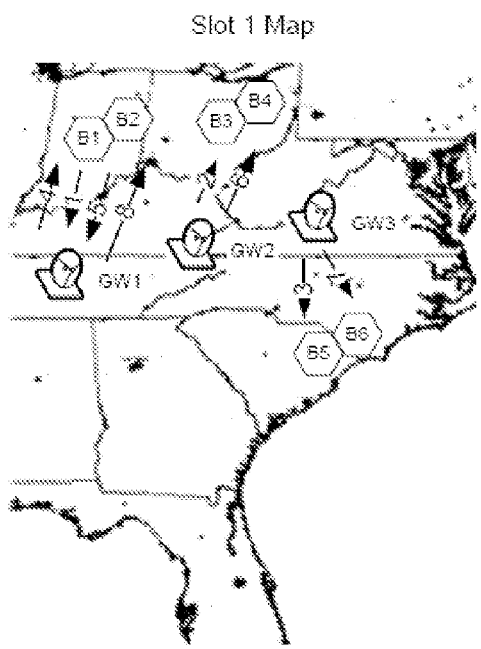
FIG. 15C shows an illustrative timeslot definition table in accordance with an embodiment of the present invention.
FIG. 15D shows an illustrative timeslot definition table in accordance with an embodiment of the present invention.
FIG. 15E shows illustrative timeslot pathways in accordance with an embodiment of the present invention.

Careful attention to the number beams, slots, gateways and pathways can provide flexibility in the mapping of gateways to user beams. FIGS. 15C-E show two more example embodiments of flexible allocation of hardware resources. Here, there are 6 user beams that require a 75%-25% pathway allocation in the example 8 pathway satellite, 3 gateway communication system as discussed previously. Since there are only 6 user beams B1-B6, only 3 time slots are required. The user terminals will generally operate in full-duplex (simultaneous receive and transmit) mode during their active beam hopping time slots. Now there are 4 pathways×3 slots=12 slots to be allocated per polarity. 75% of 12 (9) slots are used for forward traffic, while 25% of 12 (3) slots are used for return traffic. The 3 return slots again fill one frame, corresponding to the one pathway allocated for return traffic per polarity. Now, however, the 9 forward slots (3 per pathway) per polarity can be divided such that there are exactly 3 slots per gateway and 3 slots per user beam, thus allowing a one-to-one mapping between user beams and gateways.

In FIGS. 15C and 15D, both polarities are depicted. Forward pathways 2-4 and 6-8 are each dedicated to a single gateway: pathways 2 and 6 (for the two polarities) of Gateway 2, pathways 3 and 7 for Gateway 3 and pathways 4 and 8 for Gateway 1. In FIG. 15C, the return pathways are shared among the three gateways such that each gateway receives from the same beams to which it transmits, thus implementing a one-to-one mapping between user beams and the gateways that service them. Alternatively, in FIG. 15D, the return pathways are all directed to Gateway 1. In this case, Gateway 1 is considered a shared receive gateway and gateways 2 and 3 can operate half-duplex as transmit only. In this shared receive gateway embodiment, a number of gateways transmit to a number of user terminals, while those user terminals only transmit (if they transmit at all) to a single gateway, typically one of the transmit gateways. FIG. 15E shows the first time slot of the system of either 15C or 15D, as it is the same in both cases.

The shared receive gateway can have utility, for example, if there are user terminals that transmit requests for information that is located at one gateway, or if one gateway is the interface between the ground network of gateways and an external network. In this case, having all user terminals request the information directly from that gateway will avoid the problem of having the other gateways forward requests to that interface gateway.

The reverse is also possible: a shared transmit gateway system where user terminals, perhaps sensor terminals, transmit a large amount of information, but only need to receive a small amount. For example, a 25%-75% time allocation could be implemented by switching the direction of the beams in FIG. 15B. Thus, GW1 would be the common transmitter for all the service (user) beams. In these shared gateway embodiments, half-duplex gateways can be deployed if the system operator has a backbone network that connects the gateways such that traffic can be directed and scheduled properly.

Let $K_F$ be the number of forward pathways and $K_R$ be the number of return pathways where $K_F+K_R=K$ is the total number of pathways. Since each pathway is always used entirely in the forward or return direction, there is no need to dynamically change the net electronic gain through the pathway on a time slot by time slot basis. Hence, dynamic adjustment of the channel amplifier gain on a slot-by-slot basis may not be required.

By setting $K_F=K$ and $K_R=0$, we have all forward traffic, (FLO). By setting $K_R=K$ and $K_F=0$, we have all return traffic, (Return Link Only or RLO). In general, the capacity allocation is each direction is, $$C_F = \frac{K_F}{K} \cdot C_{F\_max} \text{ and}$$

$$C_R = \frac{K_R}{K} \cdot C_{R\_max} = \left(1 - \frac{K_F}{K}\right) \cdot C_{R\_max}$$
(3)

where $K_F$ can assume any value from 0 (all return traffic) to K (all forward traffic). It is clear from (3) that the allocation of capacity between forward and return can be take on any arbitrary proportion limited only by the value of K, the number of pathways on the satellite. For reasonable sizes of K, such as K=100, this limitation is not very limiting as it allows allocation of capacity in increments of 1/100 of the maximum value.

Figure 17:
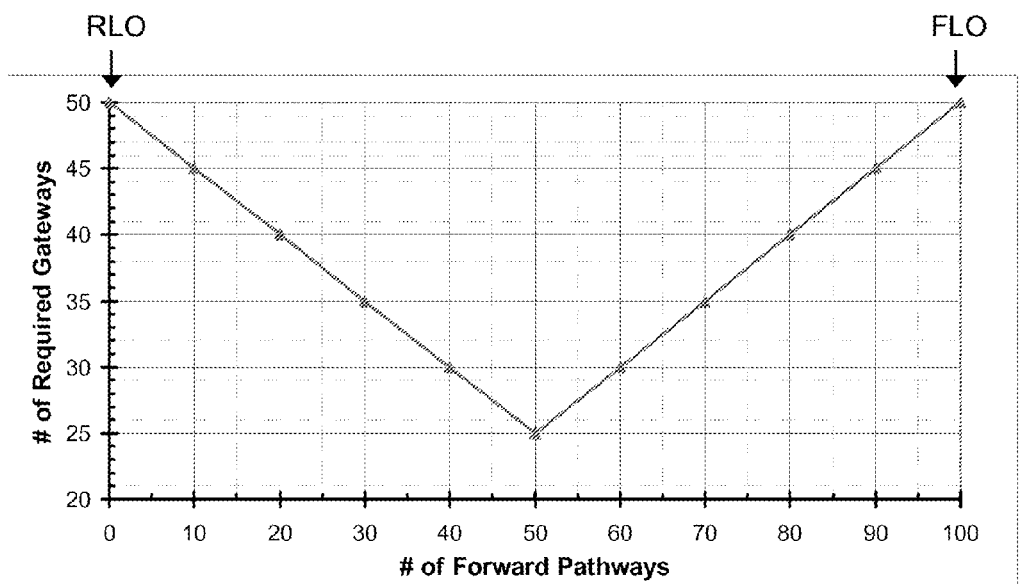
FIG. 17 shows an illustrative chart of the number of gateways required versus the number of forward pathways allocated in accordance with an embodiment of the present invention.

In this approach, at any instant of time the total user link spectrum used in the forward direction is $K_F$W. In the return direction, the total spectrum used is $K_R$W. Again, it is assumed that each GW has W Hz available for use on each of two polarizations. The total feeder link spectrum available for use is $2N_{GW}$W in each direction (forward and return). Therefore the number of cooperating (not autonomous) GW's required is, $N_{GW}=\text{Max}(K_F,K_R)/2$, which is the same as approach one when careful assignment of the Transmit and Receive slots was chosen to minimize the GW count. However, approach 2 has the advantage of not needing to dynamically change the net gain of the pathway during the beam hopping frame to accommodate dynamic changing between forward and return configurations. FIG. 17 shows an illustrative chart 1700 of the number of cooperating gateways required versus the number of forward pathways allocated when K=100. As shown in FIG. 17, the number of cooperating gateways required is minimum when $K_F=K_R$, while the number of cooperating gateways required is maximum for RLO (i.e., $K_F=0$) and FLO (i.e., $K_R=0$).

In all of the discussed approaches, it should be clear that the forward link and return link can be operated as two independent transmission systems. The allocation of capacity between the two transmission systems can be divided up in just about any proportion desired, as possibly limited by K or Q. Then each transmission system can independently spread its capacity around the coverage area in any way desired by appropriate setting of the weight vectors that create the user beams in each time slot. Generally, one would set the coverage area for the forward link and return links to be the same physical area. This provides every point in the coverage area with opportunities for reception of forward link data and transmission of return link data. In general, these opportunities will not always occur in the same time slots. It can also be seen that the ratio of forward to return traffic need not be the same at every point in the coverage area. This allows the ratio of forward to return traffic to be customized in each beam coverage area. The mechanism for customizing this ratio is the adjustment of the number (and/or size) of forward and receive time slots allocated to each physical beam location.

Figure 16A:
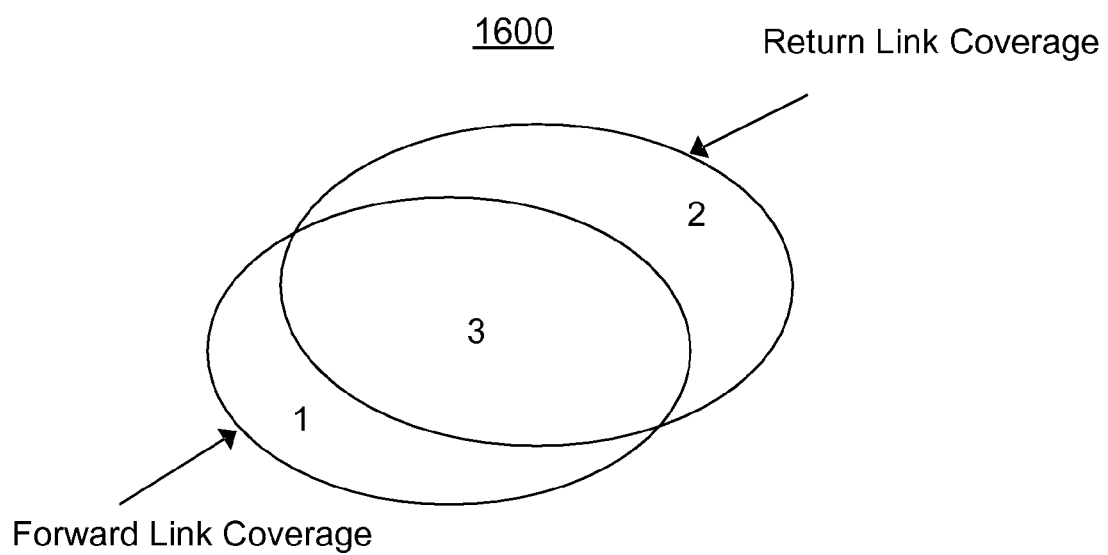
FIG. 16A shows illustrative non-congruent forward and return link coverage areas in accordance with an embodiment of the present invention.

It is also possible to have non-congruent coverage areas for forward and return link service. This is depicted in FIG. 16A. The forward link coverage area is the union of the coverage area of the individual forward link user beam formed during a beam hopping time frame. Likewise, the return link coverage area is the union of the coverage area of the individual return link user beam formed during a beam hopping time frame. The union of the forward and return coverage areas can be broken into 3 regions. Region 1 is the area where the beam weight set provides forward link beams but no return link beams. This region could support forward link traffic only. Region 2 is the area where the beam weight set provides return link beams but not forward link beams. This region could support return link traffic but not forward link traffic. Region 3 is the region where the beam weights provide both forward and return beams, although not necessarily in the same time slot. Both forward and return link traffic can be supported. Furthermore, the ratio of forward to return capacity can be customized in each physical beam location within region 3.

Figure 16B:
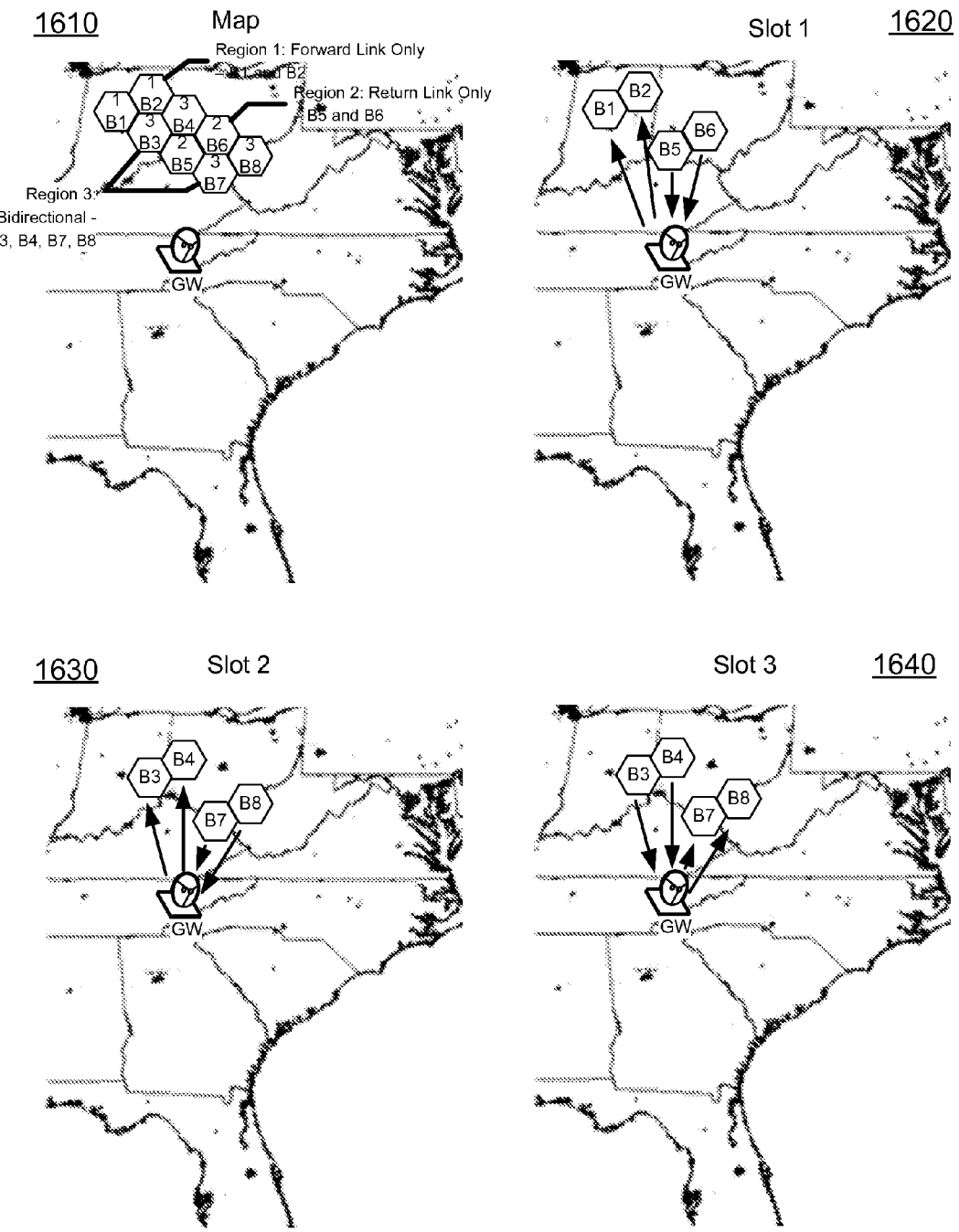
FIG. 16B shows illustrative timeslot pathways in accordance with an embodiment of the present invention.

A simple single gateway, 4 pathway system is illustrated in FIG. 16B. Here, forward link Region 1 contains Beams 1 and 2, return link Region 2 contains Beams 5 and 6, while bi-directional Region 3 contains Beams 3, 4, 7 and 8. This illustrates that while Region 3 was shown in FIG. 16A as a single logical zone, there is no requirement that the beams comprising Region 3 be contiguous. In fact, Regions 1 and 2, shown in this example as contiguous, could also have been comprised of a number of distinct areas.

In Slot 1, the gateway transmits to the terminals in Region 1, B1 and B2, and receives from the terminals in Region 2, B5 and B6. The terminals in Region 3 are inactive during this slot, while the terminals in Regions 1 and 2 are inactive during the remaining slots. In Slot 2, the gateway transmits to terminals in B3 and B4 and receives from terminals in B7 and B8. In Slot 3, the gateway receives from terminals in B3 and B4 and transmits to terminals in B7 and B8.

The present invention provides a flexible high-capacity satellite communications architecture. Characteristics of this architecture may include one or more of the following:
  1. high capacity;
  2. flexible allocation between forward and return capacity;
  3. flexible capacity distribution and coverage areas;
  4. re-configurable coverage areas and capacity allocation;
  5. flexible GW locations, for example, using beam hopping to enable GW's to occupy the same spectrum and the same location as user beams; and the ability to move GW locations over the lifetime of the satellite;
  6. incremental GW rollout;
  7. orbit slot independence;
  8. dynamic equivalent isotropically radiated power (EIRP) allocation across GW's to mitigate rain fade, for example, where margin requirements are based on a sum of rain fade on all diverse paths rather than on statistics of an individual path;
  9. operation with half-duplex terminals; and
  10. operation with reduced redundancy payload hardware.
Characteristics (1) and (2) have been described. Further details of characteristics (3) through (10) are provided below.

Flexible Capacity Distribution and Coverage Areas

A small number of cells can be active at any instant of time. In one example, $K_F$=40 to 60 transmit user beams (user terminal downlink). Beam weight vectors can be dynamically changed per an uploaded schedule. Take an example where the total number of user cells equals $K_F \times Q$, where Q=number of timeslots and $1 \leq Q \leq 64$. Here, the coverage area is increased by a factor of Q. The average duty cycle of a beam=1/Q. The forward link speed to a beam is reduced by a factor of Q. It is preferable for the user terminal to be able to demodulate all carriers in the W Hz bandwidth. For W=1500 MHz, $\eta_{Hz}$=3 bps/Hz, and Q=16, the average downlink speed to a user terminal is about 281 Mbps.

Turning to the return link, in one example, $K_R$=40 to 60 receive user beams (user terminal uplink). Beam weight vectors can be dynamically changed per an uploaded schedule. Take an example where the total number of user cells equals $K_R \times Q$, where Q=number of timeslots and $1 \leq Q \leq 64$. Here, the coverage area is increased by a factor of Q. The average duty cycle of a beam=1/Q. The return link speed to a beam is reduced by a factor of Q. It is preferable for the user terminal to use a burst HPA capable of high peak power but lower average power. For 12 W peak HPA with 3 W average power limit, 40 Msps uplink, 2.25 bits/sym, and Q=16, the average uplink speed from a user terminal is 5.625 Mbps.

The flexible high-capacity satellite communications architecture described herein may also provide non-uniform distribution of capacity. Capacity can be allocated to different cells in near arbitrary proportions by assigned differing numbers of slots per cell. Again, there are Q timeslots in a beam hopping frame. Each cell uses $q_j$ timeslots, such that $$\sum_{j=1}^{J} q_j = Q \qquad (4)$$

where J is the number of locations that a beam hops to in the beam hopping frame. Capacity in each cell is:

$$C_j = C_b \frac{q_j}{Q} \qquad (5)$$

where the instantaneous capacity per beam=$C_b$.

An example of beam hopping with non-uniform distribution of capacity is shown in FIGS. 18A-C. FIG. 18A shows an illustrative beam hop pattern 1800 of a single beam for 8 non-uniform timeslot dwell times of a beam hopping frame. In the example, Q=32 and $C_b$=4.5 Gbps. The cell locations in the beam hop pattern 1800 are shown as contiguous for ease of illustration. FIG. 18B shows an illustrative timeslot dwell time table 1810 for the beam hop pattern 1800. For each of the 8 timeslot dwell times of the timeslot dwell time table 1810, the number of timeslots $q_j$ assigned to the corresponding cell location and the area capacity $C_j$ in Mbps is shown. FIG. 18C shows an illustrative beam hopping frame 1820 for the timeslot dwell time table 1810. The beam hopping frame 1820 includes K beams. The non-uniform timeslot dwell times for beam #1 of the beam hopping frame 1820 match the dwell times illustrated in the timeslot dwell time table 1810. It is preferable to have all the beams change locations at the same time. This minimizes the beam-beam interference as each beam only overlaps in time with K-1 other beams. However, the system can operate without this constraint. More beams can then interfere with each other, and the beam locations should be chosen with this in mind.

Re-Configurable Coverage Areas and Capacity Allocation

Beam locations are defined by the weight vectors used in the beam forming networks. Capacity per cell is set by the duration of the beam hopping frame the beam stays pointed at a cell (dwell time). Both beam weight vectors and dwell times (e.g., as beam hop frame definitions) can be stored in the beam weight processor (BWP). These values can be uploaded to the BWP by a data link from the ground. Both the beam locations (coverage area) and dwell time (capacity allocation) can be changed. For example, the beam locations and/or the dwell times can be changed occasionally by uploading new weight sets and new beam hop frame definitions, or frequently in response to daily variations (e.g., capacity shifting to match the busy hour) by commanding the BWP to use one of several pre-stored weight sets and beam hop frame definitions. One weight set contains beam weights and one beam hop frame definition contains dwell times for all the beams in all time slots in a beam hopping frame.

Flexible Gateway Locations

Gateways can be placed outside of a service area or in a service area at the cost of a small increase in the number of GW's. To facilitate mapping gateway locations, one can use the number of colors available from the GW's. The total number of colors=time colors×polarization colors×frequency colors. Take an example with Q=4, W=1500 MHz (full band), and dual polarization. The total number of colors=4 times×2 poles×1 frequency=8. The number of GW's, $N_{GW}$, is determined by $$\sum_{i=1}^{N_{GW}} C_i \geq K \cdot Q = M = \# \text{ of user beams} \qquad (6)$$

where $C_i$=the number of colors serviceable by GW #i.

Figure 19A:
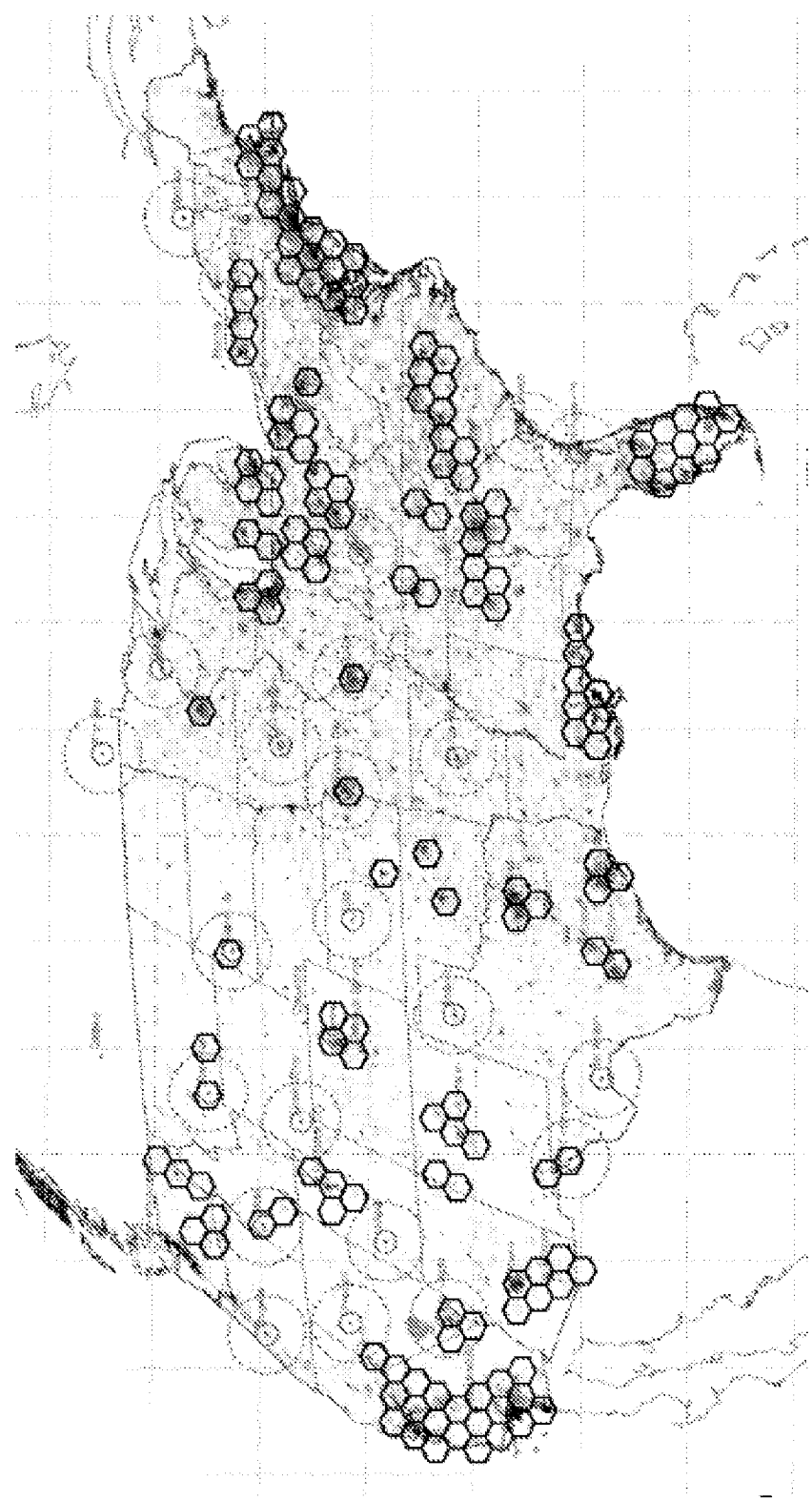
FIG. 19A shows illustrative gateway locations and user beam locations in accordance with an embodiment of the present invention.
Figures 19B, 19C:
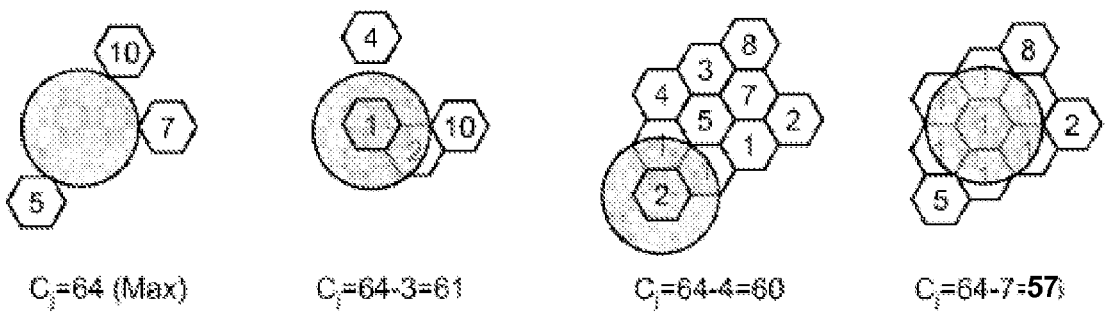
FIG. 19B shows an illustrative gateway table in accordance with an embodiment of the present invention.
FIG. 19C shows illustrative placements of gateway locations in accordance with an embodiment of the present invention.

FIG. 19A shows illustrative gateway locations and user beam locations for an example with 23 GW's (22 operation+1 utility GW). The user beam locations are shown as cells and the gateway locations are shown as dashed circles in the map 1900 of FIG. 19A. FIG. 19B shows an illustrative gateway table 1910 for the map 1900. The gateway table 1910 shows, for each gateway, the gateway location, the number of beam issues (i.e., the number of colors unusable), and the number of colors serviceable by the gateway, $C_i$. For K=40, Q=4, M=160 beams, and the $C_i$ illustrated in the gateway table 1910, $\Sigma C_i$=168$\geq$160. Thus, for this example, the system can operate with any 22 out of the 23 gateways. Placing all the gateways with no beam infringements would require K/2=20 gateways. In this example, only 2 additional gateways are required to allow some spatial overlay between GW's and user beams.

In an extreme example, all the gateways are located in the service area. Here, K=40, Q=24, and M=960 beams for full CONUS coverage and a hop dwell=1/24th of the beam hopping frame for all beams. The total number of colors is 48=24 times×2 poles. If the GW's were located away from the service area, the minimum number of GW's would be 20. However, for this extreme example with all gateways located in the service area, the maximum number of colors unusable is assumed to be 7. Thus, $C_i \geq 41=48-7$ for all GW's. It is further assumed that 6 GW's are located where the number of unusable colors is $\leq 4$ (e.g., coverage boundaries such as coastal regions). For these 6 GW's, $C_i$=48-4=44. The number of GW's required is equal to 23, where $\Sigma C_i = (6 \times 44) + (17 \times 41) = 961 \geq 960$. This results in a 15% increase (i.e., from 20 to 23) in gateways required, but with complete flexibility in the location of 17 out of 23 GW's, all of which are within the service area.

Flexibility in gateway locations can also be achieved with non-uniform hop dwell times. The number of GW's required is defined by a similar equation $$\sum_{j=1}^{N_{GW}} C_j \geq K \cdot Q \qquad (7)$$

where $C_j$=total number of useable hop dwell periods by GW j. The maximum possible value of $C_j$ is 2Q (i.e., 2 polarization colors, 1 frequency color). The optimum placement of GW's is, first, in regions of no service (i.e., $C_j$=maximum value), and second, in cells of low hop dwell time and next to cells of low hop dwell time. Placing GW's accordingly will generally result in even fewer additional GW's, compared to the examples above where the hop dwell times are uniform.

FIG. 19C shows illustrative placements 1920 of gateway locations. In this example, Q=32 hop dwells per beam hopping frame, there are 2 polarization colors, and 1 frequency color. The first placement, where $C_j$=64=maximum value, places the GW in a region of no service. The other three placements, where $C_j$<64, place the GW's in cells of low hop dwell time and next to cells of low hop dwell time.

Incremental GW Rollout

Incremental GW rollout is described for an example system with K=40, Q=4, and $N_{GW}$=20. The number of beams M=160, and the average duty cycle=1/Q=25%. In a first example, if service is started with 1 GW (K=2 pathways), 1 GW services 2 beams at a time. Setting the number of time slots Q=80 provides all 160 beams. However, the resulting duty cycle=1/80. Thus, in this first example, there is a reduction in speed and capacity. The duty cycle can be increased as the number of GW's increase.

In a second example, if service is started with 4 GW's and only 40 beams, the resulting coverage area is 25% of the initial coverage area. Note that it can be any 25%. With K=8 pathways, setting Q=5 provides 40 beams, with a duty cycle=1/5. Thus, in this second example, there is minimal reduction in speed and beam capacity. The coverage area can be increased as the number of GW's increase. These approaches trade off initial coverage area and/or speed/capacity for a reduced number of initial gateways.

Orbit Slot Independence

Weights vectors, and thus beam locations, are flexible in the satellite communications architecture described herein. Change of an orbit slot can be accomplished by uploading a new set of beam weight vectors to allow coverage of the same areas from a different orbit slot. This provides several benefits. The orbit slot can be undefined at the time the satellite is being built. The orbit slot can be changed at any time during the satellite lifetime. A generic satellite design can be used for any orbit slot and any service area definition within the reasonable scan range of the reflector.

Dynamic EIRP Allocation Across GW's to Mitigate Rain Fade

In a beamformed Tx system, it is very easy to allocate Tx power to each GW beam in a non-uniform and dynamic manner. Tx power to a beam is proportional to the sum of the magnitude squared of the beam weights. Scaling the beam weights up or down will increase or decrease the power to the beam. Power can also be adjusted via the channel amplifier attenuation.

Power can be allocated to each GW beam in inverse proportion to the rain fade attenuation. This allocation can be dynamic based on the actual rain fade attenuation, or static based on the rain fade that is associated with a particular availability.

In one embodiment, transmit power is allocated to GW's based on downlink SNR. For $N_{GW}$ Gateways, the total Tx power $P_{GW}$ on the satellite that is allocated to transmissions to the GW's is $$\sum_{n=1}^{N_{GW}} P_n = P_{GW} \qquad (8)$$

where $P_n$=Tx power allocated to GW number n. The proper power allocation to equalize downlink SNR is $$P_n = P_{GW} \cdot \frac{L_n R_n}{D_n} \cdot \frac{1}{\sum_{i=1}^{N_{GW}} \frac{L_i R_i}{D_i}} \qquad (9)$$

where $R_n$=satellite antenna gain to GW number n; $D_n$=downlink SNR degradation due to rain attenuation at GW number n; and $L_n$=free-space path loss to GW number n.

In a static approach, power allocations can be selected based on rain attenuation at the target link availability. These fixed power allocations can be determined by the network planner prior to network operation. The rain attenuation, $A_n$, can be determined at each GW that corresponds to the desired availability. The rain degradation, $D_n$, can be calculated from $A_n$ and the GW HW parameters. The free-space path loss, Ln, can be calculated to each GW. The Tx antenna gain to each GW, $R_n$, can be determined from the beam weights and component beam radiation patterns. The allocated powers, $P_n$, and the required channel amplitude attenuation setting can be calculated to produce those powers.

The channel amplitude attenuator setting can be sent uplink to the satellite and kept at that setting until (and if) one desires to change the network operation concept (e.g., GW locations, downlink availability, total power allocated to the GW downlink etc.).

Figure 20:
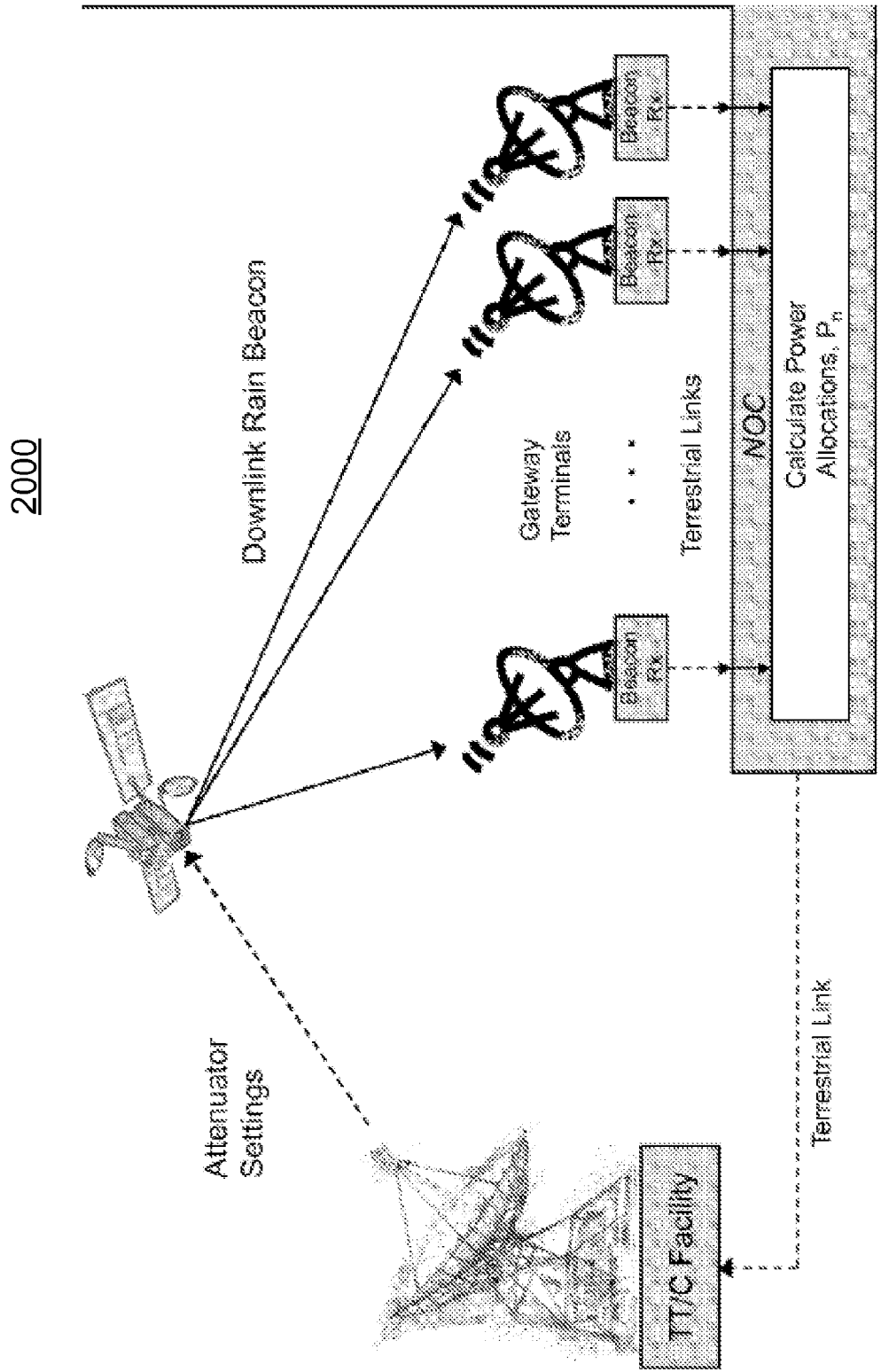
FIG. 20 is a simplified diagram of an illustrative satellite communications system in accordance with an embodiment of the present invention.

In a dynamic approach, the power allocations can be selected based on the observed rain attenuation at each GW. The Tx power settings, $P_n$, will change dynamically as the rain attenuations changes. In some embodiments, a a rain attenuation measurement system is used, and a central processing site (e.g., an NOC) to gather all the measured rain attenuations, dynamically compute the power allocations, and send uplink the power allocation (e.g., as a channel amplitude gain or a beam weight vector) information to the satellite. FIG. 20 is a simplified diagram of an illustrative satellite communications system 2000 that can support this dynamic approach.

In another embodiment, transmit power is allocated to GW's based on signal-to-interference-and-noise ratio (SINR). For GW downlinks that have a lot of "spot beam" interference, it may be better to allocate power with an objective to equalize downlink SINR.

Both the static approach and the dynamic approach can accommodate this by using a different equation to calculate the power allocations. Here the power allocations are $$x = [R_{gw}C - \lambda GC(R - R_{gw})]^{-1} \lambda Dg \qquad (10)$$

where $\lambda$ is chosen to force the equality $$\sum_{n=1}^{N} x_n = P_{GW} \qquad (11)$$

and the below definitions apply.

x: An N×1 column vector, which contains the Tx power allocations to each GW.

R: An N×N beam gain matrix. The component $R_{ij}$ is the gain of the beam pointed at GW j in the direction of GW i. The diagonal component $r_{ii}$ is the antenna gain for GW i.

$R_{gw}$: An N×N diagonal matrix containing the gain to GW n. The diagonal elements of $R_{gw}$=the diagonal elements of R.

D: An N×N diagonal matrix whose elements contain the rain degradation of each GW. This is calculated from the measured values of $A_n$.

C: An N×N diagonal matrix whose elements contain the link constants of each GW.

Specifically, $$C = \text{Diag}[c_n] \qquad (12)$$

where $$c_n = \frac{G}{T}(n) \cdot \frac{1}{L_p(n)} \cdot \frac{1+\alpha}{kW}$$

G: An N×N diagonal matrix whose diagonal elements contain the target relative downlink SINR's for each GW. If it is desired for all GW's to have the same downlink SINR, then G=the N×N identity matrix.

g: An N×1 column vector whose elements are the same as the diagonal elements of G.

$\lambda$: A free scalar parameter that must be chosen such that the power allocations, $x_n$, sum up to the total allocated GW Tx power, $P_{GW}$.

Equation (10) can be solved with an iterative technique.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. In addition, a number of steps may be undertaken before, during, or after the above elements are considered. Accordingly, the above description should not be taken as limiting the scope of the invention.

What is claimed is:

1. A method for hub-spoke, bent-pipe satellite communication utilizing a satellite containing a plurality of pathways, comprising:

specifying a first weight set and a first beam hop frame definition for a beam hopping frame, the beam hopping frame comprising a plurality of timeslots, the specified first weight set comprising a first plurality of receive weight vectors and a first plurality of transmit weight vectors for generating uplink beam signals and downlink beam signals in timeslots of the beam hopping frame, the specified first beam hop frame definition defining a first plurality of sequential dwell times and a first plurality of pathway gains, each timeslot associated with a dwell time;

operating the satellite to generate the uplink beam signals and downlink beam signals for pathways in accordance with the specified first weight set and the specified first beam hop frame definition;

specifying a second weight set and a second beam hop frame definition for a beam hopping frame, the specified second weight set comprising a second plurality of receive weight vectors and a second plurality of transmit weight vectors for generating uplink beam signals and downlink beam signals in timeslots of the beam hopping frame, the specified second beam hop frame definition defining a second plurality of sequential dwell times and a second plurality of pathway gains; and switching from operation of the satellite in accordance with the specified first weight set and the specified first beam hop frame definition to operation of the satellite to generate the uplink beam signals and downlink beam signals for pathways in accordance with the specified second weight set and the specified second beam hop frame definition, wherein the specified first weight set and the specified first beam hop frame definition support first targets of coverage area and capacity allocation based on a first time-based traffic estimate, and the specified second weight set and the specified second beam hop frame definition support second targets of coverage area and capacity allocation based on a second time-based traffic estimate.

2. The method of claim 1, further comprising:

pre-computing and uploading to the satellite for storage a plurality of weight sets, including the first weight set and the second weight set, and a plurality of beam hop frame definitions, including the first beam hop frame definition and the second beam hop frame definition, wherein switching comprises switching by the satellite in response to receiving a command transmitted from a ground entity.

3. A method for hub-spoke, bent-pipe satellite communication utilizing a satellite containing a plurality of pathways, the method performed at the satellite and comprising:

obtaining a first weight set and a first beam hop frame definition for a beam hopping frame, the beam hopping frame comprising a plurality of timeslots, the specified first weight set comprising a first plurality of receive weight vectors and a first plurality of transmit weight vectors for generating uplink beam signals and downlink beam signals in timeslots of the beam hopping frame, the specified first beam hop frame definition defining a first plurality of sequential dwell times and a first plurality of pathway gains, each timeslot associated with a dwell time;

generating a plurality of receive weights and a plurality of transmit weights in accordance with the specified weight set;

setting the plurality of pathway gains in accordance with the specified beam hop frame definition;

generating the uplink beam signals and downlink beam signals for pathways using the plurality of receive weights, the plurality of pathway gains, and the plurality of transmit weights in accordance with the plurality of sequential dwell times defined by the specified beam hop frame definition;

obtaining a second weight set and a second beam hop frame definition for a beam hopping frame, the specified second weight set comprising a second plurality of receive weight vectors and a second plurality of transmit weight vectors for generating uplink beam signals and downlink beam signals in timeslots of the beam hopping frame, the specified second beam hop frame definition defining a second plurality of sequential dwell times and a second plurality of pathway gains;

generating a second plurality of receive weights and a second plurality of transmit weights in accordance with the specified second weight set;

setting the second plurality of pathway gains in accordance with the specified second beam hop frame definition; and switching generation of the uplink beam signals and downlink beam signals for pathways using the first plurality of receive weights, the first plurality of pathway gains, and the first plurality of transmit weights in accordance with the first plurality of sequential dwell times to generation of the uplink beam signals and downlink beam signals for pathways using the second plurality of receive weights, the second plurality of pathway gains, and the second plurality of transmit weights in accordance with the second plurality of sequential dwell times defined by the specified second beam hop frame definition, wherein the specified first weight set and the specified first beam hop frame definition support first targets of coverage area and capacity allocation based on a first time-based traffic estimate, and the specified second weight set and the specified second beam hop frame definition support second targets of coverage area and capacity allocation based on a second time-based traffic estimate.

4. The method of claim 3, further comprising:

receiving and storing a plurality of weight sets, including the first weight set and the second weight set, and a plurality of beam hop frame definitions, including the first beam hop frame definition and the second beam hop frame definition, the plurality of weight sets and the plurality of beam hop frame definitions pre-computed and uploaded to the satellite; and receiving a command transmitted from a ground entity, wherein switching is in response to receiving the command.

5. A hub-spoke, bent-pipe satellite communications system comprising:

a plurality of terminals;

a plurality of gateways configured to communicate with the plurality of terminals;

a controller configured to:

specify a first weight set and first beam hop frame definition for a beam hopping frame, the beam hopping frame comprising a plurality of timeslots, the specified first weight set comprising a first plurality of receive weight vectors and a first plurality of transmit weight vectors for generating uplink beam signals and downlink beam signals in timeslots of the beam hopping frame, the specified first beam hop frame definition defining a first plurality of sequential dwell times and a first plurality of pathway gains, each timeslot associated with a dwell time; and specify a second weight set and a second beam hop frame definition for a beam hopping frame, the specified second weight set comprising a second plurality of receive weight vectors and a second plurality of transmit weight vectors for generating uplink beam signals and downlink beam signals in timeslots of the beam hopping frame, the specified second beam hop frame definition defining a second plurality of sequential dwell times and a second plurality of pathway gains; and a satellite containing a plurality of pathways, the satellite configured to:

obtain the specified first weight set and the specified first beam hop frame definition for a beam hopping frame;

generate a first plurality of receive weights and a first plurality of transmit weights in accordance with the specified first weight set;

set the first plurality of pathway gains in accordance with the specified first beam hop frame definition;

generate the uplink beam signals and downlink beam signals for pathways using the first plurality of receive weights, the first plurality of pathway gains, and the first plurality of transmit weights in accordance with the first plurality of sequential dwell times defined by the specified first beam hop frame definition;

obtain the specified second weight set and the specified second beam hop frame definition for a beam hopping frame;

generate a second plurality of receive weights and a second plurality of transmit weights in accordance with the specified second weight set;

set the second plurality of pathway gains in accordance with the specified second beam hop frame definition; and switch generation of the uplink beam signals and downlink beam signals for pathways using the first plurality of receive weights, the first plurality of pathway gains, and the first plurality of transmit weights in accordance with the first plurality of sequential dwell times to generation of the uplink beam signals and downlink beam signals for pathways using the second plurality of receive weights, the second plurality of pathway gains, and the second plurality of transmit weights in accordance with the second plurality of sequential dwell times defined by the specified second beam hop frame definition, wherein the specified first weight set and the specified first beam hop frame definition support first targets of coverage area and capacity allocation based on a first time-based traffic estimate, and the specified second weight set and the specified second beam hop frame definition support second targets of coverage area and capacity allocation based on a second time-based traffic estimate.

6. The system of claim 5, wherein the controller is further configured to pre-compute and upload to the satellite for storage a plurality of weight sets, including the first weight set and the second weight set, and a plurality of beam hop frame definitions, including the first beam hop frame definition and the second beam hop frame definition; and the satellite is configured to switch in response to receiving a command transmitted from a ground entity.

7. A satellite for hub-spoke, bent-pipe satellite communication, the satellite containing a plurality of pathways and comprising:

one or more processors configured to:

obtain a first weight set and a first beam hop frame definition for a beam hopping frame, the beam hopping frame comprising a plurality of timeslots, the specified first weight set comprising a first plurality of receive weight vectors and a first plurality of transmit weight vectors for generating uplink beam signals and downlink beam signals in timeslots of the beam hopping frame, the specified first beam hop frame definition defining a first plurality of sequential dwell times and a first plurality of pathway gains, each timeslot associated with a dwell time;

generate a plurality of receive weights and a plurality of transmit weights in accordance with the specified weight set;

set the plurality of pathway gains in accordance with the specified beam hop frame definition;

obtain a second weight set and a second beam hop frame definition for a beam hopping frame, the specified second weight set comprising a second plurality of receive weight vectors and a second plurality of transmit weight vectors for generating uplink beam signals and downlink beam signals in timeslots of the beam hopping frame, the specified second beam hop frame definition defining a second plurality of sequential dwell times and a second plurality of pathway gains;

generate a second plurality of receive weights and a second plurality of transmit weights in accordance with the specified second weight set; and set the second plurality of pathway gains in accordance with the specified second beam hop frame definition; and one or more beam forming networks configured to:

generate the uplink beam signals and downlink beam signals for pathways using the plurality of receive weights, the plurality of pathway gains, and the plurality of transmit weights in accordance with the plurality of sequential dwell times defined by the specified beam hop frame definition; and switch generation of the uplink beam signals and downlink beam signals for pathways using the first plurality of receive weights, the first plurality of pathway gains, and the first plurality of transmit weights in accordance with the first plurality of sequential dwell times to generation of the uplink beam signals and downlink beam signals for pathways using the second plurality of receive weights, the second plurality of pathway gains, and the second plurality of transmit weights in accordance with the second plurality of sequential dwell times defined by the specified second beam hop frame definition, wherein the specified first weight set and the specified first beam hop frame definition support first targets of coverage area and capacity allocation based on a first time-based traffic estimate, and the specified second weight set and the specified second beam hop frame definition support second targets of coverage area and capacity allocation based on a second time-based traffic estimate.

8. The satellite of claim 7, wherein the one or more processors are further configured to:

receive and store a plurality of weight sets, including the first weight set and the second weight set, and a plurality of beam hop frame definitions, including the first beam hop frame definition and the second beam hop frame definition, the plurality of weight sets and the plurality of beam hop frame definitions pre-computed and uploaded to the satellite; and receive a command transmitted from a ground entity, wherein the one or more beam forming networks are configured to switch in response to receipt of the command.

* * * * *